United States Patent
Tanaka et al.

(10) Patent No.: US 10,062,022 B2
(45) Date of Patent: *Aug. 28, 2018

(54) INFORMATION CODE, INFORMATION CODE PRODUCING METHOD, INFORMATION CODE READER, AND SYSTEM WHICH USES INFORMATION CODE

(71) Applicant: DENSO WAVE INCORPORATED, Chita-gun, Aichi (JP)

(72) Inventors: Masami Tanaka, Handa (JP); Kunihiko Ito, Chiryu (JP); Takuya Yoda, Obu (JP); Kenichi Yoshida, Obu (JP); Motoaki Watabe, Toyokawa (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 208 days.

This patent is subject to a terminal disclaimer.

(21) Appl. No.: 14/654,162

(22) PCT Filed: Dec. 18, 2013

(86) PCT No.: PCT/JP2013/083904
§ 371 (c)(1),
(2) Date: Jun. 19, 2015

(87) PCT Pub. No.: WO2014/098130
PCT Pub. Date: Jun. 26, 2014

(65) Prior Publication Data
US 2016/0092760 A1 Mar. 31, 2016

(30) Foreign Application Priority Data

Dec. 19, 2012 (JP) .................................. 2012-276910
Jan. 23, 2013 (JP) .................................. 2013-010222
(Continued)

(51) Int. Cl.
*G06K 19/06* (2006.01)
*G06K 7/14* (2006.01)

(52) U.S. Cl.
CPC ..... *G06K 19/06056* (2013.01); *G06K 7/1443* (2013.01); *G06K 19/06037* (2013.01);
(Continued)

(58) Field of Classification Search
USPC ........ 1/1; 235/462.01, 462.1, 375, 454, 494; 380/277
See application file for complete search history.

(56) References Cited

U.S. PATENT DOCUMENTS

| | | | |
|---|---|---|---|
| 5,541,396 A | 7/1996 | Rentsch | |
| 7,032,823 B2 * | 4/2006 | Nojiri | G06K 19/06037 235/462.01 |

(Continued)

FOREIGN PATENT DOCUMENTS

| | | |
|---|---|---|
| JP | 2001-167222 A | 6/2001 |
| JP | 2004-206674 A | 7/2004 |

(Continued)

OTHER PUBLICATIONS

Feb. 25, 2014 International Search Report issued in International Patent Application No. PCT/JP2013/083904.

(Continued)

*Primary Examiner* — Xuemei Chen
(74) *Attorney, Agent, or Firm* — Oliff PLC

(57) ABSTRACT

A two-dimensional information code is provided. Inside the information code, specification Patten regions, a recording region, and an information addition region are arranged. In the specification pattern region, predetermined-shape specification patterns are arranged. Data expressed by a plurality of types of cells are recorded in the data recording region. Additional information, which is different from the data (Continued)

recorded in the data recording region, can be recorded in the information addition region.

19 Claims, 41 Drawing Sheets

(30) Foreign Application Priority Data

Sep. 20, 2013 (JP) ................................ 2013-196239
Dec. 10, 2013 (JP) ................................ 2013-255057

(52) U.S. Cl.
CPC ................ G06K 19/06103 (2013.01); *G06K 2019/06262* (2013.01)

(56) References Cited

U.S. PATENT DOCUMENTS

| | | | | |
|---|---|---|---|---|
| 7,950,589 | B2* | 5/2011 | Oouchi | G06F 8/36 |
| | | | | 235/462.1 |
| 8,235,303 | B2* | 8/2012 | Mizukoshi | G06K 19/06037 |
| | | | | 235/375 |
| 8,434,690 | B2* | 5/2013 | Ushijima | G06K 19/06037 |
| | | | | 235/454 |
| 8,532,299 | B2* | 9/2013 | Hara | G09C 5/00 |
| | | | | 380/277 |
| 8,807,435 | B2* | 8/2014 | Cok | G06K 7/1447 |
| | | | | 235/462.01 |
| 8,925,796 | B2* | 1/2015 | Tsuji | G06K 7/10 |
| | | | | 235/375 |
| 8,978,989 | B2* | 3/2015 | Friedman | G06K 19/06037 |
| | | | | 235/492 |
| 9,165,230 | B2 | 10/2015 | Itakura | G06K 19/0614 |
| 9,177,238 | B2* | 11/2015 | Windmueller | G06K 19/06037 |
| 9,436,852 | B2* | 9/2016 | Sakina | G06K 5/00 |
| 2007/0277150 | A1 | 11/2007 | Oouchi | |
| 2009/0242649 | A1 | 10/2009 | Mizukoshi et al. | |
| 2009/0255992 | A1* | 10/2009 | Shen | G06K 19/06037 |
| | | | | 235/462.1 |
| 2012/0048927 | A1 | 3/2012 | Hasegawa | |
| 2012/0210233 | A1 | 8/2012 | Davis et al. | |
| 2012/0256000 | A1 | 10/2012 | Cok | |
| 2013/0001296 | A1 | 1/2013 | Tsuji | |
| 2013/0026241 | A1* | 1/2013 | Sakahashi | G06K 19/06037 |
| | | | | 235/494 |
| 2013/0043302 | A1* | 2/2013 | Powlen | G06Q 50/01 |
| | | | | 235/375 |
| 2013/0278699 | A1* | 10/2013 | Yoshikoshi | B41J 2/355 |
| | | | | 347/107 |
| 2014/0119647 | A1* | 5/2014 | Cheong | G06K 9/18 |
| | | | | 382/166 |
| 2016/0189016 | A1* | 6/2016 | Windmueller | G06F 17/30725 |
| | | | | 235/494 |

FOREIGN PATENT DOCUMENTS

| | | |
|---|---|---|
| JP | 2007-241327 A | 9/2007 |
| JP | 2008-152334 A | 7/2008 |
| JP | 2009-129410 A | 6/2009 |
| JP | 2009-259192 A | 11/2009 |
| JP | 2012-027558 A | 2/2012 |
| JP | 2012-053697 A | 3/2012 |
| JP | 2012-164236 A | 8/2012 |
| JP | 5057560 B2 | 10/2012 |
| WO | 2007/107533 A2 | 9/2007 |

OTHER PUBLICATIONS

Jul. 2, 2015 International Preliminary Report on Patentability issued in International Patent Application No. PCT/JP2013/083904.
"Information technology-automatic identification and data capture techniques-QR code 2005 bar code symbology specification" International Standard ISO/IEC 18004; Second Edition; Sep. 1, 2006; Annex M; pp. 109.

* cited by examiner

FIG.10
(A)
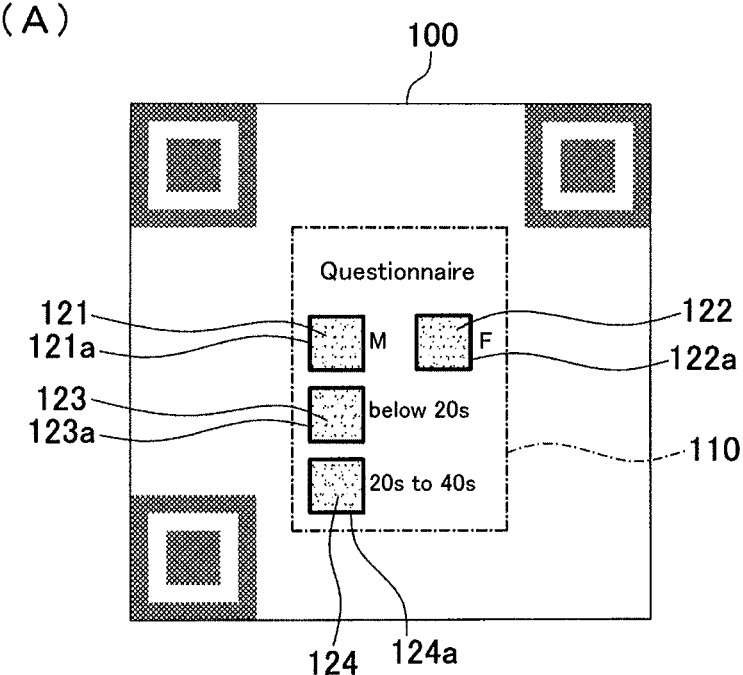
(B)
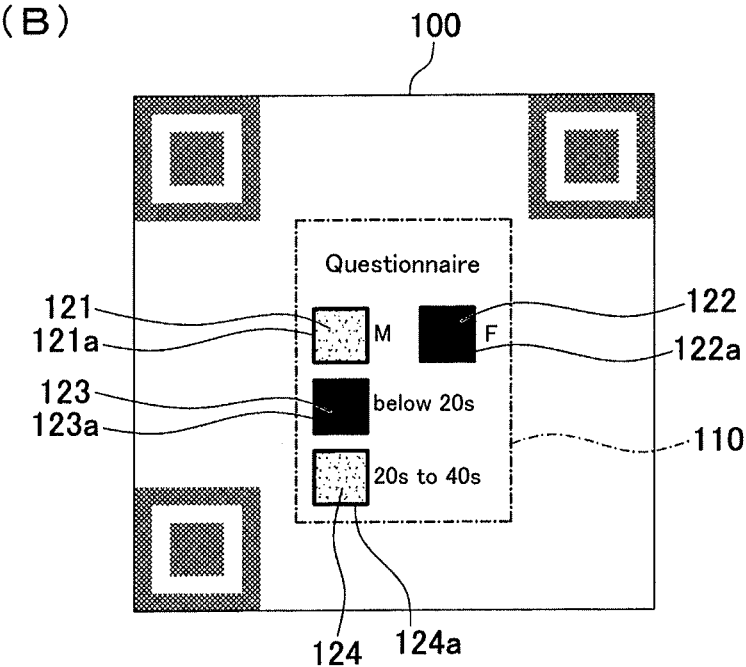

FIG.14
(A)
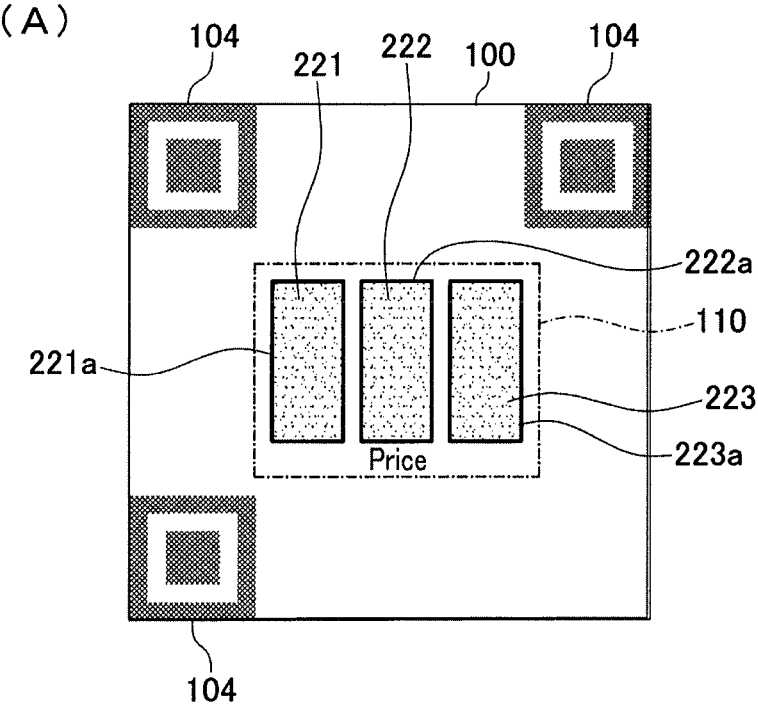
(B)
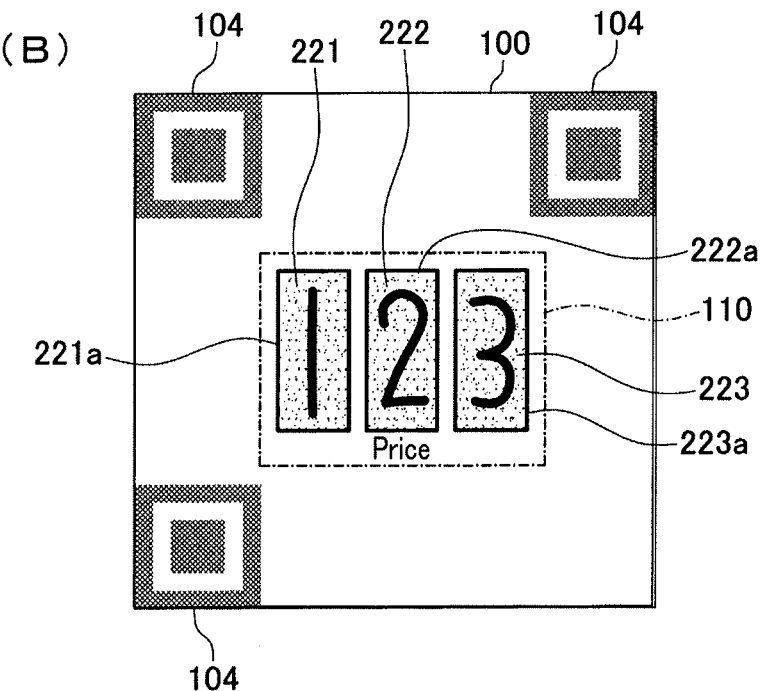

FIG.18
(A)
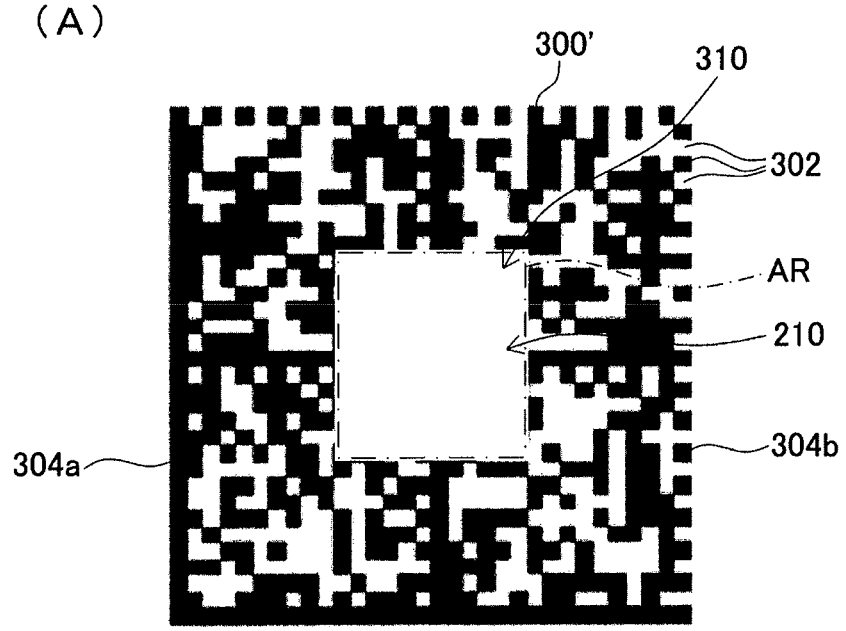
(B)
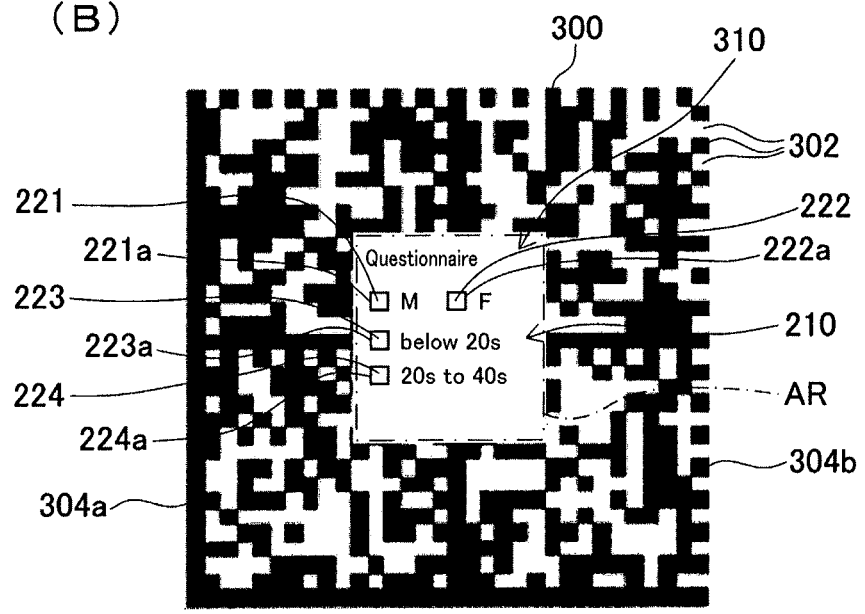

| %%MARKSHEET%% | ORDINARY DATA |

(B)

| %%MARKSHEET%% | ORDINARY DATA |

FIG.22
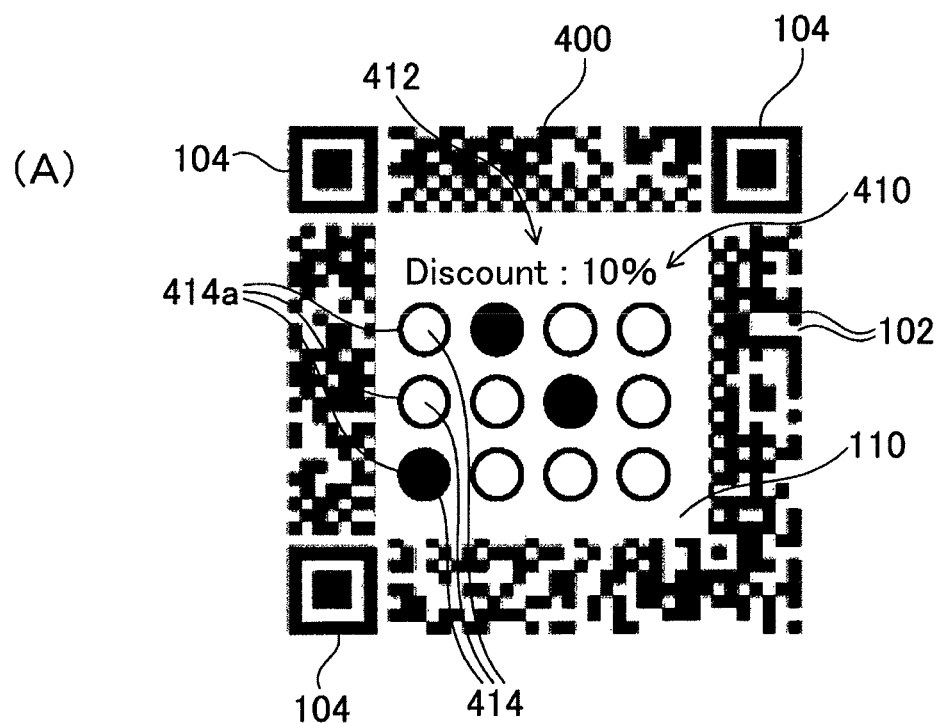
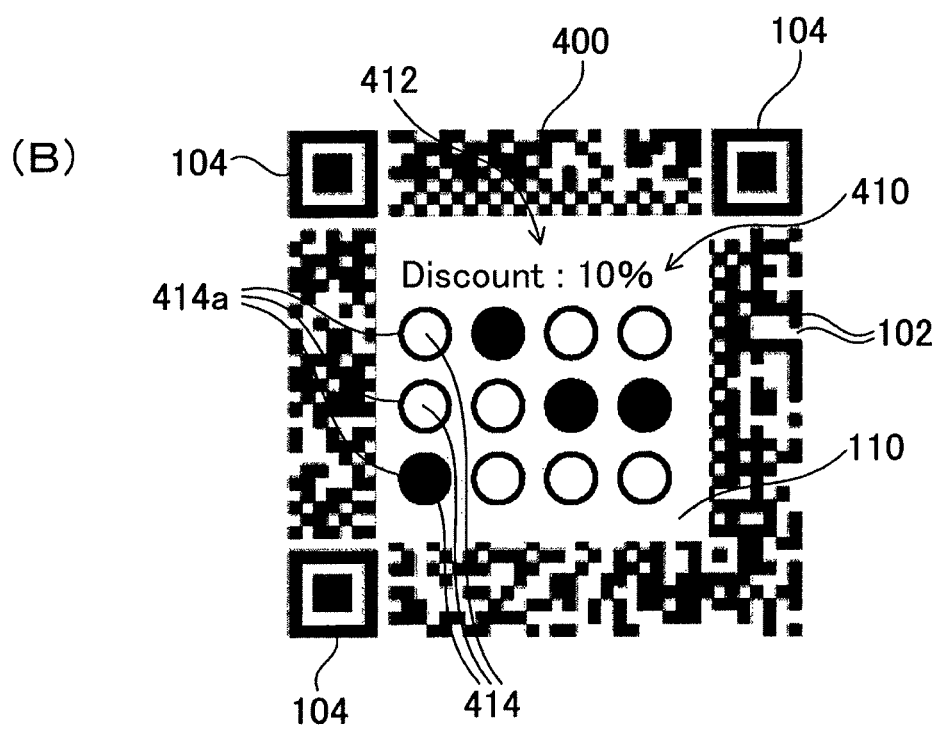

FIG.24
(A)
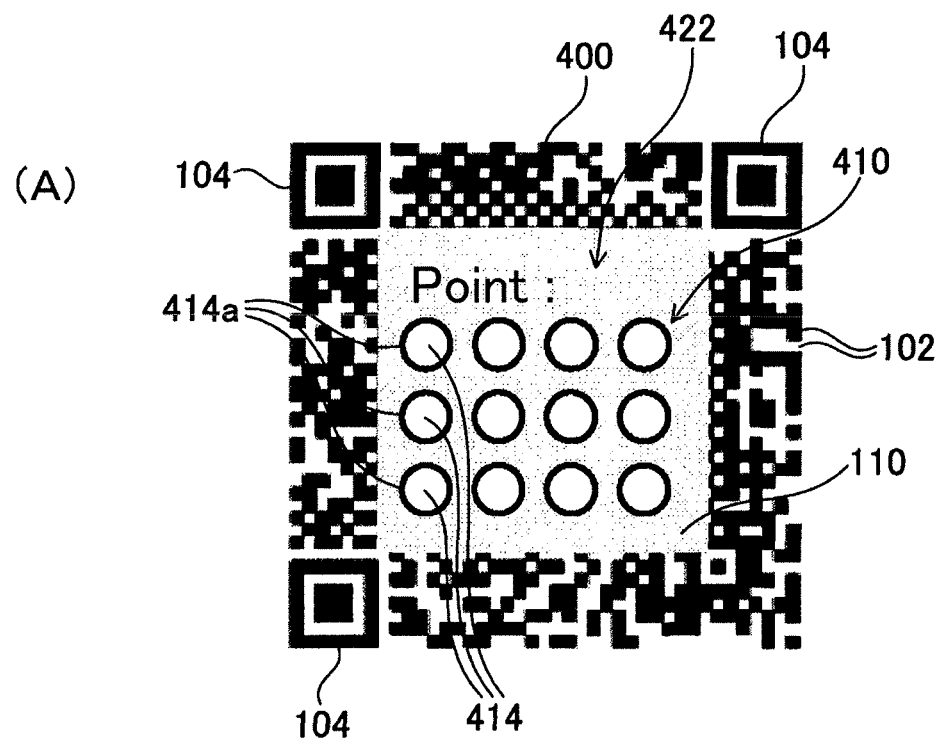
(B)
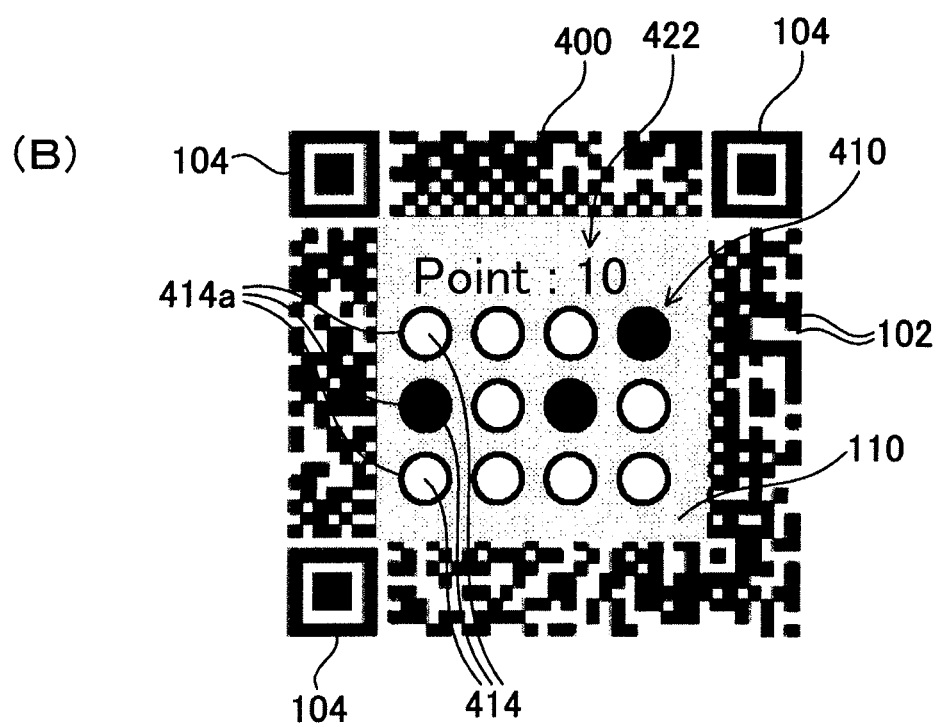

FIG.25
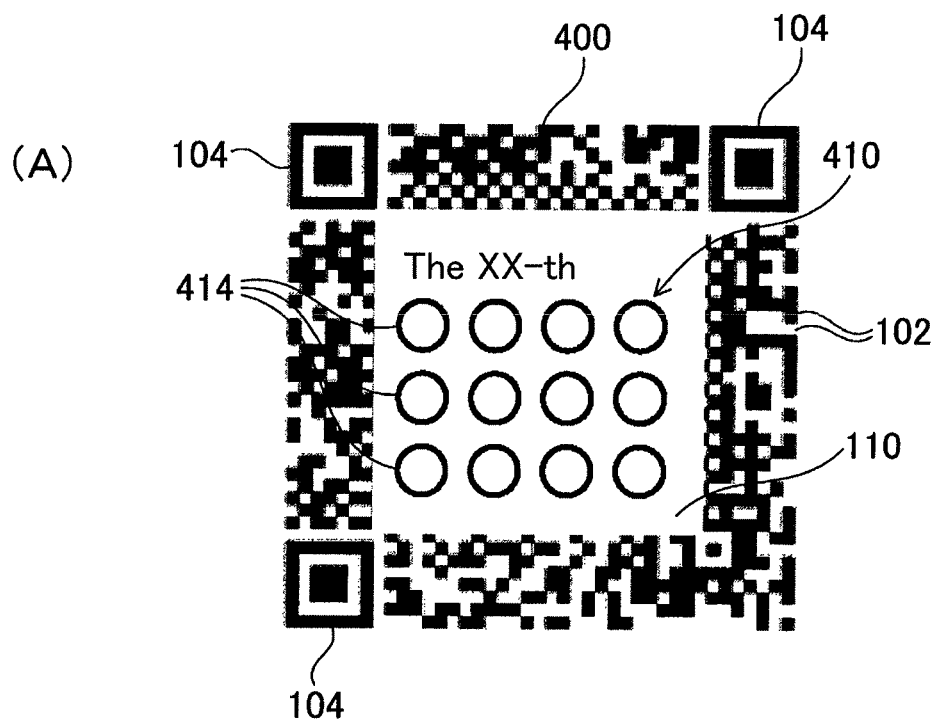
(A)
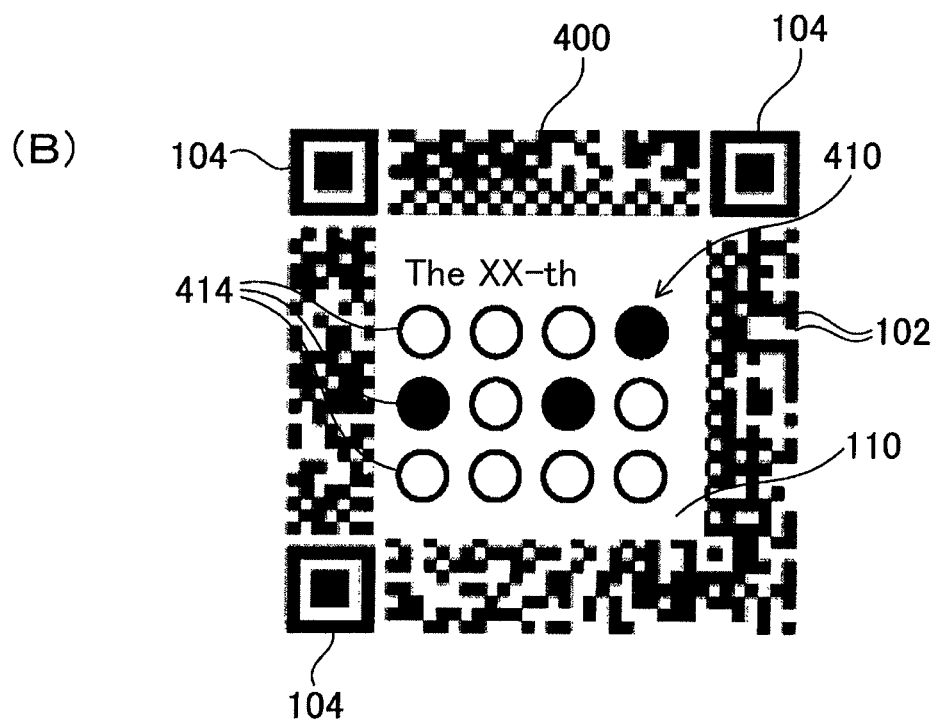
(B)

FIG.26
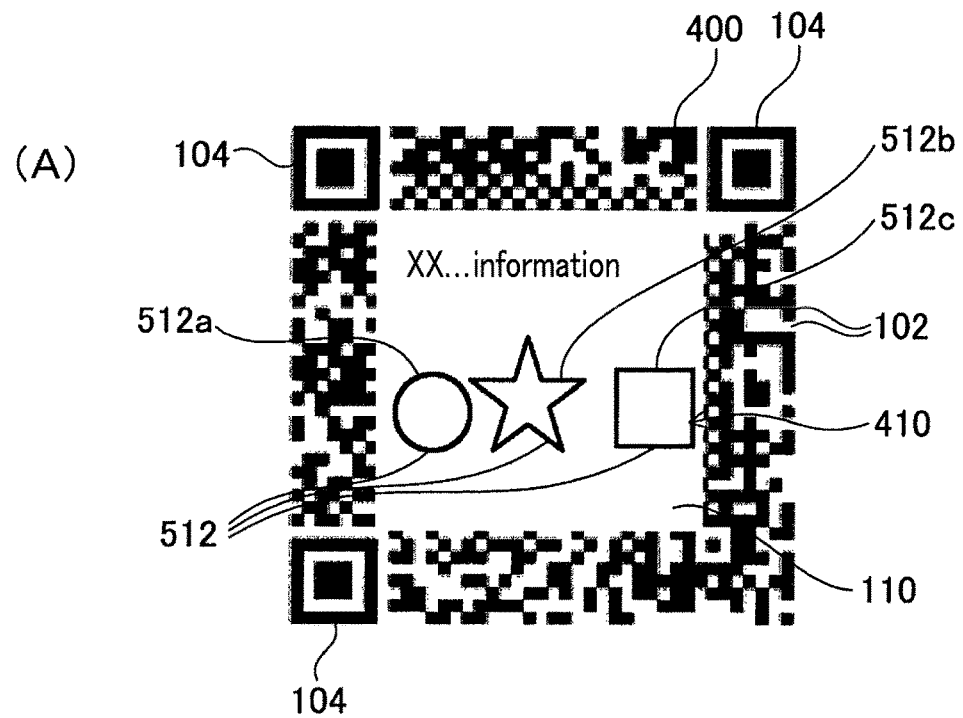
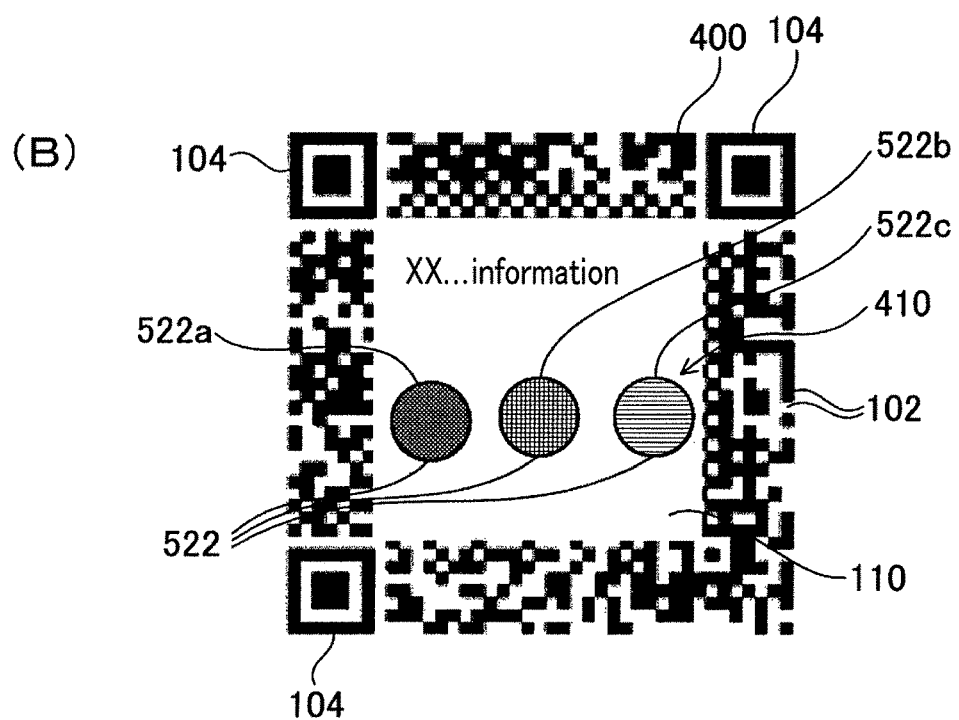

FIG.29
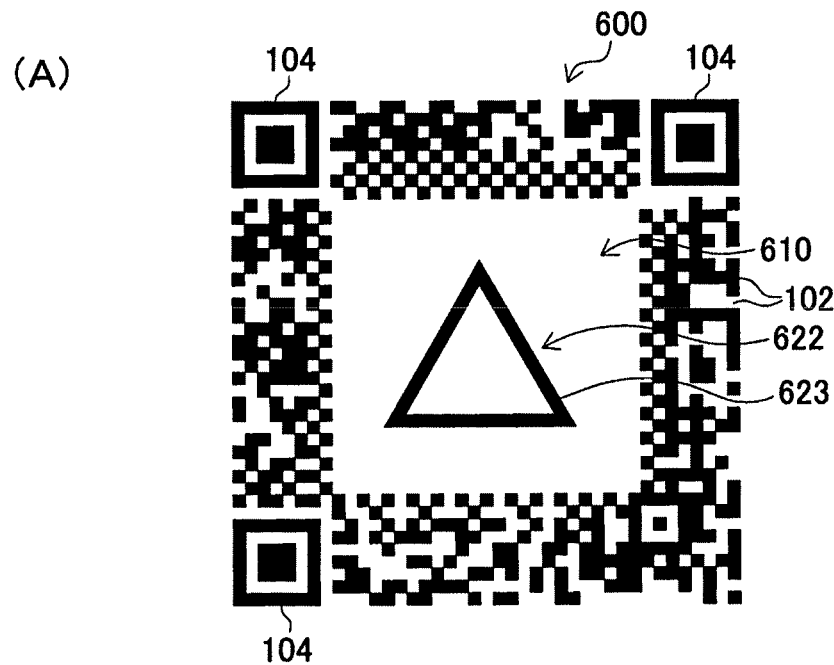
(A)
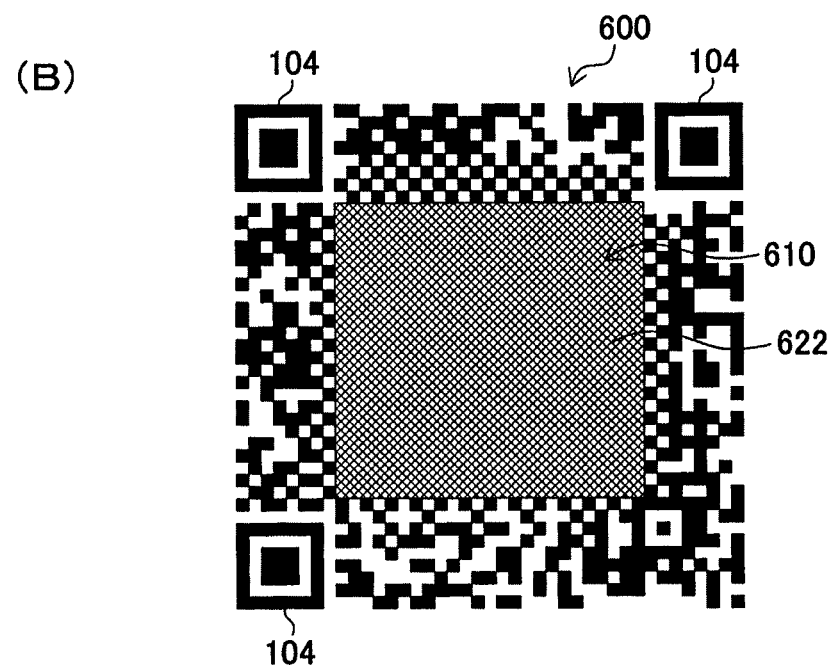
(B)

INFORMATION CODE, INFORMATION CODE PRODUCING METHOD, INFORMATION CODE READER, AND SYSTEM WHICH USES INFORMATION CODE

CROSS-REFERENCE TO RELATED APPLICATIONS

This application is based on and claims the benefit of priority from earlier Japanese Patent Applications:
2012-276910 filed Dec. 19, 2012;
2013-010222 filed Jan. 23, 2013;
2013-196239 filed Sep. 20, 2013; and
2013-255057 filed Dec. 10, 2013,
the descriptions of which are incorporated herein by reference in their entireties.

TECHNICAL FIELD

The present invention relates to an information code such as two-dimensional codes, a production method for producing the information code, a reader that reads the information code, and a system which utilizes an information code.

BACKGROUND ART

Information codes such as two-dimensional codes have now been used in many applications. Such applications include an application in which a picture or a figure is arranged in the code area. For example, a technique provided by patent literature 1 is concerned with a two-dimensional code produced by strings of reverse-converted bits is obtained which bits are reversely converted from strings of bits. These strings of bits form the region of the code, in which the region is composed of a single level. The reverse-converted bit strings are converted based on information about a format for the two-dimensional code, thus producing a unique two-dimensional code with a design region composed of the single gray level.

CITATION LIST

Patent Literature

[PTL 1] JP Patent No. 5057560

SUMMARY OF INVENTION

Technical Problem

In the technique shown by the foregoing patent literature 1, if the unique two-dimensional code has a design region composed of white modules, given design data are combined with the unique two-dimensional code such that a design composed of gray levels which can be read as white is formed in the design region. In contrast, if the unique two-dimensional code has a design region composed of black modules, given design data are combined with the unique two-dimensional code such that a design composed of gray levels which can be read as black is formed in the design region.

However, the technique disclosed by the patent literature 1 fails to a technical idea with which the design region, which has been set, is allowed to be changed in an ex-post manner, which is inconvenient. In addition, in the conventional information codes, including the information code according to the patent literature, data are expressed as arrangements of cells and others and the data compose an object to be read. This means that new data cannot be added to an information code which has been produced already. Hence, when it is desired to additionally record in an information code, the information code itself needs to be re-produced newly, thereby hampering convenience. In particular, in re-producing an information code, an information code producing unit should be prepared in advance, forcing a user to bear the burden in its preparation. The re-production work itself needs a larger labor.

The present invention has been made to overcome the foregoing various problems, and it is an object to provide the configuration in which at least part of the code area of an information code can be used as an information addition region in which additional information is recordable, the additional information being different from the information recorded in the data recording region.

Solution to Problem

A first aspect of the present invention relates to a method of producing an information code by an information code producing apparatus, the information code being formed on a medium and having a code area in which cells are arranged, each cell being a unit for presenting information, characterized in that the method comprises
arranging in the code area a specification pattern region in which specification pattern s of predetermined shapes, the specification pattern s including patterns indicating a position of the code area; a data recording region in which data are recorded by a plurality of types of the cells; and an information addition region in which additional information is recordable, which is different from information shown by the data recorded in the data recording region.

A second aspect of the present invention relates to an information code being formed on a medium and having a code area in which cells are arranged, each cell being a unit for presenting information, characterized in that
the code comprises, in the code area, a specification pattern region in which specification pattern s of predetermined shapes, the specification pattern s including patterns indicating a position of the code area; a data recording region in which data are recorded by a plurality of types of the cells; and an information addition region in which additional information is recordable, which is different from information shown by the data recorded in the data recording region.

A third aspect of the present invention relates to an information code reader which reads an information code being formed on a medium and having a code area in which cells are arranged, each cell being a unit for presenting information,
characterized in that
the code comprises, in the code area, a specification pattern region in which specification pattern s of predetermined shapes, the specification pattern s including patterns indicating a position of the code area; a data recording region in which data are recorded by a plurality of types of the cells; and an information addition region in which additional information is recordable, which is different from information shown by the data recorded in the data recording region;
an imaging unit imaging the information code;
a data-recording-region reading section reading the data recorded in the data recording region based on contents in the data recording region in an imaged code image of the information code when the information code is imaged by the imaging unit; and an additional-information acquiring section analyzing contents in the information addition region of the code image to acquire the additional information added in the information addition region.

A fourth aspect of the present invention relates to a system which utilizes an information code, characterized in that the system comprising an information code producing apparatus producing the information code being formed on a medium and having a code area in which cells are arranged, each cell being a unit for presenting information; and an information code reader reading the information code produced by the information code producing apparatus, wherein the information code producing apparatus produces the information code such that the code comprises, in the code area, a specification pattern region in which specification pattern s of predetermined shapes, the specification pattern s including patterns indicating a position of the code area; a data recording region in which data are recorded by a plurality of types of the cells; and an information addition region in which additional information is recordable, which is different from information shown by the data recorded in the data recording region; and the information code reader comprises an imaging unit imaging the information code produced by the information code producing apparatus;

a data-recording-region reading section reading the data recorded in the data recording region based on contents in the data recording region in an imaged code image of the information code when the information code is imaged by the imaging unit; and an additional-information acquiring section analyzing contents in the information addition region of the code image to acquire the additional information added in the information addition region.

Advantageous Effects of Invention

In an exemplary embodiment, it is possible to produce an information code with a code area in which there are formed a data recording region in which information is recorded and an information addition region in which additional information is recordable which is different from information recorded in the data recording region. Hence the additional information recorded in the information addition region can thus be used in an ex-post manner.

In an exemplary embodiment, it is possible to structure an information code with a code area in which there are formed a data recording region in which information is recorded and an information addition region in which additional information is recordable which is different from information recorded in the data recording region. Hence, in addition to decoding information recorded in the data recording region, the additional information recorded in the information addition region can thus be used in an ex-post manner.

In an exemplary embodiment, it is possible to provide a reader reading an information code in which information is recorded in the data recording region and additional information different from the information recorded in the data recording region can be recorded in the information addition region. Hence, the additional information recorded in the information addition region can be used in an ex-post manner.

In an exemplary embodiment, it is possible to provide an information code provided with a code area in which an information addition region is formed. In this information addition region, additional information is recordable which is different from information recorded in the data recording region, whereby a system is realized in which the additional information recorded in the information addition region can be used after providing the code.

In any of the foregoing systems, the information code producing apparatus can be provided with the data acquiring section, the arrangement-position-information recording part, and the data-recording-region producing section. The data acquiring section acquires data being interpreted. In the arrangement-position-information recording part, arrangement position information is recorded which specifies arrangement positions of the code area, at respective of which plural data words expressing the data being interpreted are arranged. When the free space is placed in the code area, format information is recorded at a predetermined position in the code area in a specific format configuration and respective data words expressing the data being interpreted and acquired by the data acquiring section are arranged in the data recording region based on the arrangement position information. Both the format information recording and the data words arrangement are performed by the data-recording-region producing section.

In contrast, the information code reader includes the correspondence information recording part, the determining section, and the interpreting section. In the correspondence information recording part, correspondence information is recorded which corresponds to the arrangement position information recorded in the arrangement-position-information recording part and specifies respective arrangement positions of plural data words being mapped in the code area. The determining section determines whether or not there is a specific format configuration at the predetermined position in the code area when the information code is imaged by the imaging unit. Further, the interpreting section specifies the positions of the respective data words in the code area with use of the correspondence information when the determining section determines that there is the specific format configuration, and interprets the specified data words as the data being interpreted.

Accordingly when the determining section of the reader can confirm the format configuration arranged at the predetermined positions. That is, it is possible to determine if or not an information code now being checked is the distinguishing information code (having the free space) produce by the information code producing apparatus. When being determined to be such distinguishing information code, the information (i.e., the correspondence information) capable of specifying the arrangement positions of plural data words in the code area is used for specifying such arrangement positions, thus interpreting the data being interpreted.

In this case, in the data-recording-region producing section of the information code producing apparatus, the cell arrangements at the predetermined positions are configured in a state where the arrangements are reflected by a predetermined type of mask pattern if the free space is arranged in the code area. Hence, the determining section of the reader is configured to determine whether or not the predetermined type of mask pattern is reflected in the cells at the predetermined positions in response to imaging the information code by the imaging unit. The interpreting section of the reader then interprets data to be interpreted, when the predetermined type of mask pattern has been applied to the cells at the predetermined positions.

In this configuration, whether or not the information code (having the fee space), which is to be produced by the information code producing apparatus, is a distinguishing information code can be determined reliably depending which type of mask pattern is applied at the predetermined positions. In consequence, an amount of data necessary for providing the format information can be avoided from being increased, while being still easier to configure the specific format.

Moreover, the arrangement position information defines correspondence between plural data words to be ordered for expressing data being interpreted and arrangement positions of the ordered data words in the code area. This information functions as a rule that regulates the data words being ordered in their arrangement positions in the code area, to correspondent positions in the other type of code used when being expressed differently from the information code. The interpreting section operates when the determining section determines that the cells at the predetermined positions have the specific format configuration, and interprets the other type of code under the condition that the data words being ordered in their arrangement positions in the code area are replaced by cells arranged at the corresponding positions in the other type of code.

In this configuration, it is thus possible to read well the distinguishing information code (having the free space) by using the reading scheme for the other type of code.

Figure 1:
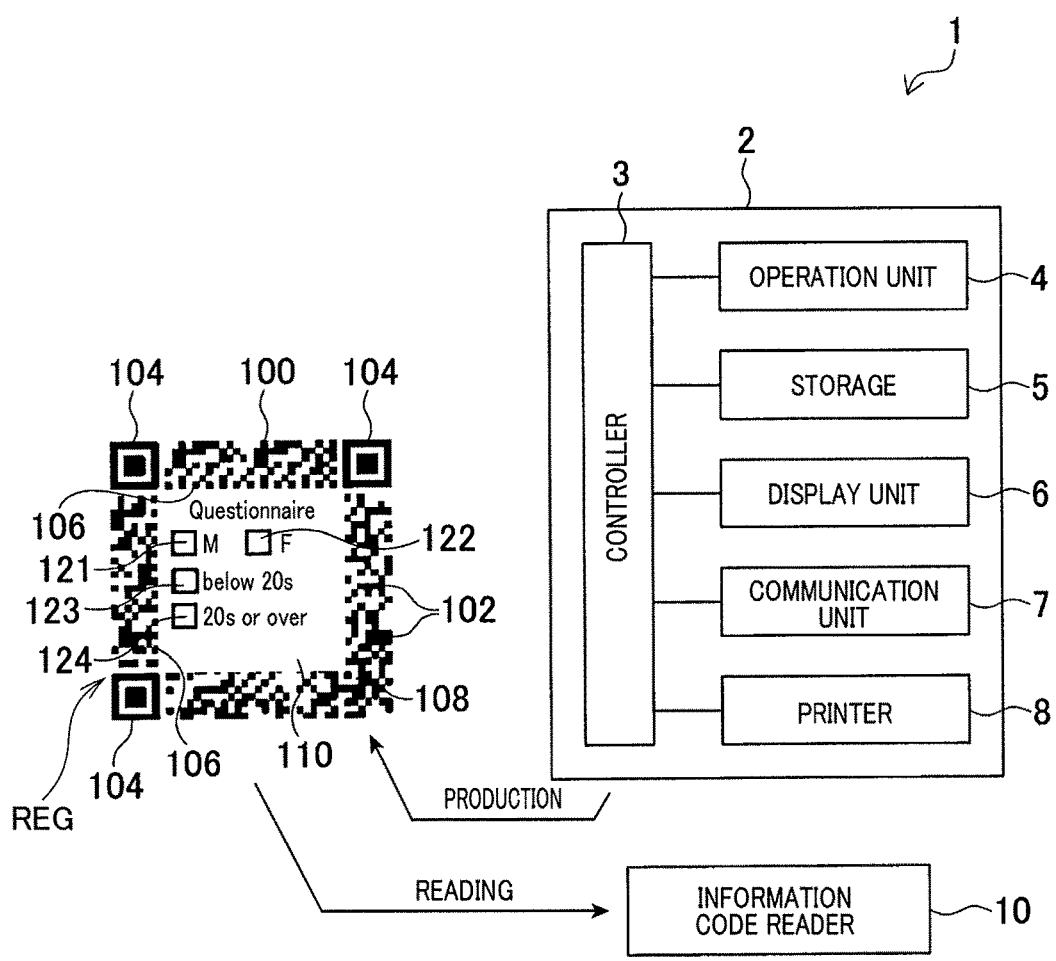
FIG. 1 is an outlined view exemplifying an outlined information-code utilization system according to a first embodiment of the present invention.
Figure 7:
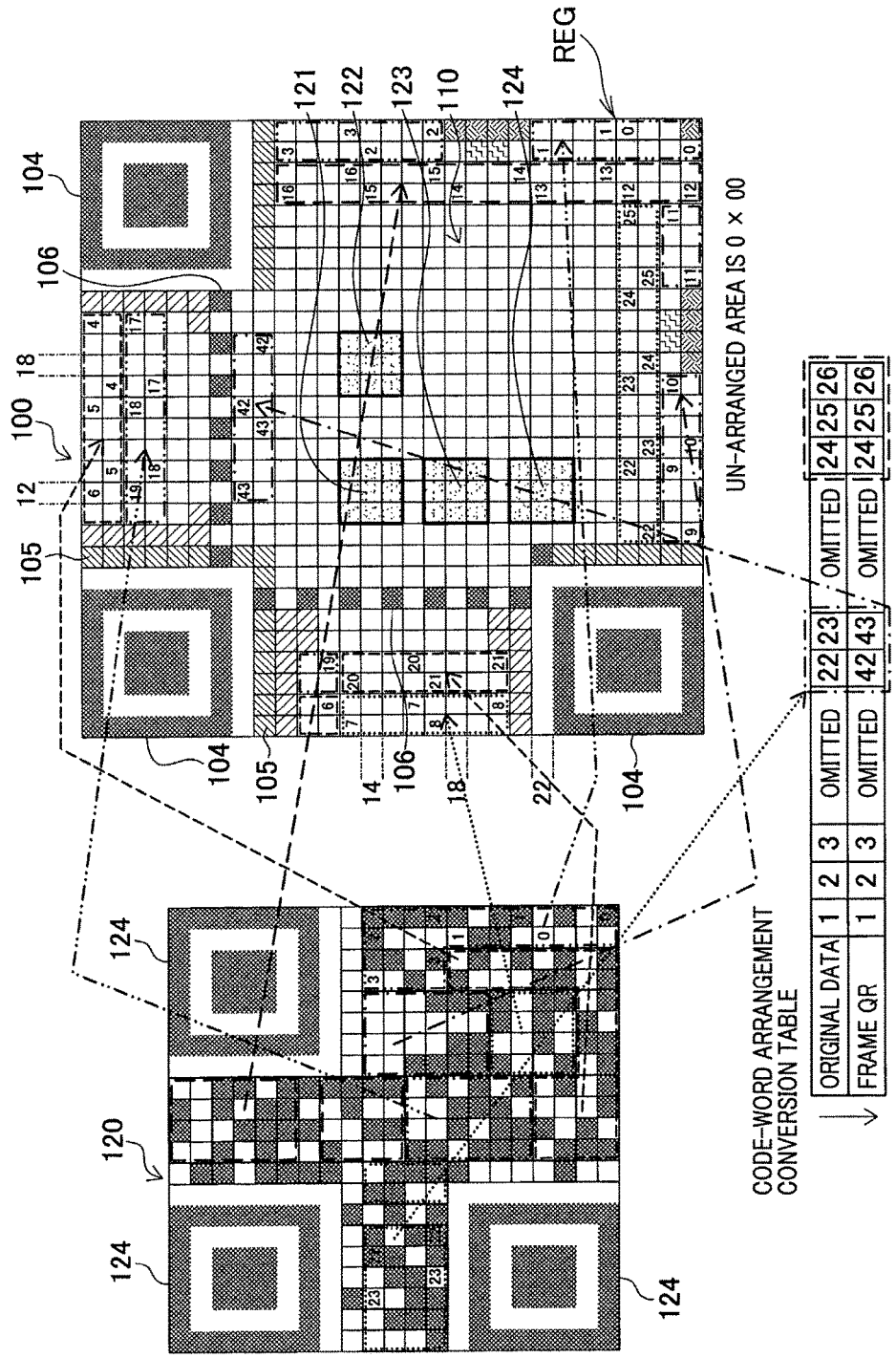
FIG. 7 is an illustration explaining a correspondence relationship between arrangements of respective data words in the information code produced by an information code producing apparatus and arrangements of data words in another type of code, the information code producing apparatus composing part of the information-code utilization system shown in FIG. 1, the correspondence relationship being different from that shown in FIG. 5.
Figure 11:
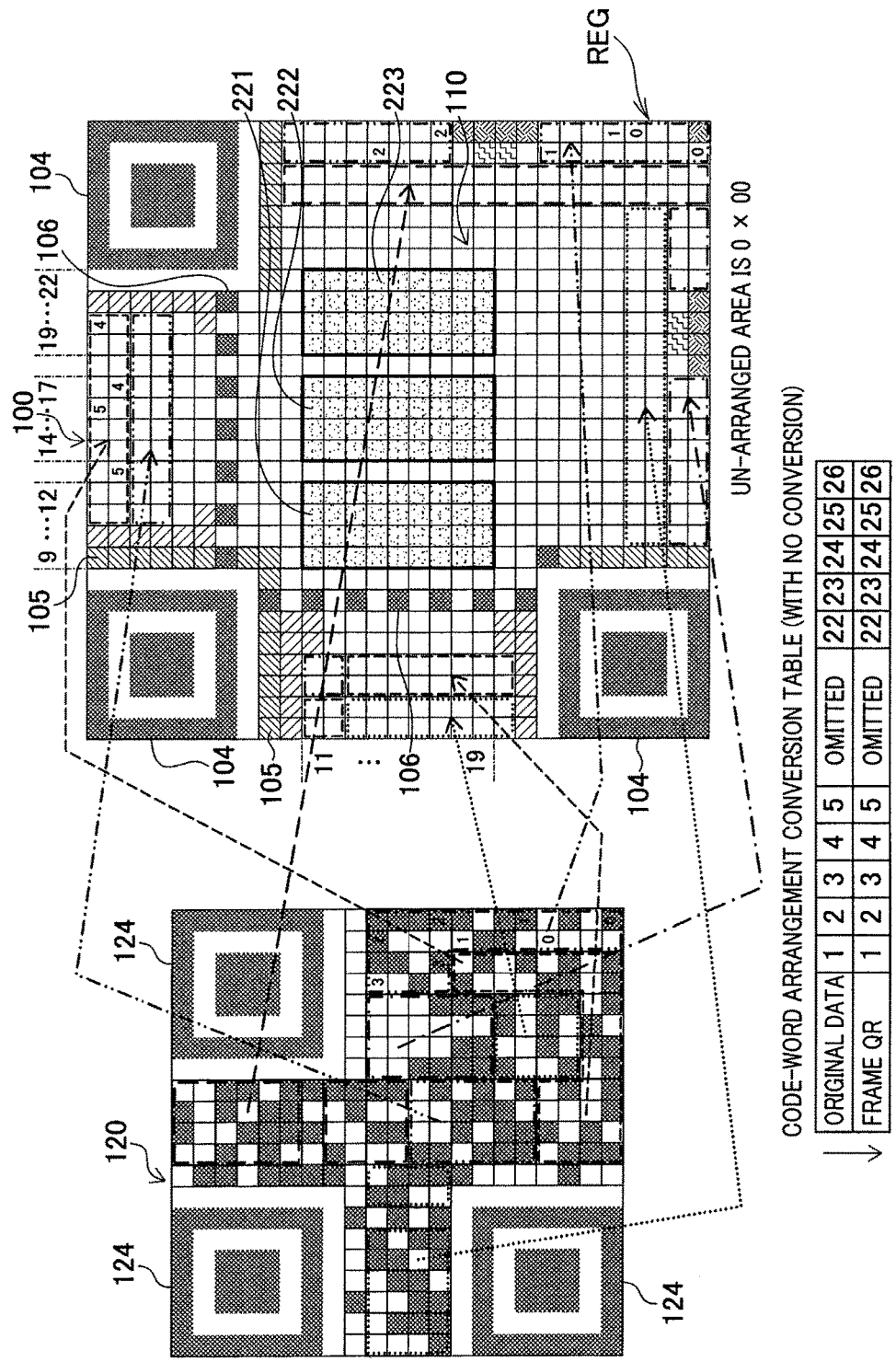
Figure 12:
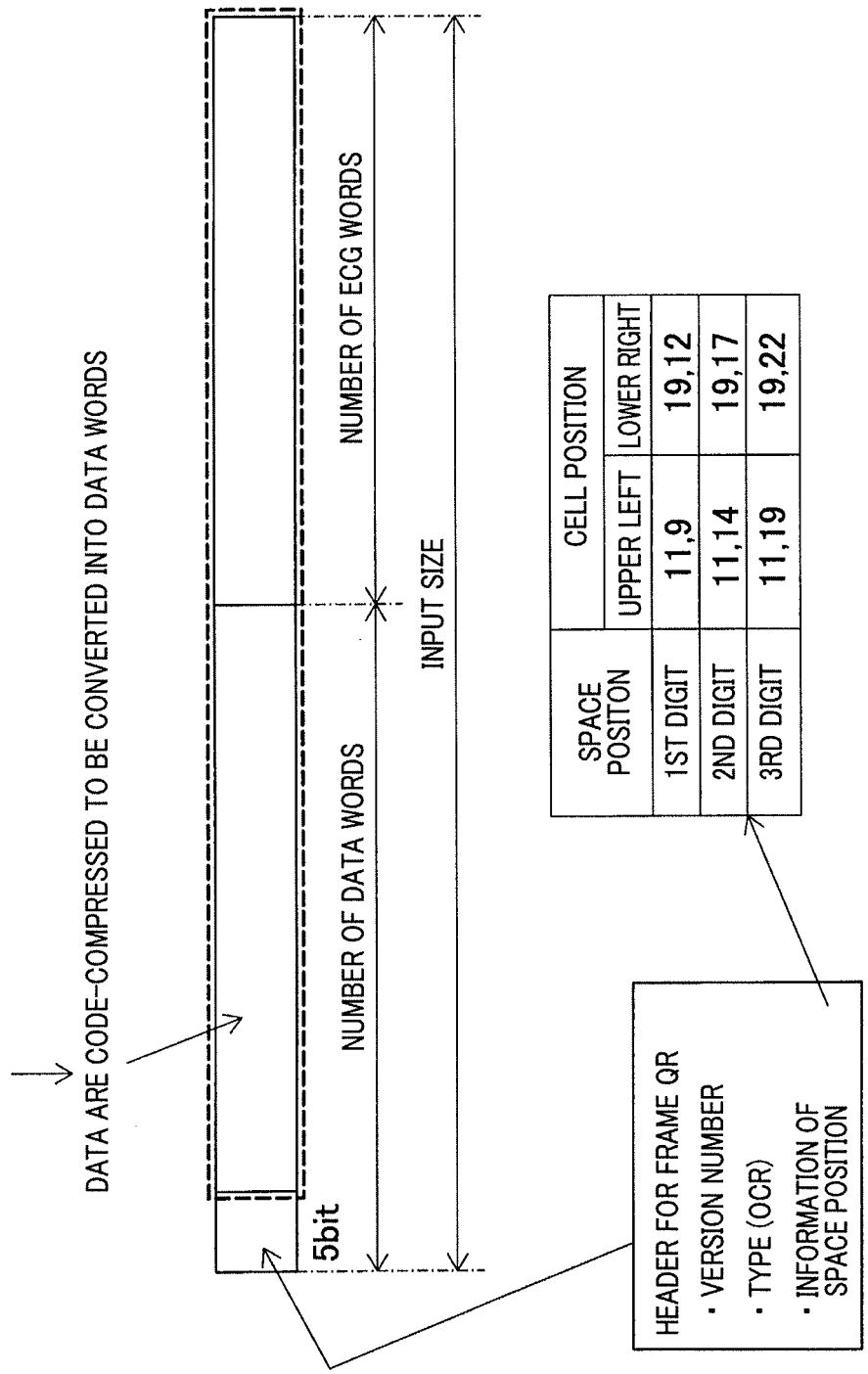
Figure 13:
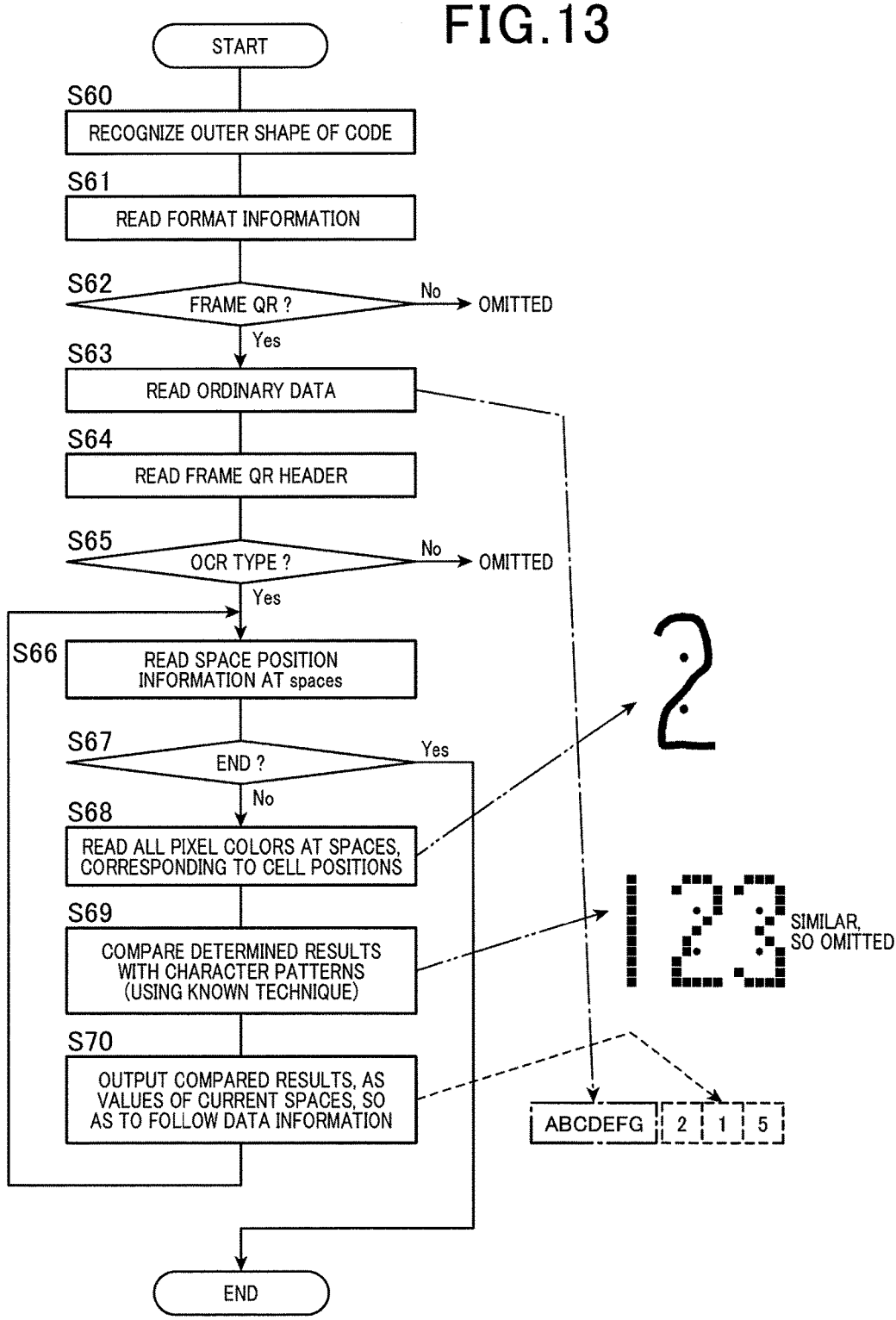
Figure 15:
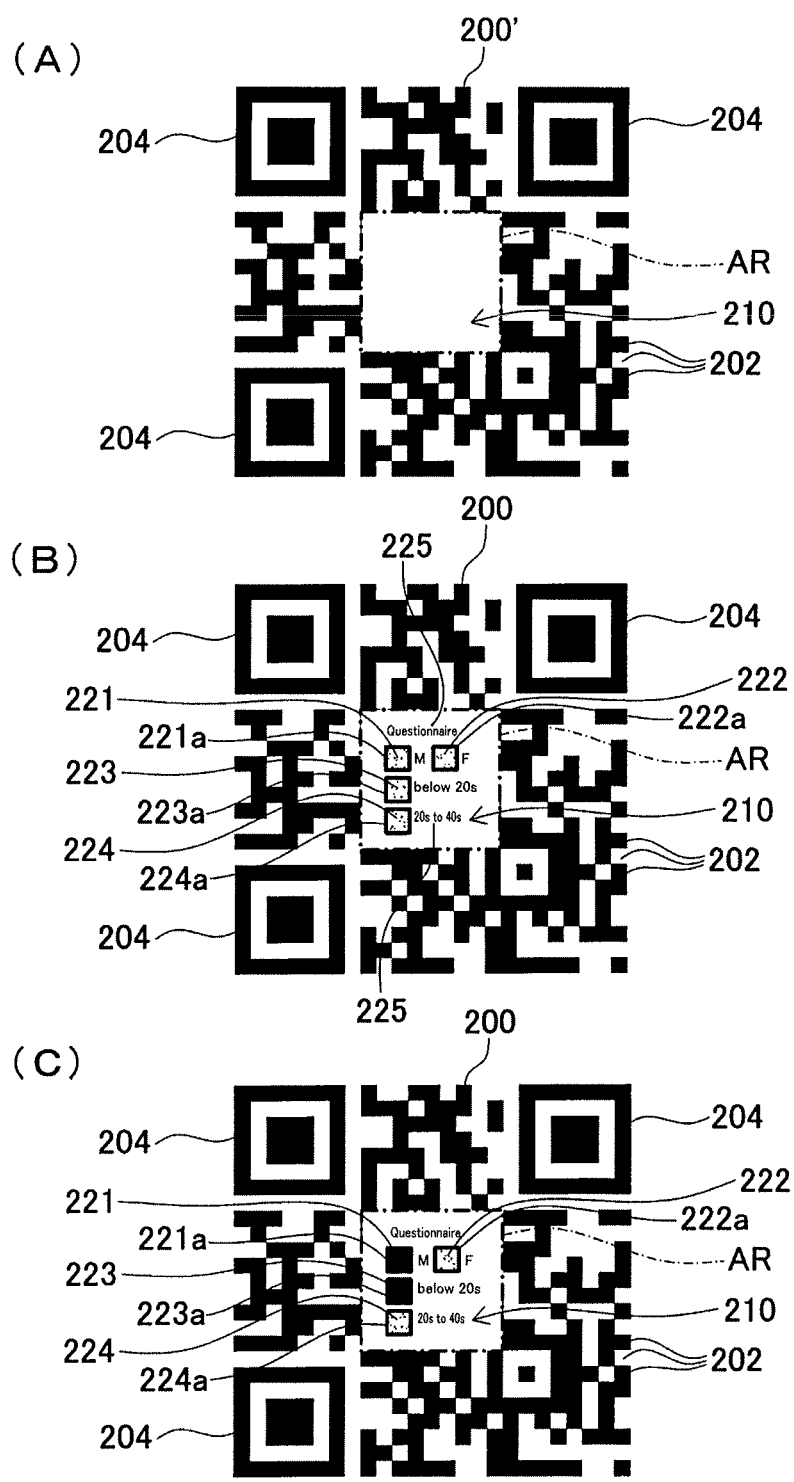
Figure 16:
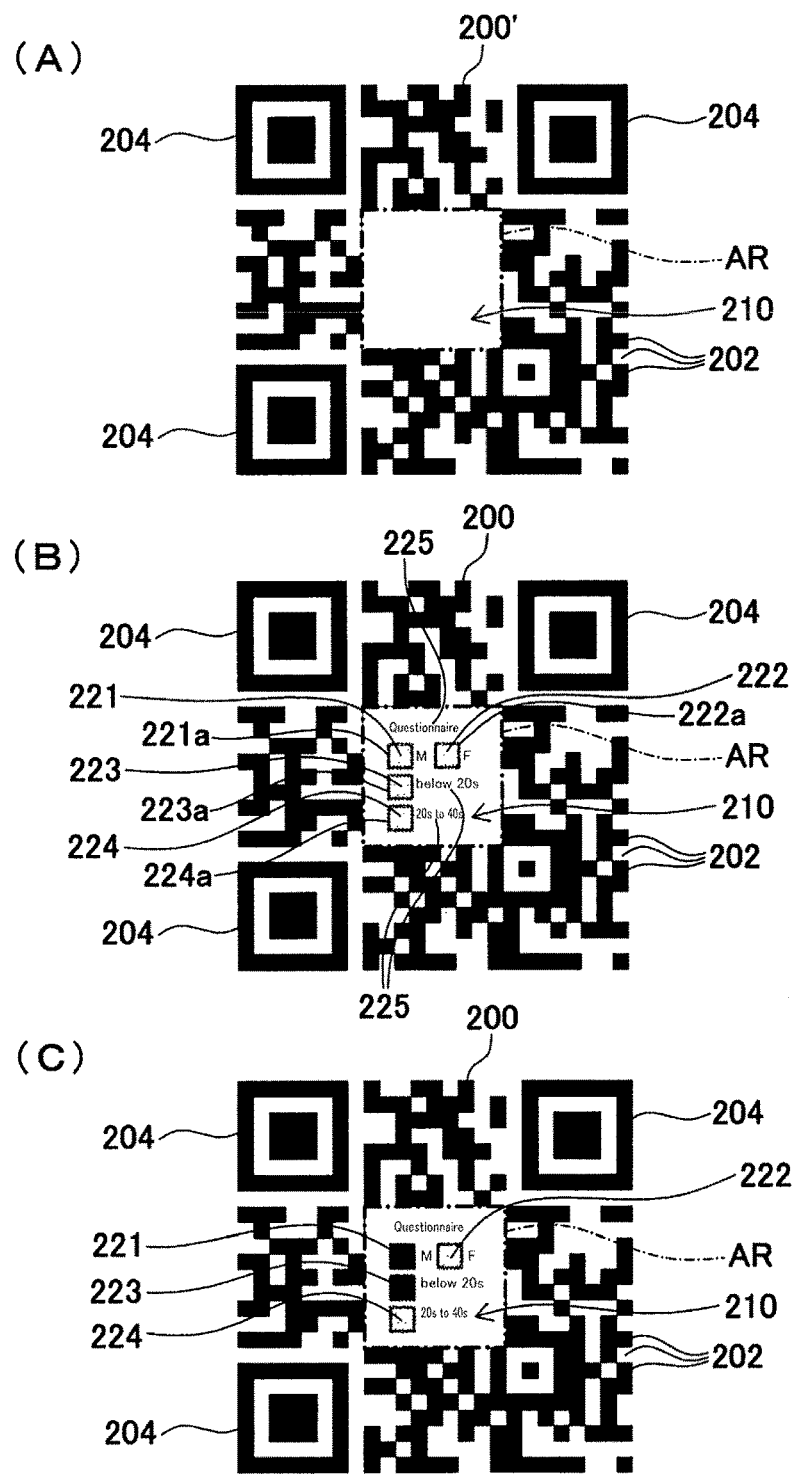
Figure 17:
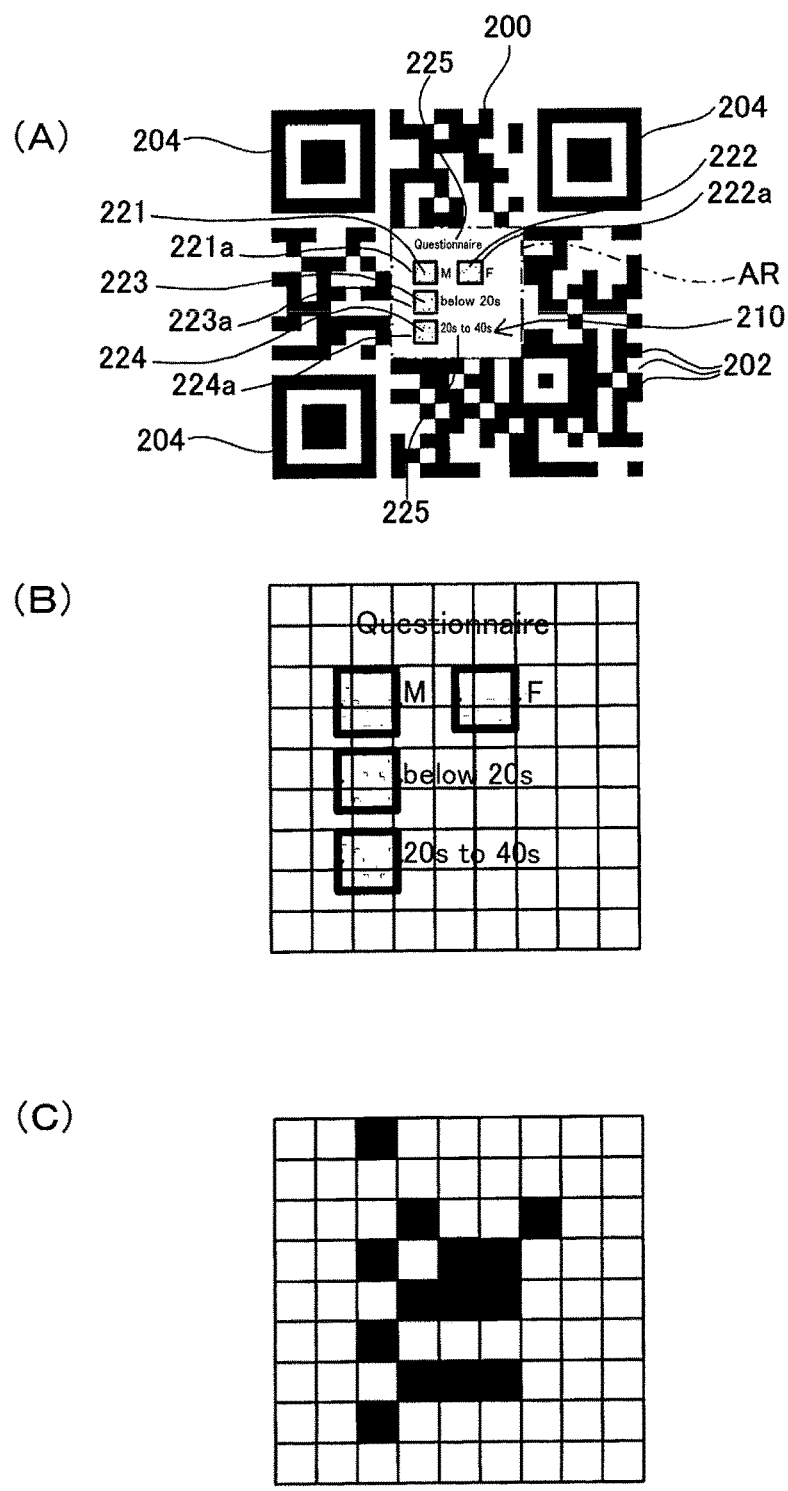
Figure 20:
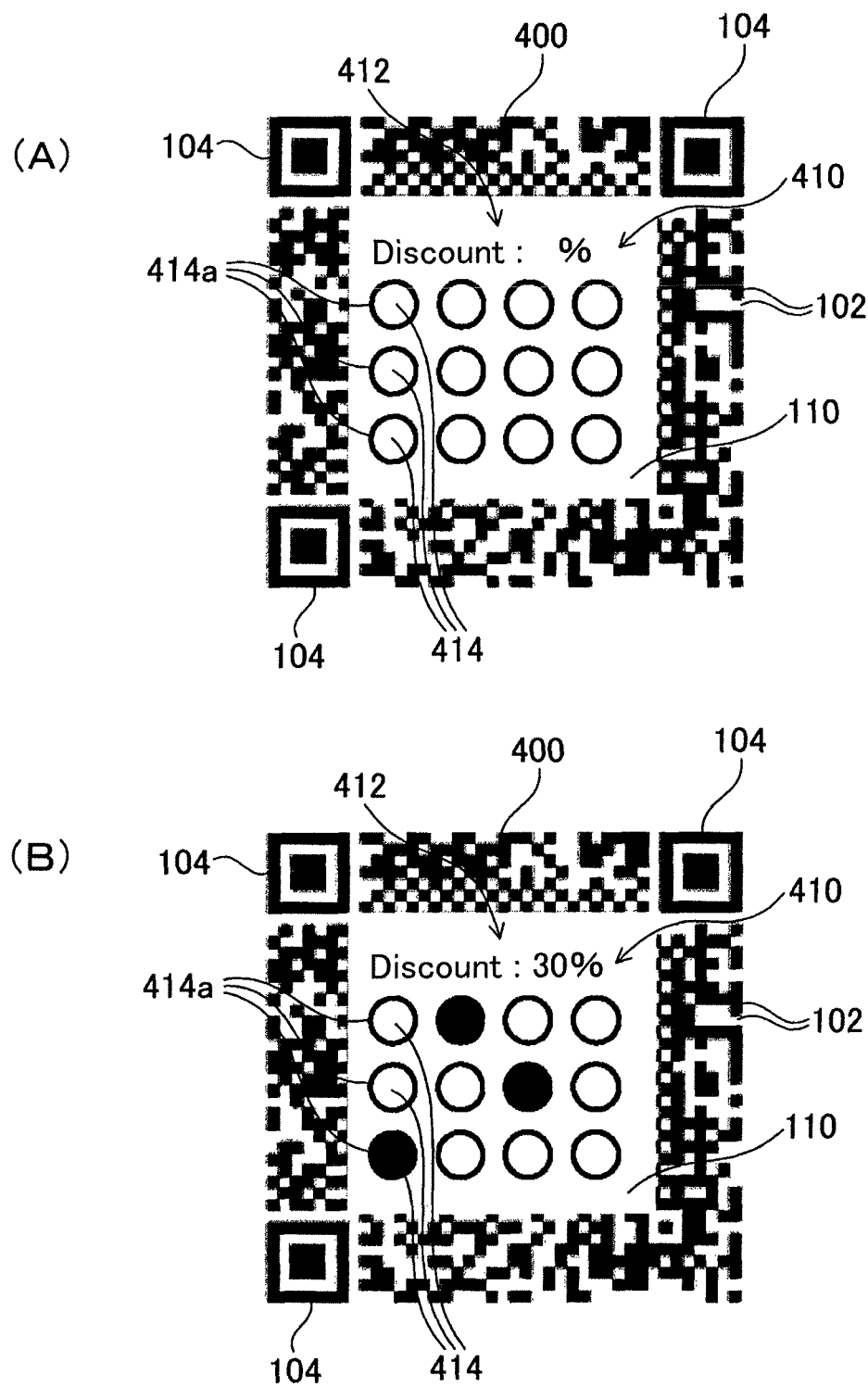
Figure 21:
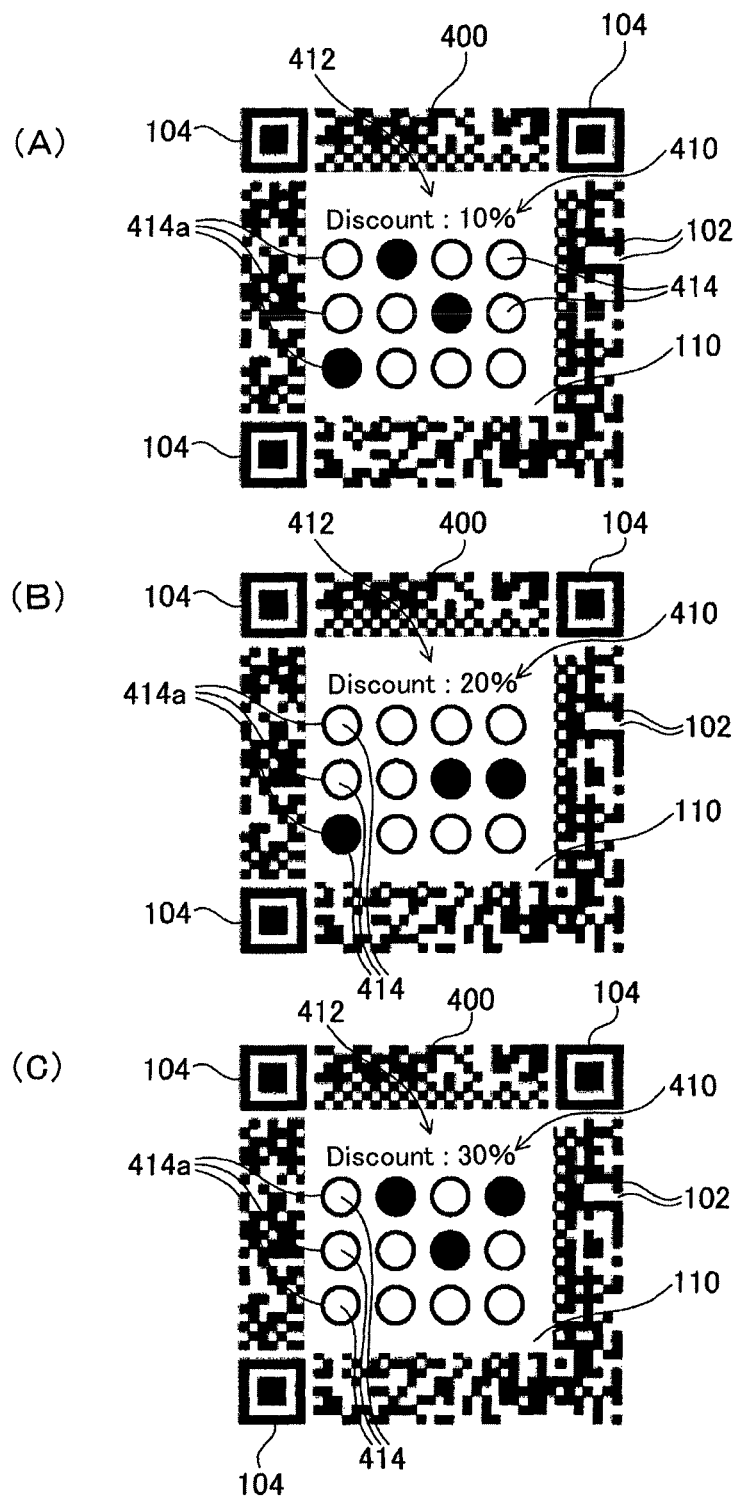
Figure 23:
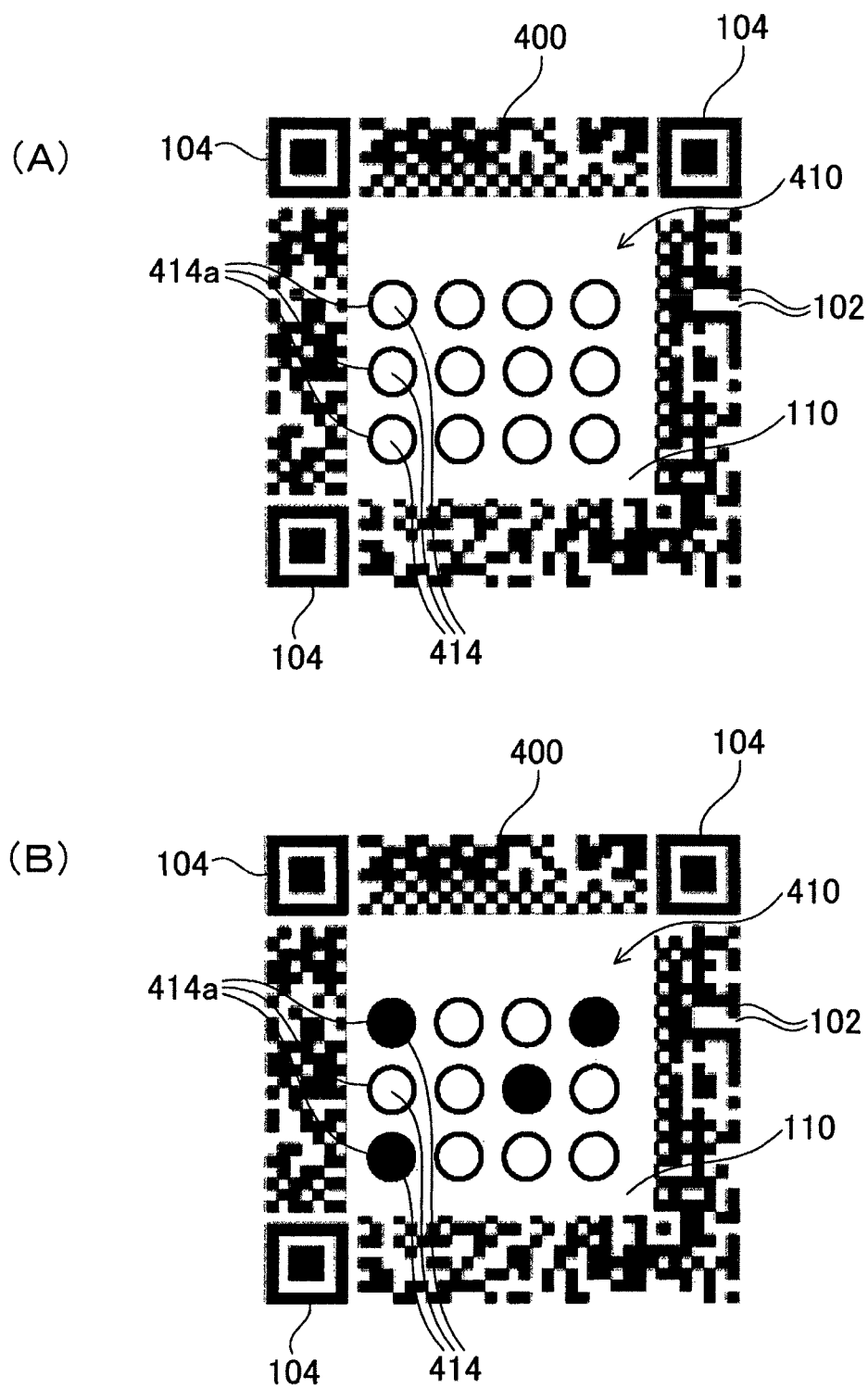
Figure 27:
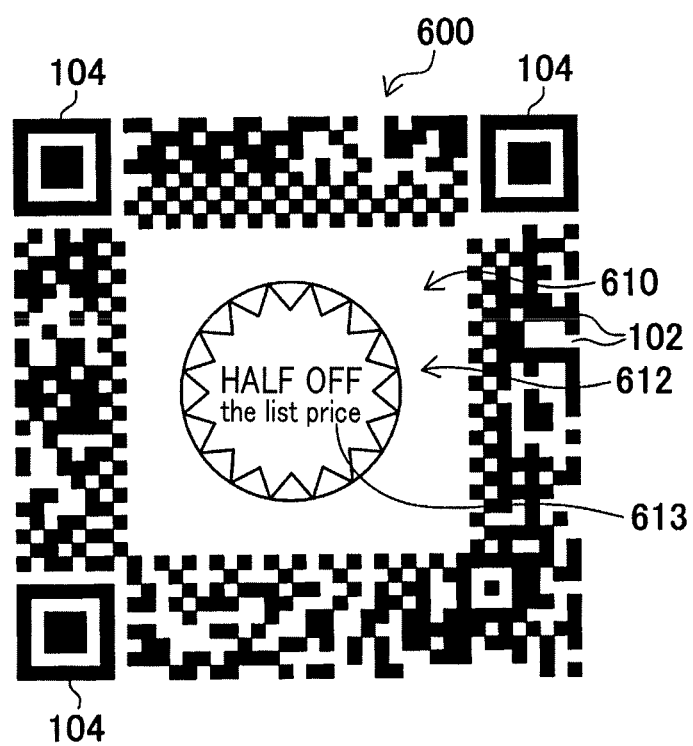
Figure 28:
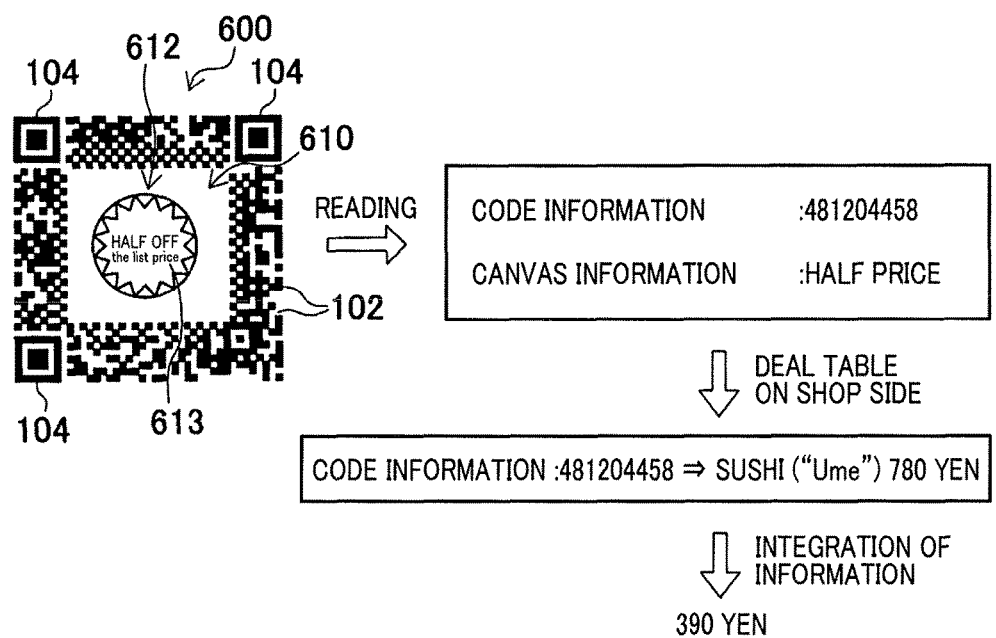
Figure 30:
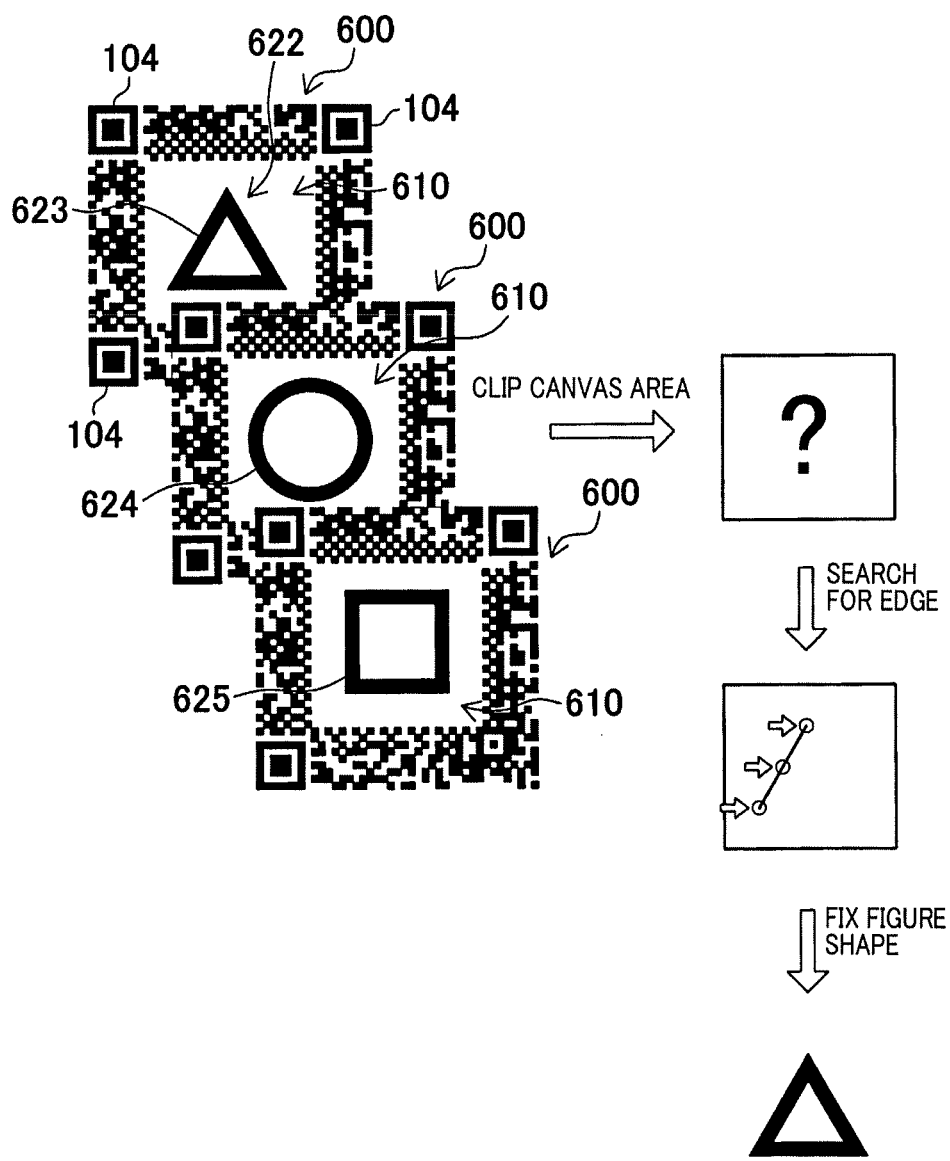
Figure 31:
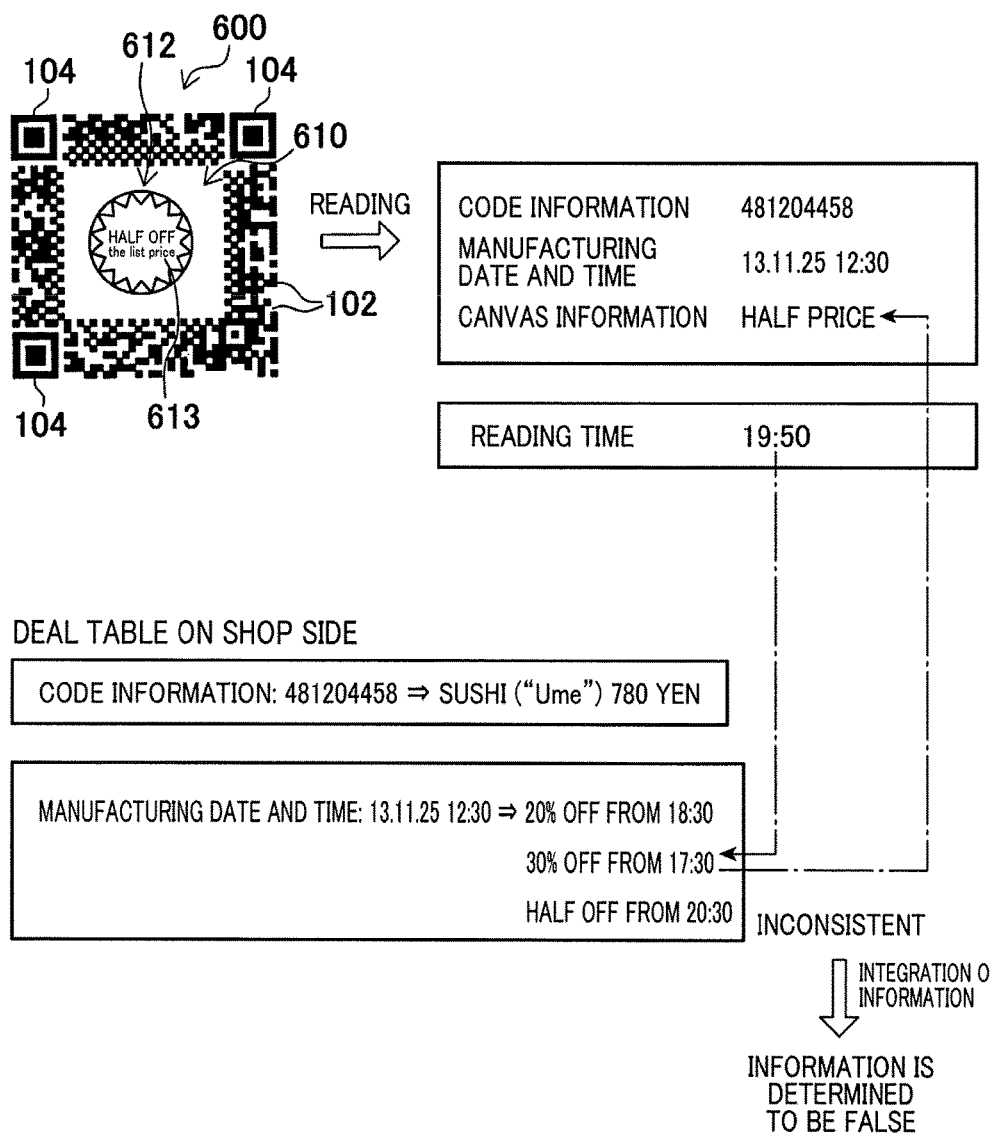
Figure 32:
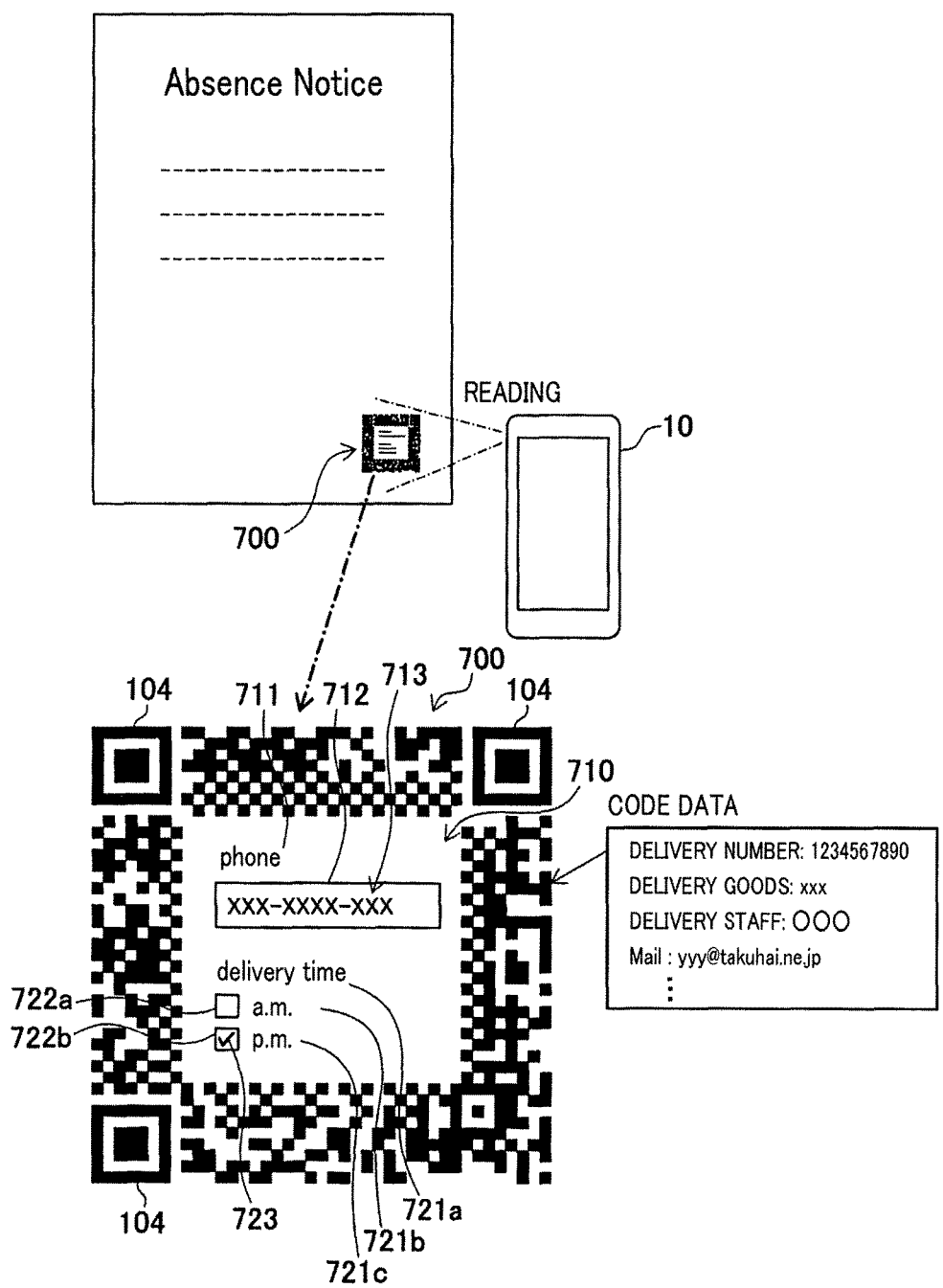
Figure 33:
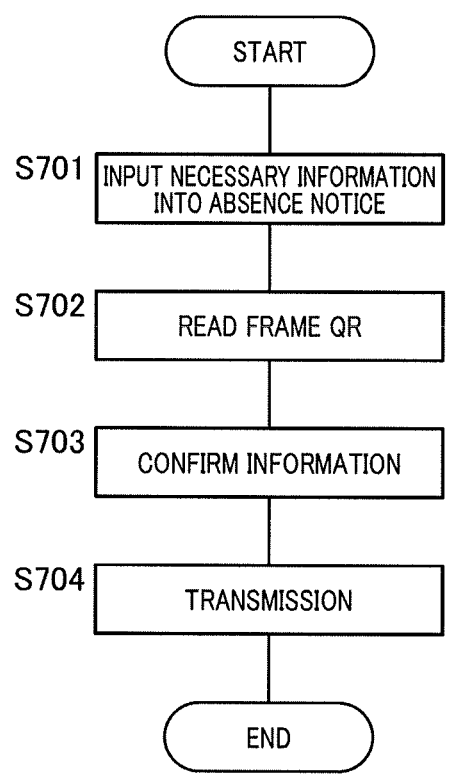
Figure 34:
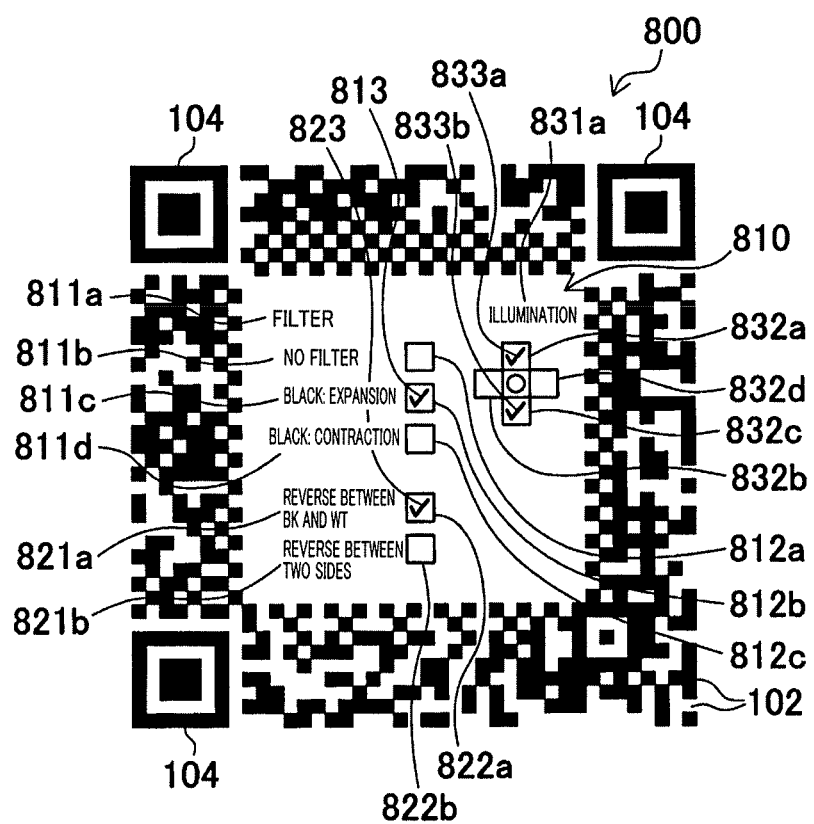
Figure 35:
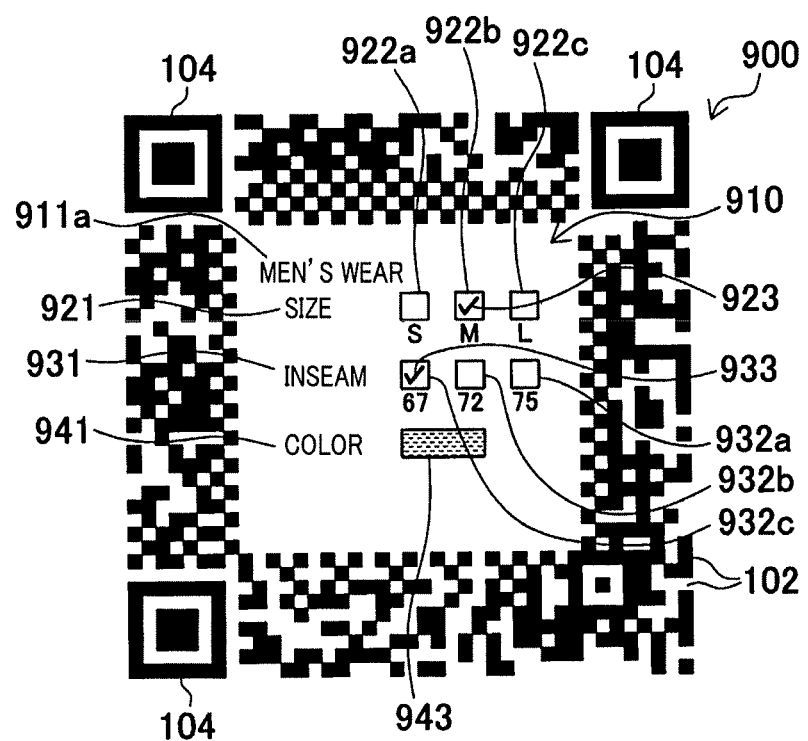
Figure 36:
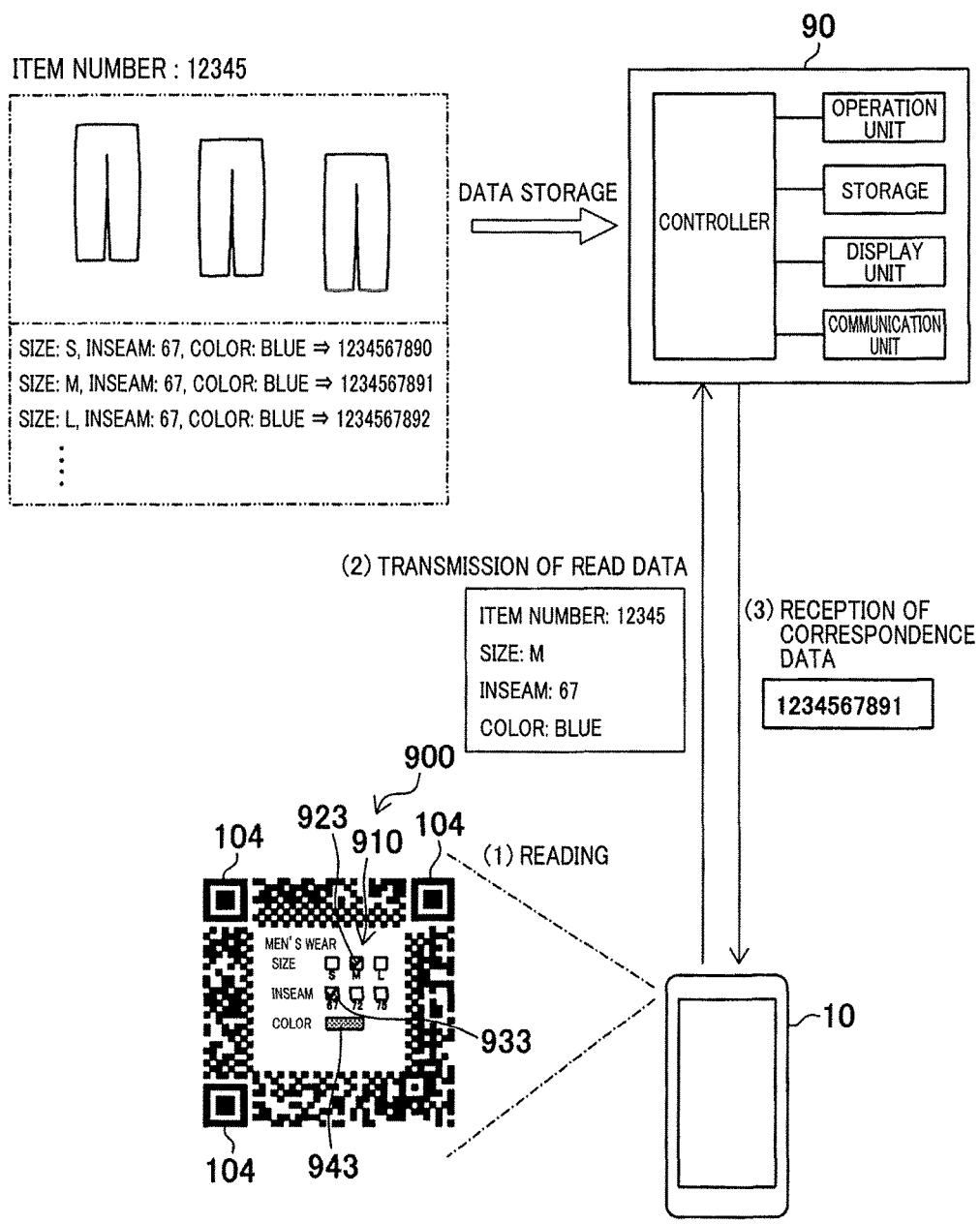
Figure 37:
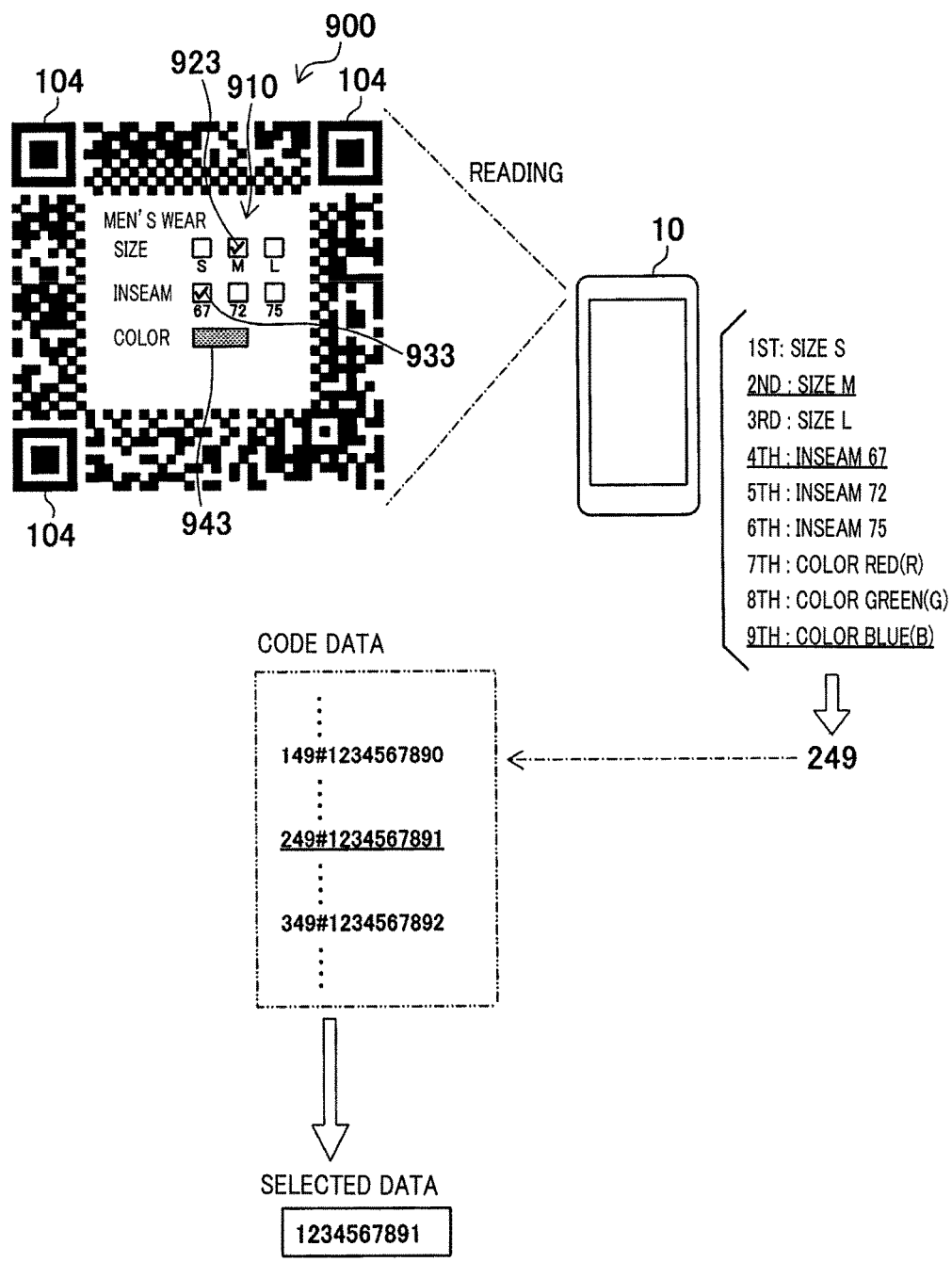
Figure 38:
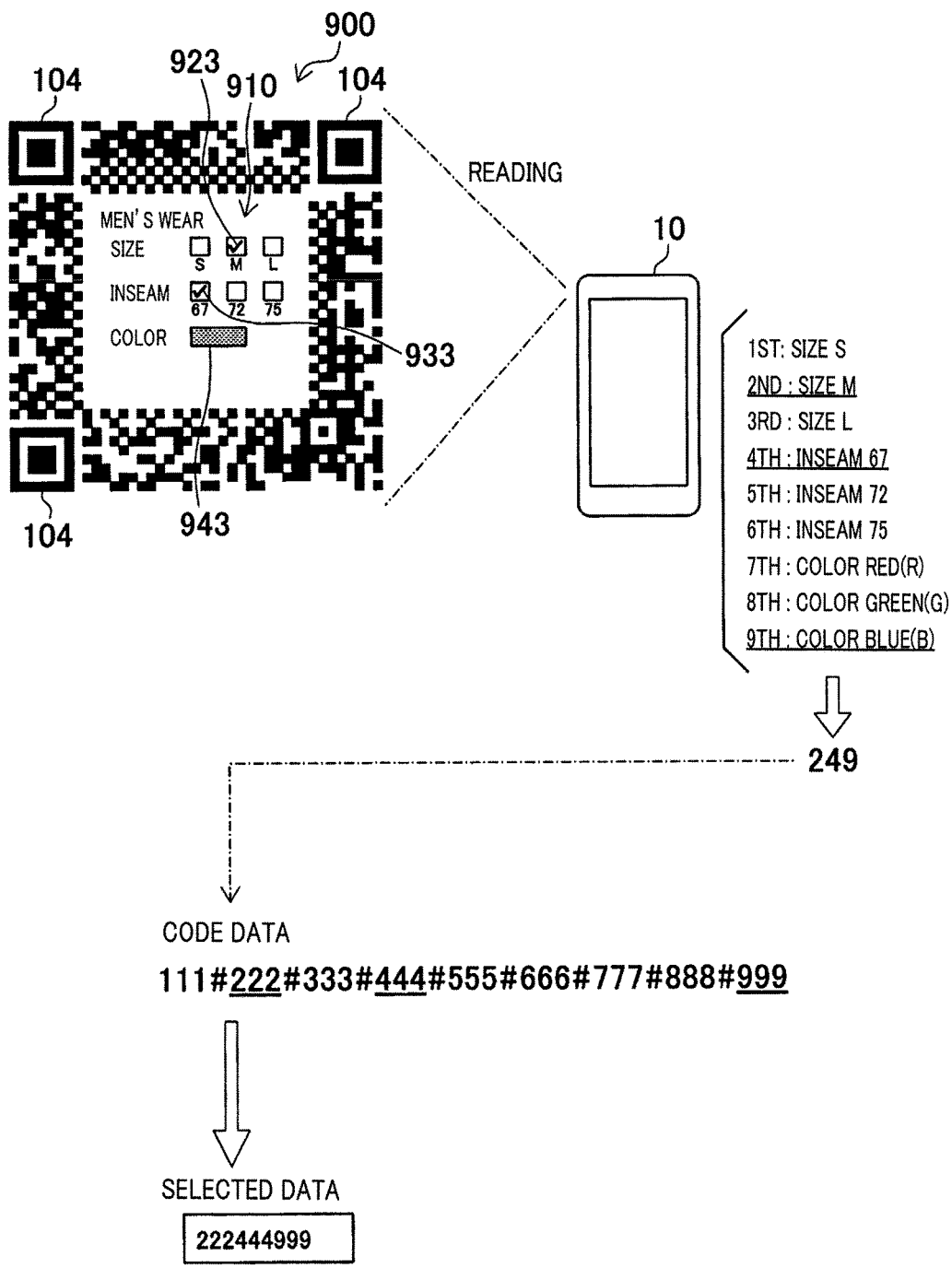
Figure 39:
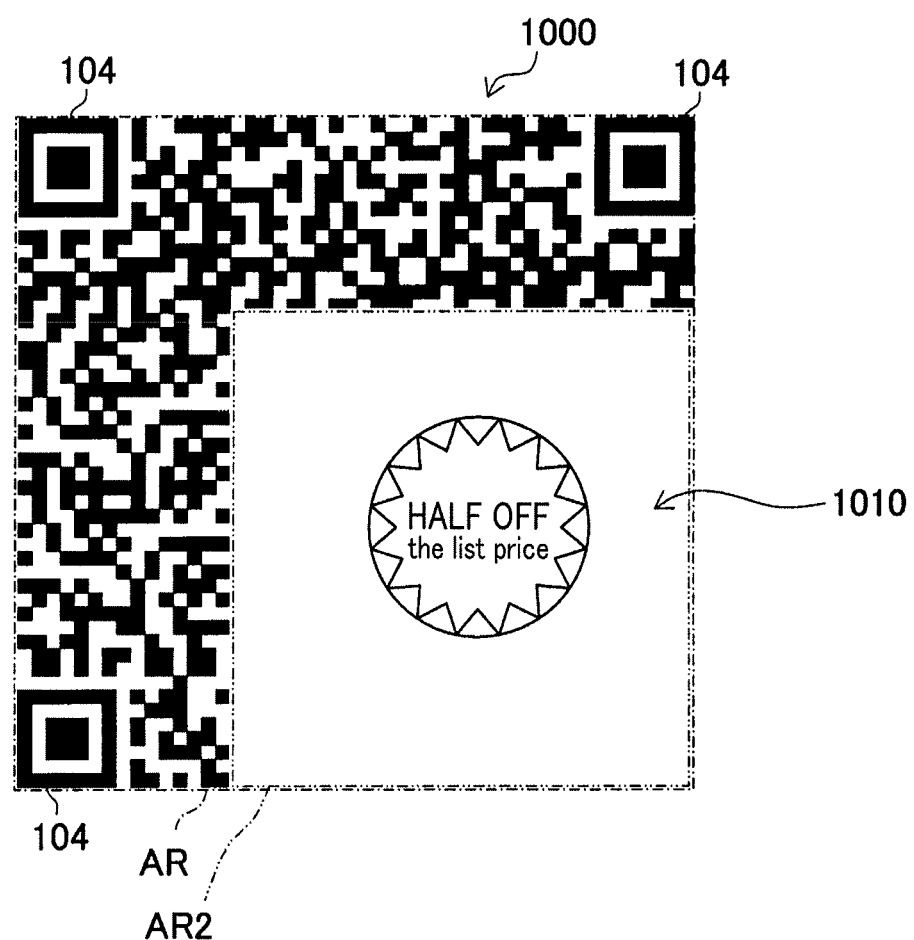
Figure 40:
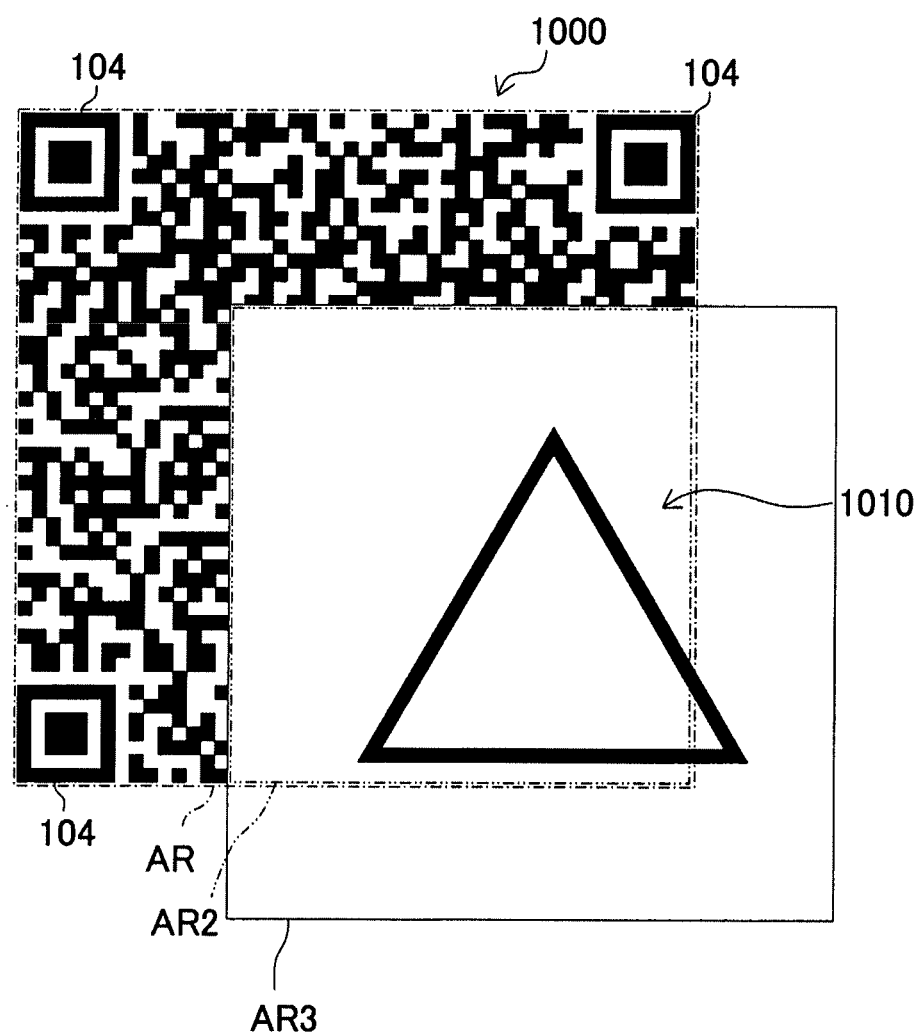
Figure 41:
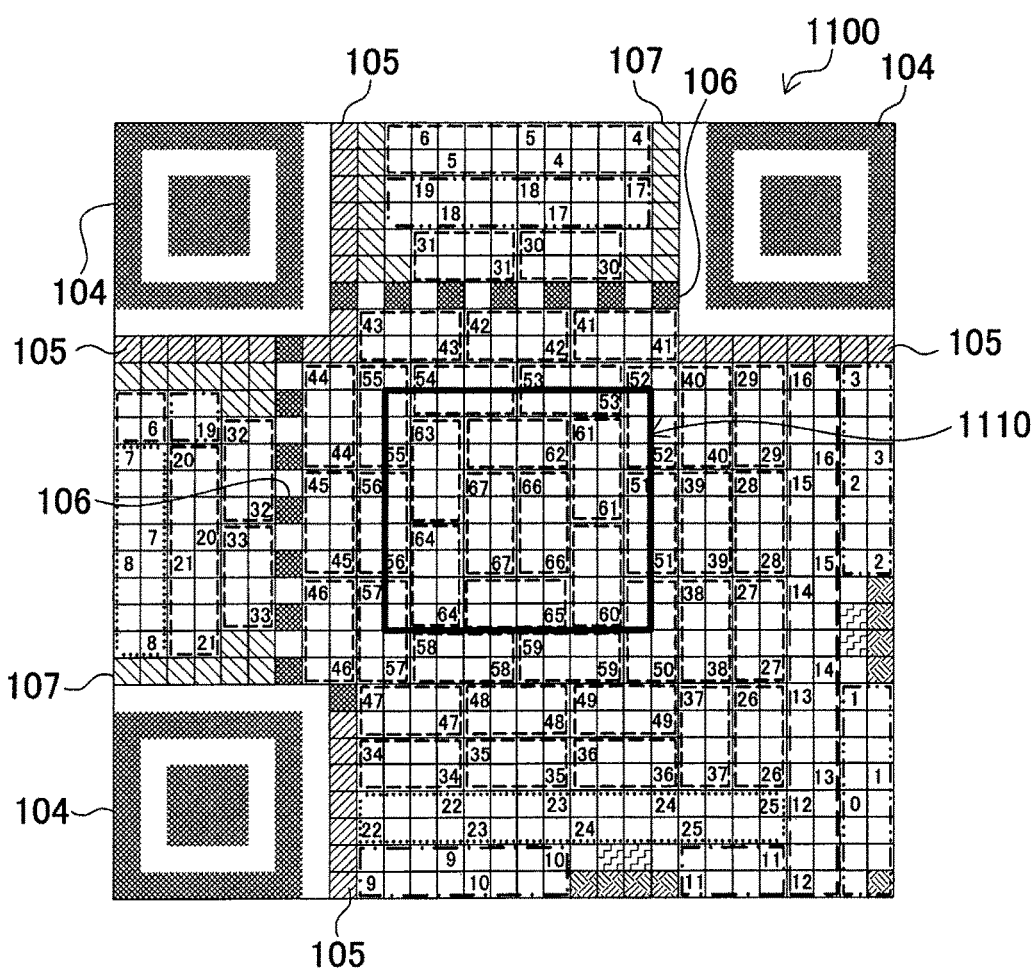

Part (A) of FIG. 10 is an illustration showing no writing of additional information into an information code used by the system shown in FIG. 1, and part (B) of FIG. 10 is an illustration showing that additional information is written in the information code, in which cells positioned outside a free space are omitted from being drawn;

FIG. 11 is an illustration explaining a correspondence relationship arrangements of respective codewords arranged in an information code produced by an information code producing apparatus, which composes part of an information-code utilization system according to a second embodiment, and arrangements of respective data words in another type of code;

FIG. 12 is an illustration conceptually explaining the data configuration of the information code used by the information code utilization system according to the second embodiment;

FIG. 13 is a flowchart exemplifying a flow of reading the information code performed by an information code reader, which composes part of the information-code utilization system according to the second embodiment;

Part (A) of FIG. 14 is an illustration showing no writing of additional information into the information code used by the information-code utilization system according to the second embodiment, and part (B) of FIG. 10 is an illustration showing that additional information is written in the information code, in which cells positioned outside a free space are omitted from being drawn;

FIG. 15 is an illustration explaining an information code used by an information-code utilization system according to a third embodiment, in which part (A) of FIG. 15 shows that a free space is blank, part (B) of FIG. 15 shows the free space provided with an informant addition region, and part (C) of FIG. 15 shows that information is filled in the information addition region;

FIG. 16 is an illustration explaining an information code used by an information-code utilization system according to a first variation of the third embodiment, in which part (A) of FIG. 16 shows that a free space is blank, part (B) of FIG. 16 shows the free space provided with an informant addition region, and part (C) of FIG. 16 shows that information is filled in the information addition region;

Part (A) of FIG. 17 is an illustration explaining an information code used by an information-code utilization system according to a second variation of the third embodiment, part (B) of FIG. 17 conceptually illustrates the positions of respective cells in a free space, and part (C) of FIG. 17 conceptually illustrates results recognized when the respective cell positions of the free space provided as the states shown in FIG. 7, (A) and (B) (that is, no 塗り潰し) is subjected to reading;

FIG. 18 is an illustration explaining an information code used by an information-code utilization system according to a fourth embodiment, in which part (A) of FIG. 18 shows that a free space is blank and part (B) of FIG. 18 shows the free space provided with an informant addition region;

Part (A) of FIG. 19 is an illustration conceptually showing the configuration of data to be interpreted in an information code adopted by a representative example and the variations according the third embodiment, and part (B) of FIG. 19 is an illustration conceptually showing the configuration of data to be interpreted in an information code adopted by a fourth embodiment;

FIG. 20 is an illustration conceptually showing an information code used by an information-code utilization system according to a fifth embodiment, in which part (A) of FIG. 20 shows that fill-in regions are blank and part (B) of FIG. 20 shows that the fill-in regions are filled in;

FIG. 21 is an illustration exemplifying light-dark patterns, which are registered, which are for an information code processed by a fifth embodiment, in which part (A) of FIG. 21 illustrates a light-dark pattern registered for a discount rate of 10%, part (B) of FIG. 21 illustrates a light-dark pattern registered for a discount rate of 20%, and part (C) of FIG. 21 illustrates a light-dark pattern registered for a discount rate of 30%;

Part (A) of FIG. 22 illustrates a qualified light-dark pattern for the information code processed in the fifth embodiment, and part (B) of FIG. 22 illustrates an example in which the information code has been subjected to fraudulent writing;

FIG. 23 illustrates another example 1 of the information code provided in the fifth embodiment, in which part (A) of FIG. 23 shows that the fill-in regions are blank and part (B) of FIG. 23 shows the fill-in regions subjected to ex-post filling;

FIG. 24 illustrates another example 2 of the information code provided in the fifth embodiment, in which part (A) of FIG. 24 shows that the fill-in regions are blank and part (B) of FIG. 24 shows the fill-in regions subjected to ex-post filling;

FIG. 25 illustrates another example 3 of the information code provided in the fifth embodiment, in which part (A) of FIG. 25 shows that the fill-in regions are blank and part (B) of FIG. 25 shows the fill-in regions subjected to ex-post filling;

Part (A) of FIG. 26 illustrates another example 4 of the information code provided in the fifth embodiment, and part (B) of FIG. 26 illustrates another example 5 of the information code provided in the fifth embodiment;

FIG. 27 illustrates an information code used by an information-code utilization system according to a sixth embodiment;

FIG. 28 illustrates a reading way provided in the information-code utilization system according to the sixth embodiment;

Part (A) of FIG. 29 illustrates an information code provided in a first variation of the sixth embodiment, and part (B) of FIG. 29 illustrates an information code provided in a second variation of the sixth embodiment;

FIG. 30 illustrates a reading way provided in the information-code utilization system according to the first variation of the sixth embodiment;

FIG. 31 illustrates a reading way provided in the information-code utilization system according to a third variation of the sixth embodiment;

FIG. 32 illustrates various members including an information code used in an information-code utilization system according to a seventh embodiment;

FIG. 33 illustrates a flow of reading the information code in the information-code utilization system of the seventh embodiment;

FIG. 34 illustrates an information code used in an information-code utilization system according to an eighth embodiment;

FIG. 35 illustrates an information code used in an information-code utilization system according to a ninth embodiment;

FIG. 36 illustrates a practical example operated in the information-code utilization system according to the ninth embodiment;

FIG. 37 illustrates a reading way provided in an information-code utilization system according to a first variation of the ninth embodiment;

FIG. 38 illustrates a reading way provided in an information-code utilization system according to a second variation of the ninth embodiment;

FIG. 39 illustrates an information code used in an information-code utilization system according to a further embodiment;

FIG. 40 illustrates an example 1 of the information code used in the information-code utilization system according to the further embodiment; and FIG. 41 illustrates an example 2 of the information code used in the information-code utilization system according to the further embodiment.

DESCRIPTION OF EMBODIMENTS

First Embodiment

Referring to the drawings, a first embodiment of the present invention will now be described.

FIG. 1 shows an information-code utilization system 1, which includes an information code producing apparatus 2 and an information code reader 10. The information code producing apparatus 2 produces an information code 100 provided with a predetermined code area in which cells are arranged, the cells being units composing information. The information code reader 10 reads the information code 100 produced by the information code producing apparatus 2.

(Information Code Producing Apparatus)

The information code producing apparatus 2 is configured by an information processing apparatus, which is a personal computer for example. This apparatus 2 is provided with a controller 3 including a CPU, an operation unit 4 including a key board, a mouse and other input devices, and a storage 5 including memory devices such as a ROM, a RAM, a HDD, and nonvolatile memories. The apparatus 2 further includes a display unit 6 equipped with known display devices (such as a liquid crystal display and/or other types of display devices), a communication unit 7 functioning as a communication interface to and from external devices via wire or wireless communication, and a printer 8 (printing device). The printer 8 is similar in hardware to known printers and is capable of printing the information code 100 and necessary information in reply to printing data sent from the controller 3.

(Information Code Reader)

Figure 2:
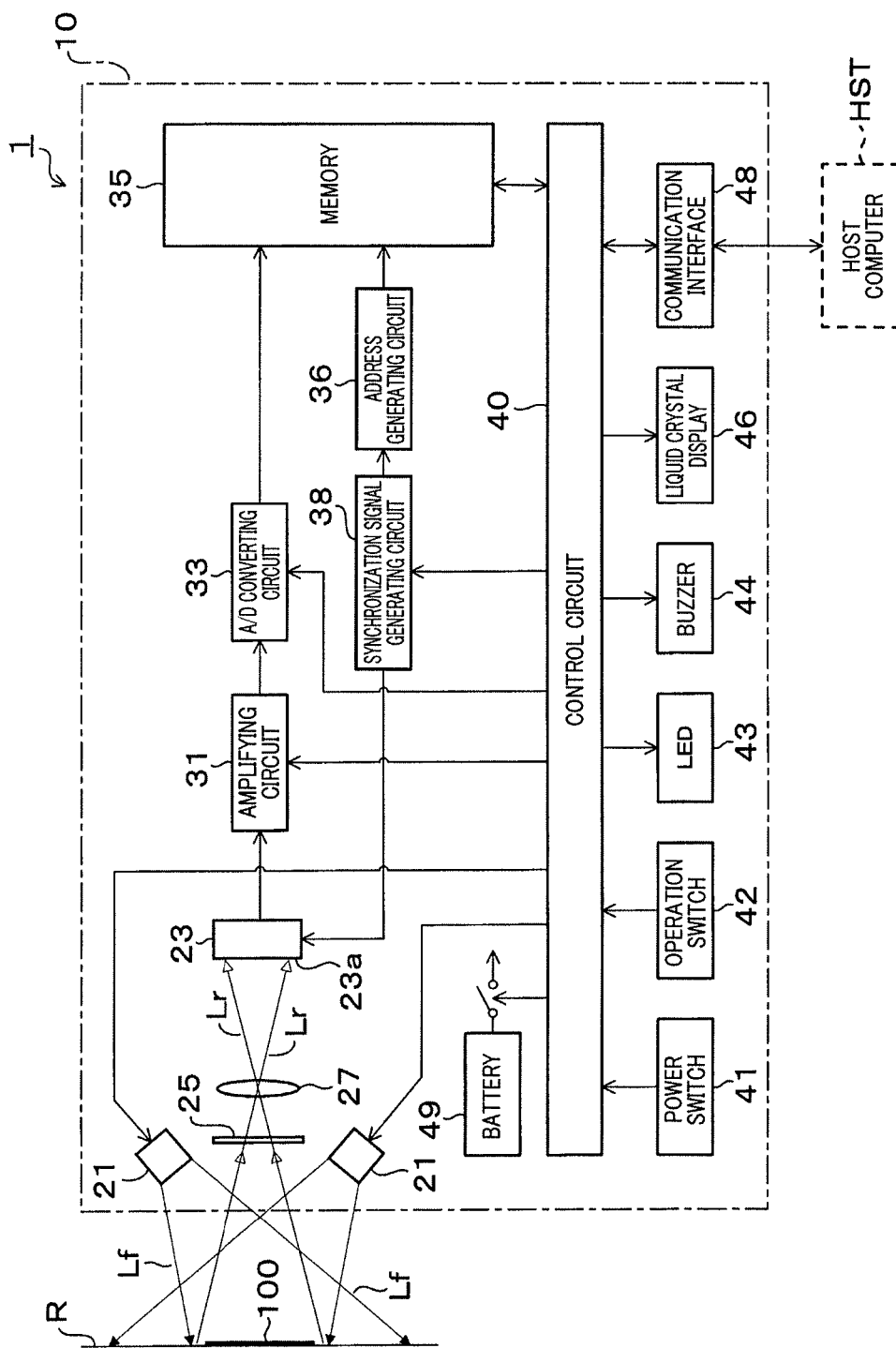
FIG. 2 is a block diagram exemplifying an outlined electric configuration of an information code reader composing part of the information-code utilization system shown in FIG. 1.

The whole configuration of the information code reader 10 will now be explained. As shown in FIG. 2, in terms as hardware configuration, the information code reader 10 is configured as a code reader capable of reading two-dimensional codes. The reader 10 has a not-shown outer casing, in which various kinds of electronic components are accommodated.

The information code reader 10 includes, as its main components, an optical system provided with illuminating sources 21, a light receiving sensor 23, a filer 25 and an imaging lens 27; a microcomputer system (hereinafter called "a microcomputer") provided with memories 35, a control circuit 40, an operation switch 42, and a liquid crystal display 46; and a power supply system provided with a power switch 41 and a battery 49. These components are mounted on not-shown printed boards and/or implemented in the case (not shown).

The optical system is configured to include the illuminating sources 21, light receiving sensor 23, filter 25 and imaging lens 27. The illuminating sources 21 function as light sources capable of emitting illuminating light Lf, and, for example, include red LEDs and lens systems disposed on the output side of the LEDs, in which the lens system include diffusing lenses and collecting lenses. In the present embodiment, the illuminating sources 21 are arranged on both sides of the light receiving sensor 23 and are able to emit the illuminating light Lf towards an object R being read via a reading opening (not shown) of the case. The object R being read is a medium carrying an information code or a medium in or on which an information code is arranged or mapped. The object R being read may be various objects such as resin materials or metal materials, and an information code 100 (later described), which are as shown in FIG. 1 for example, is produced on the object R being read, by printing or direct marking.

The light receiving sensor 23 is provided as one example of an imaging unit capable of imaging the information code 100 (which will be described later) and is able to receive reflected light Lr coming from the object R being read and the information code 100 which reflect the illuminating light. This light receiving sensor 23 is for example an area sensor in which light-receiving elements are arranged two-dimensionally, such elements being solid-state image sensing devices such as C-MOSs or CCDs. The light receiving sensor 23 is mounted on a not-shown printed circuit board and has a light receiving window 23a through which incident light arrives through the imaging lens 27, so that the sensor is able to receive the incident light.

The filter 25 is an optical low-pass filter disposed between the reading opening (not shown) of the case and the imaging lens 27. The filter 25 is able to, for example, allow to pass therethrough light whose wavelengths is equal to or less than a designated wavelength corresponding to the reflected light Lf and, in contrast, cut off light whose wavelength is over the designated wavelength. Hence unnecessary light components whose wavelengths are over that of the reflected light Lr are suppressed from incoming into the light receiving sensor 23. The imaging lens 27 is, by way of example, configured to include a lens barrel and a plurality of collecting lenses accommodated in the lens barrel. In the present embodiment, the imaging lens is configured to collect the reflected light Lr incoming through the reading opening (not shown) of the case, and form a code image of the information code 100 on the light receiving window 23a of the light receiving sensor 23.

The microcomputer system includes an amplifying circuit 31, an A/D converting circuit 33, a memory 35, an address generating circuit 36, a synchronization signal generating circuit 38, a control circuit 40, a power switch 42, an LED 43, a buzzer 44, a liquid crystal display 46, a communication interface 48, and other necessary components. In the microcomputer system, the control circuit 40 functioning as a microcomputer (i.e., information processing unit) and the memory 35 are key components in the function thereof, and image signals of the information code 100 imaged by the foregoing optical system can be processed.

An image signal (which is an analogue signal) outputted from the light receiving sensor 23 of the optical system is provided to the amplifying circuit 31 to be amplified there with a predetermined gain, and the amplified signal is then provided to the A/D converting circuit 33 to be converted to a digital signal from the analogue signal. The digitalized image signal, that is, image data (i.e., image information) is provided to the memory 35 so that the image data is stored in an image data storage area of the memory 35. The synchronization signal generating circuit 38 is configured to generate a synchronization signal sent to both the light receiving sensor 23 and the address generating circuit 36. The address generating circuit 36 is configured to generate addresses at which the image data are stored at the designated addresses in the memory 35, in response to the synchronization signal coming from the synchronization signal generating circuit 38.

The memory 35 is composed of memory devices such as semiconductor memory devices, which include RAMs (DRAMs, SRAMs, etc.) and ROMs (EPROMs, EEROMs, etc.). The RAMs of the memory 35 are arranged to provide not only the image data storage area, described above, but also an operation area and a reading condition table which are used during processing for arithmetic calculations and logic calculations performed by the control circuit 40. In the ROMs, system programs are stored in advance, which include predetermined programs assigned to a later-described reading process and other necessary programs, and which are used to control hardware components including the illuminating light sources 21 and the light receiving sensor 23.

The control circuit 40 is provided with a microcomputer configured to be able to control the information code reader 10, and the microcomputer includes a CPU, a system bus, and an input/output interface, whereby the microcomputer provides an information processing function. In the control circuit 40, the input/output interface is communicably connected to various input/output devices (called peripheral devices) which include, in the present embodiment, the power switch 41, the operation switch 42, the LED 43, the buzzer 44, the liquid crystal display 46 and the communication interface 48. The communication interface 48 is communicably connectable to the host computer HST and/or other systems which are provided as host systems of the information code reader 10.

The power system includes the power switch 41 and the battery 49, in which the power switch 41 can be turn on/off to control connection/disconnection of paths for drive voltage from the battery 49 to the foregoing devices and circuits, which is under control of the control circuit 40. The battery 49 is composed of a secondary battery capable of generating a predetermined DC voltage, and this battery is for example a lithium-ion battery.

(Information Code)

Figure 5:
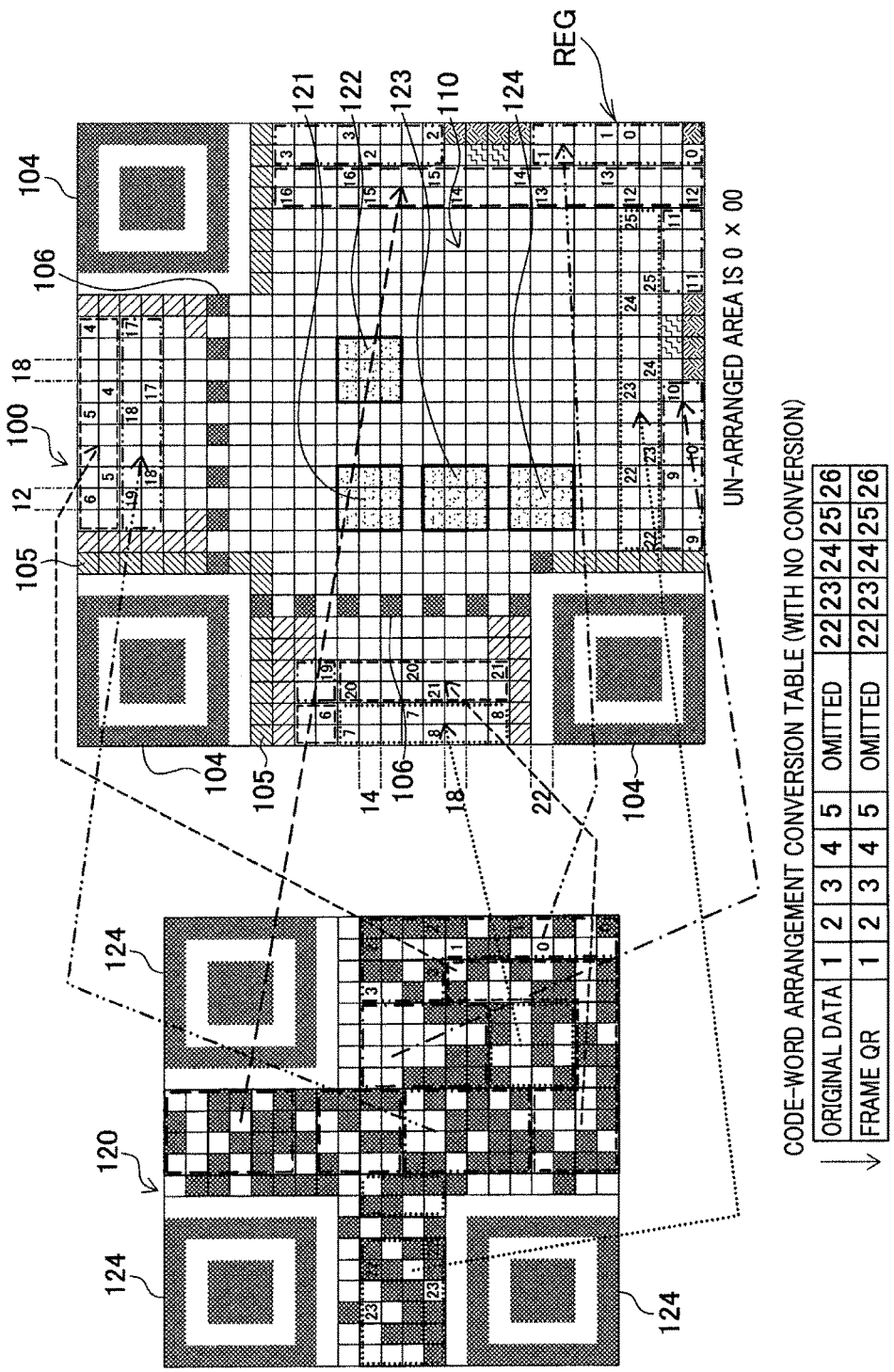
FIG. 5 is an illustration explaining a correspondence relationship between arrangements of respective data words arranged in the information code produced by an information code producing apparatus and arrangements of data words in another type of code, the information code producing apparatus composing part of the information-code utilization system shown in FIG. 1.

With reference to FIGS. 1, 5, and other drawings, an information code 100 used in the system which uses the information code shown in FIG. 1 will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code producing apparatus 2, for example, and has a predetermined code area REG in which cells 102, each corresponding to a unit for displaying pieces of information, are arranged. In the information code 100 shown in FIGS. 1, 5 and other drawings, the "code area" is a rectangular region REG which can contain all of a plurality of dark cells (refer to FIGS. 1 and 5), and practically, is a minimum square or rectangular region which contains all of three position detecting patterns (finder patterns) 104.

Specifically the plurality of cells 102 are arranged or mapped according to a predetermined rule, so that the outer contours of some cells among those cells produce series of those contours which draw a square, rectangular, or other-shape area on or in a medium R differentiablly from the background. This area becomes the code area REG.

It is sufficient that the code area is a square area or a rectangular area whose size is minimal but is able to contain all the cells of a plurality of types necessary to compose an information code, and the code areas shown in FIGS. 1 and 5 are just examples. In the examples shown in FIGS. 1, 5 and other drawings, each of the plurality of cells 102 is composed of a rectangular (e.g., square) light (e.g., white) cell or a rectangular dark (e.g., black) cell. Inside the code area, there is a free space (or called a canvas area) 110, which will be detailed later, and some of the cells 102 are located around the free space 110 in a matrix form. The light-color and dark-color cells are not necessarily limited to white and black cells. When the dark-color cell has a predetermined brightness, it is acceptable that the light-color cell has a brightness level higher than that of the black-color cell. For example, the possibilities for light and dark colors are explained in detail by references such as "International Standard ISO/IEC18004, second edition 2006-09-01, page 109, Annex M, "M1 Symbol contrast"".

In the information code 100, a light-color or dark-color margin zone is formed as a quiet zone to surround the code area. In the example shown in FIGS. 1, 5 and other drawings, a margin zone of a light color (such as white or another color whose brightness is higher than a dark-color cell) is adjacent to surround the code area.

In the information code 100, there are provided a specification pattern region, a data recording region, and an error correction code recording region in its rectangular code (e.g., square, rectangular or any other shapes) code area. In the specification pattern region, predetermined-shaped specification patterns (practically, fixed-figure region wider in area than a single cell) are arranged. In the data recording region, data are recorded by the plurality of types of cells 102 and in the error correction code recording region, error correction codes are recorded by the plurality of types of cells 102. As shown in FIGS. 1, 5 and other drawings, by way of example, the specification patterns arranged in the information code 100 are the same in their shapes and positions as those of known predetermined models of a QR code (registered trademark) (in the example shown in FIG. 5, the predetermined models of the QR code standardized by JIS or other standards). In the example shown in FIGS. 1, 5 etc., three position detecting patterns (finder patterns) 104 are arranged at three corners of the code area respectively and, at predetermined positions, timing patterns 106 and alignment patterns 108 are arranged. The patterns 104, 106 and 108 serve as the specification patterns. The timing patterns 106 and/or alignment patterns 108 are not always necessary to be arranged.

In this way, at the predetermined positions in the code area of the information code 100, there are arranged the fixed-shaped specification patterns (i.e., the position detecting patterns 104, timing patterns 106 and alignment patterns 108 (omitted from FIG. 5). Inside the code area, a space other than the later-described free space 110 is used for arrangement of such specification patterns, recording regions (each of which is the recording region or the error correction code recording region), and other necessary regions.

The reader 10 may use many methods to interpret the number of lines and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of lines of cells and the number of columns of cells, the shapes and positions of the specification patterns, the positions of format information, and candidate positions (addresses)) of code words may be predetermined. When version information is arranged at predetermined positions (reserved regions) in the code area, the reader 10 can read the version information at the predetermined positions. Based on this version information, the reader 10 can understand the number of lines of cells and the number of columns of cells, the shapes and positions of the specification patterns, the position of the format information, the candidate positions (addresses) of code words in the information code 100. The reader 10 may use an alternative approach to understand the foregoing pieces of information.

In addition, inside the code area, the free space 110 is formed to have a size larger than the size of the single cell 102. This free space 110 is located at a region other than the specification pattern regions, data recording region, and error correction code recording regions. In the free space 110, the cells 102, which show data, are not mapped. The error correction which uses error correction codes is not applied to the code area. In the examples shown in FIGS. 1, 5, etc., the data recording region and the error correction code recording region are set around the periphery of the code area in an annular and rectangular form, and the free space 110 is located at a code center area (which is a predetermined region containing the center of the code area). The region into which no data is recorded by the cells 102 is defined as a region in which code words including data code words and error correction code words are not recorded and the format information is not recorded. Moreover, the region to which the error correction using error correction codes is not applied means a region to which the error correction using error correction codes recorded in the error correction code recording region is applied. In consequence, even when some sort of information (which is, for example, additional information described later in the present disclosure) is recorded in the free space 110, that information is not subjected to the error correction which uses error correction codes recorded in the error correction code recording region located around the free space 110.

In the following, a representative example will be explained in which a code configuration assigned to a predetermined version drawn as the right figure in FIG. 5 is made to correspond to a code configuration assigned to a further version (i.e., version number) smaller than the predetermined version as the left figure in FIG. 5. Moreover, the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5. In this example, as long as an amount of data can be stored in the other type of code 120 shown on the left side in FIG. 5, such data can be expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure in FIG. 5, the regions of the respective code words, which are mapped around the free space 110, are conceptually shown by dashed line frames. Regions in which the format information (i.e., the cells at the predetermined positions 105) are conceptually shown by a predetermined type of hatched lines. In the right figure of FIG. 5, the regions in which the format information or the code words are recorded are shown by only squares, omitting practical light-color and black-color cell arrangements from being drawn. In addition, although the example shown on the right side in FIG. 5 provides the free space 110 located at the central part of the code area and shown by a drawn therein to be matched with cell arrangements, the free space 110 can be configured freely. The free space 110 shown in FIG. 1 is just one example, so that the free space can be formed into other configurations.

Figure 6:
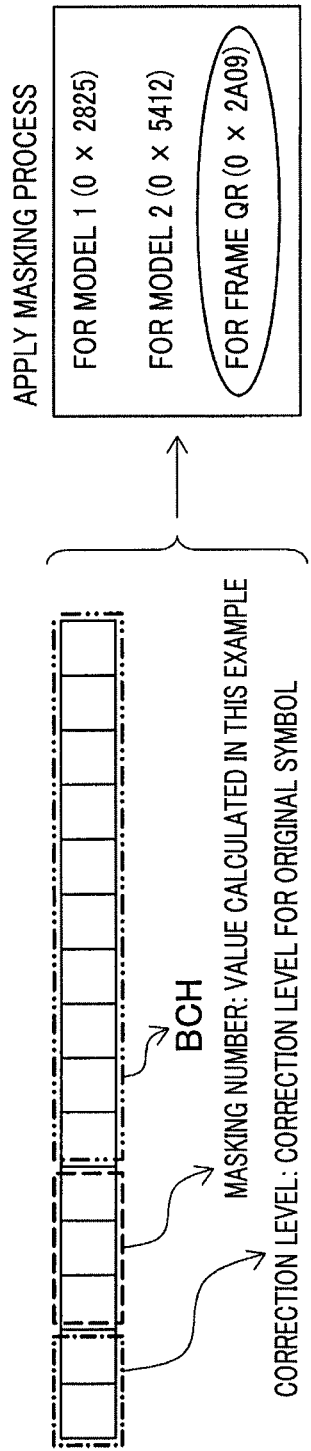
FIG. 6 is an illustration conceptually explaining the data format of the information code used in the information-code utilization system shown in FIG. 1.

The format information (type information) is configured as shown in FIG. 6 for example, and recorded at the predetermined positions 105 (portions with a predetermined type of hatched lines) in the information code 100. This recording is performed on a specified format configuration. This format information includes correction level information for specifying an error correction level and mask number information for specifying a mask number. The correction level information is to specify an error correction level used by the information code 100 and corresponds to an error correction level used by the other type of information code 120 when the information code 100 is converted to the other type of code 120 for reading thereof. The mask number is used to specify what type of masking has been applied to the code word region of the information code 100, where code words of data and an error correction are recorded in the code word region.

The format information shown in FIG. 6 is recorded so that a predetermined type of mask pattern (a specified mask) is reflected in the format information. The type of mask indicated by the format information is identified by a method similar to a known QR code, thus making it possible to detect a specified code type as shown on the right side in FIG. 5 (i.e., a code type with the free space 110). In the QR code according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 shown in FIG. 5 of the present embodiment (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105. In this example, the specified mask is exemplified as being for a casing trim QR (quick response) (or frame QR) in FIG. 6 and the frame QR is one kind of the two-dimensional code.

For any type selected from the models 1 and 2 on a known standard and the information code 100, the formal information is configured such that check digits for a correction level (correction level information) for recording and a mask number are included in the format information, and making for the selected type is then applied to the format information. Practically, the mask pattern for each type is used to be subjected to the format information using a known masking process, resulting in that an arrangement of light cells and dark cells, corresponding to a masked bit pattern, is recorded at the predetermined positions 105.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted for revealing the same check digits. Thus it can be determined that the type is for the information code 100.

In contrast, if the cell data at the predetermined positions in the information code 100 are un-masked based on the masks for the model 1 or 2, the check digits are produced differently from the originally added check digits. It can thus be determined that an information code is not according to the known models 1 and 2.

In this information code 100, the specification patterns (such as the position detecting patterns 104) are detected, and the same method as that for known QR codes is used to specify the direction of the code and the positions of the respective cells, before the format information recorded at the predestined positions are interpreted using the same method as that for the known QR codes. The type of a mask which has been disclosed through the interpretation provides the type of the information code 100, i.e., the type of this code is a special type with the free space 110. The interpreted format information results in determining both an error correction level used in the information code 100 and the type of a mask applied to the code word region (i.e., a region in which data code words and error correction code words are recorded as cells). In addition, the predetermined positions 105 of the code are previously known to the reader 10 in the present embodiment.

In addition, inside the free space 110, identification indications (i.e., markings 121a, 122a, 123a, and 124a) indicating the areas of information addition regions 121, 122, 123, and 124 are drawn so as to enable user's additional writing into the individual information addition regions 121, 122, 123 and 124. To be specific, the inside areas enclosed by the markings ¥ 121a, 122a, 123a and 124a respectively are composed of areas having one or more predetermined type of colors (for example, white), while the markings 21a, 122a, 123a and 124a, which respectively show the outer edges of the information addition regions 12, 122, 123 and 124, are composed of lines whose color (or whose hue etc.) is different from their inside areas (for example, black), whereby the markings function as identification indications. As a result, it is possible for users to write information into the information addition regions 121, 122, 123 and 124, with use of a color different from their background color occupying the inside areas. When writing with such a color different from the predetermined type of color, the information code reader 10 can recognize written information.

In the examples shown in the right figure in FIG. 5 and (A) of FIG. 10, etc., the markings 121a, 122a, 123a and 124a are composed of quadrangular figures, providing their inside areas as the information addition regions 121,122, 123 and 124. Alternatively, the identification indications may be given any shape or configuration as long as the boundaries (outer edges) of the information addition regions 121, 122, 123 and 124 can be delineated. For example, if the information addition regions 121, 122, 123 and 124 are depicted with a predetermined color (for example, white), their regions can be distinguished in color from their outside background if the outside background of the information addition regions is rendered in a color different from the above predetermined one. In this alternative, the outside background which surrounds the information addition regions serves as the identification indication.

Figure 3:
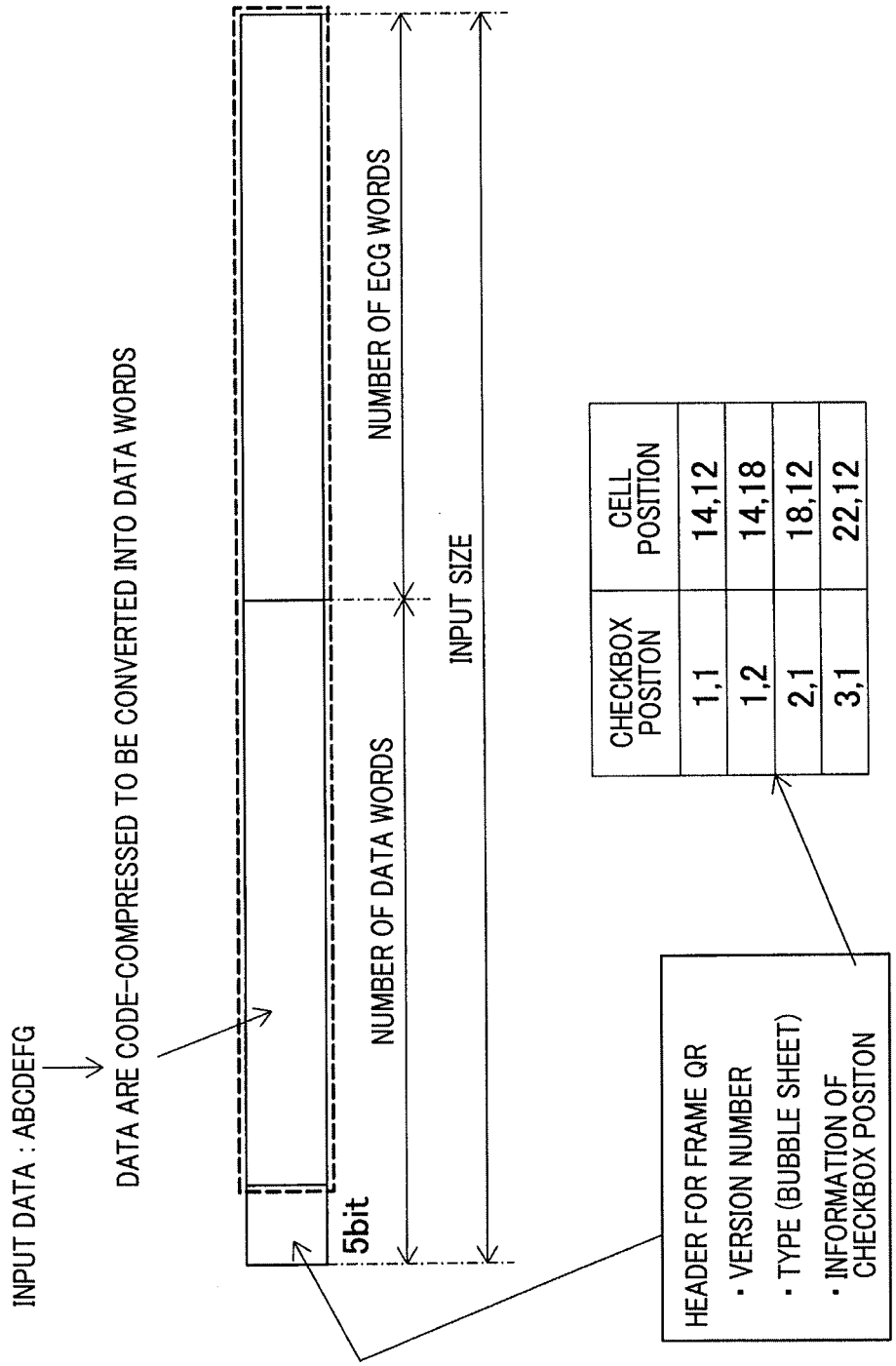
FIG. 3 is an illustration conceptually explaining the data configuration of an information code utilization the system shown in FIG. 1.

Contents recorded in the information code 100 are formatted into a data arrangement as shown in FIG. 3, for example. Header data (i.e., a header for the frame QR) are put at the head of the data arrangement, which are followed by input data (i.e., data to be interpreted). In the example shown in FIG. 3, the input data (data to be interpreted) are compressed using a known compressing technique so that the input data are converted into data words (or data code words). This compression may be omitted, if it is unnecessary. The header data used in this information code 100 are also called "header for frame QR" in the following explanation. Further, in the present disclosure, the data recording region is composed of regions in which the data words (data code words) of the header data and the input data as well as regions in which the forgoing format information is recorded. In the example shown in FIG. 3, there are recorded, as the header data (the header for the fame QR), not only specifying information but also identifying information are recorded. The specifying information, which is exemplified as being the version number in FIG. 3, is able to specify the type (version) of the other type of code 120 later described. This other type of code 120 is a code type for interpreting the information code 100 and made to correspond to the information code 100 via the arrangement conversion table (shown in FIG. 5). The identifying information is used to identify a format in the free space.

In the example shown in FIG. 3, the header data includes information (first information) to determined that the format of the free space 110 is a bubble sheet format shown in FIGS. 1, 5 10, etc. and another type of information (checkbox position information corresponding to second information) capable of specifying marking regions (which is additional writing position) in the free space 110, in addition to the type (version number) of the type of code. The first information corresponds to one example of identification information showing that the information addition regions are present, while the second information corresponds to one example of position data showing the positions of the information addition regions in the code area.

In the example shown in FIGS. 3 and 5, there are recorded the checkbox position information (position data), which is information capable of specifying the positions of the rows and columns of the respective information addition regions 121, 122, 123 and 124. These regions 121 to 124 are configured as marking-allowable regions (checkbox). Practically, when the rectangular information code 100 shown in FIG. 5 is divided into a grid of plural rows and plural columns, combinations of the row and column positions of the respective information addition regions 121 to 124 are recorded as checkbox position information (position data). The widths of each row and each column of the grid of the information code 100 are made to equal to the widths of the row and column of a single cell. All the cells have the same row and column sizes. As a result, the positions of the information addition regions 121 to 124 can be specified.

Furthermore, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed. By way of example, as a method of producing the error correction code words based on the data words (i.e., data code words), a production method for error correction code words regulated by JISX0510:2004, (which is JISX0510:2004, 8.5 error correction) can be used as one of known methods. This production method for the error correction code words is not limited to the foregoing, and this production may be performed using various other methods.

Moreover, in the information code 100, the respective data words (data code words) expressing data being interpreted (object data to be outputted) and the error correction code words are arranged or mapped within the code area on the basis of predetermined arrangement position information. In this configuration, as shown in FIG. 5, arrangement candidate positions for respective code words are defined previously in the code area of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown on the right figure in FIG. 5, the arrangement candidate positions Nos. 1-25 are outlined by way of example, in which the head and last bit portions are numbered for explicit showing in each of the arrangement candidate positions and arrangement candidate positions of Nos. 26 or higher are omitted from being drawn.

Specifically, in the case of the version of the other type of code 120 (in this case, a known QR code) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order. For instance, in the other type of code 120 shown on the left side in FIG. 5, the zero-th code word is arranged at the lower right, the first code word is arranged next to the upper edge of the zero-th code word, and the second code word is arranged next to the upper edge of the first code word. In this way, the arrangement positions of the respective code words are decided previously. The other type of code 120 is thus interpreted in sequence based on the predetermined arrangements, like the order starting from the zero-th code word, the first code word, the second code word, the third code word, . . . , and to the last one.

The arrangement position information (the arrangement conversion table) shown in FIG. 5 is provided to make the numbers of the respective arrangement positions (i.e., arrangement positions of the code words according to the arrangement order) previously decided in the other type of code 120 correspond to the numbers of the candidate positions (i.e., the arrangement candidate positions of the code words) previously decided in the information code 100, respectively. To be more precise, in the arrangement position information, correspondence information showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded as, for example, table data. As a result, the arrangement positions of the code words numbered in the other type of code 120 are made to respectively correspond to the arrangement candidate positions of the information code 100.

Thus, in interpreting the information code 100, the code words at the arrangement candidate positions in the code area, i.e., the addressed code wards in the code area, are re-arranged to arrangement positions in the other type of code 120 which arrangement positions are specified by the arrangement position information (i.e., the arrangement conversion table). The other type of code 120 thus re-arranged is then subjected to interpretation based on a known interpretation method.

For example, by using the arrangement conversion table shown FIG. 5 to interpret the information code 100, the code word at the first arrangement candidate position in the information code 100 is arranged at an arrangement position assigned to the first code word in the other type of code 120; the code word at the second arrangement candidate position in the information code 100 is arranged at an arrangement position assigned to the second code word in the other type of code 120; and the code word at the N-th arrangement candidate position in the information code 100 is arranged at an arrangement position assigned to the M-th code word made to correspond to the N-th arrangement candidate position in the other type of code 120. As exemplified above, the re-arrangement is performed for every code word, and the other type of code (e.g., QR code) whose code words are re-arranged is subject to a known interpretation method.

It is preferable that the arrangement position information (the arrangement conversion table) is owned, as common data (a common arrangement conversion table), by both the information code producing apparatus 2 producing the information code 100 and the information code reader 10 reading the information code 100.

(Production Process of Information Code)

Figure 8:
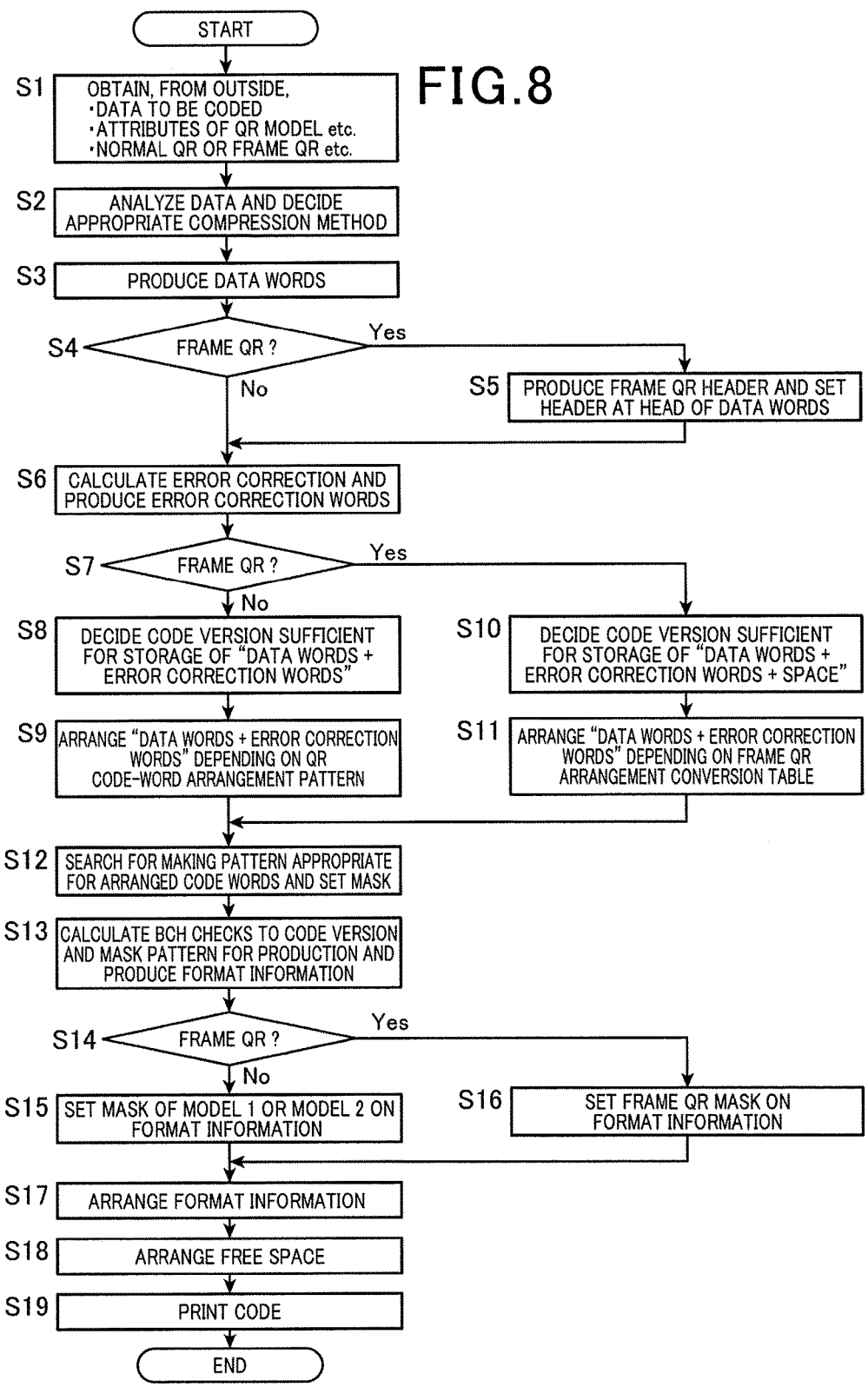
FIG. 8 is a flowchart exemplifying a flow of production of the information code produced by the information code producing apparatus composing the part of the information-code utilization system shown in FIG. 1.

Referring to FIG. 8 and other drawings, an information code producing process and an information code producing method will now be described.

The following description is directed to a QR code (registered trademark) exemplified as the other type of code 120 and the information code 100 has the specification patterns which are the same as those of the QR code, as shown in FIG. 5. In this example, the information code 100 with the free space 110 is also referred to as a "frame QR" or a "frame QR code". Steps composing a process for the production are shown by adding a reference numeral "S". This notation will also be true of embodiments following this embodiment.

An information code producing process is shown in FIG. 8, which is performed by the information code producing apparatus 2. This process is started, for example, by a predetermined operation performed at the operation unit 4. This process starts by obtaining from the outside data to be coded (i.e., object data being interpreted), attribute data, and code type data (showing data used for determining whether the information code 100 is produced or a general two-dimensional code (e.g., a general QR code) is produced) (S1). In the present configuration, the controller 3 and the operation unit 4 functionally correspond to one example of a data acquisition section which acquires object data to be interpreted (i.e., data inputted from the outside). Besides this example, another example is that the controller 3 and the communication unit 7 may be configured functionally as a data acquisition section which acquires, as object data being interpreted, input data from the outside via communication After acquisition of the object data at S1, a method for compressing the acquired object data is decided from known methods (S2). Data (i.e., object data to be interpreted, which are inputted data which have been compressed, are then expressed as a plurality of data wards (data code words) (S3). It is then determined whether or not the code type data acquired at S1 is the type of the information code 100 with the free space 110 (frame QR) (S4). If the code type data acquired at S1 is the type of the information code 100 (frame QR) with the free space 110; the processing proceeds to a step S5 from Yes from S4. At step S5, header data inherently used by the type of information code 100 with the free space 110 (frame QR) is produced as described, and set at the head of data arrangement including a plurality of code words as shown in FIG. 3. Therefore, in the header data of FIG. 3, described before, there are recorded predetermined types of information including first information and second information in addition to information (such as information of a version number) which is capable of specifying the type (version) of the other type of code 120 shown on the right figure in FIG. 5. The first information is information identifying the format of the free space 110 as a bubble sheet format. The second information is information specifying a marking region in the free space 110, where the marking region is a writable position and the second information composes checkbox position information. Meanwhile, when the code type data acquired S1 does not show the type of the information code 100 with the free space 110 (frame QR), that is, the code type data are data indicating a known two-dimensional code assigned to, for example, the model 1 or the model 2, the processing proceeds along No from step S4.

In the case of No at step S4, error correction codes are produced by applying a known method to the data words (data code words) produced at S3, so that a plurality of error correction words (error correction code words) expressing error correction codes are produced (S6). When the processing has proceeded via steps S4 and S5, the configuration of the data words (i.e., plural data code words expressing the header data and the input data) produced at S3 and S5 is subjected to a known method to produce error correction codes, and a plurality of error correction words (error correction code words) expressing the error correction codes are produced (S6).

After step S6, it is again determined whether or not the code type data acquired at S1 is the type of the information code 100 with the free space 110 (frame QR) (S7). If the code type data does not show such information code 100, the processing proceeds to S8 from No at S7. In this case, the version of a two-dimensional code whose size is sufficient for storing both the data words (data code words) produced at S3 and the error correction codes (error correction code words) produced at S6 is decided. The version decided at this step should be a version selected among standardized plural versions of known QR codes and formed to have a storage size sufficient for the data words produced at S3 and the error correction words produced at S6. According to an arrangement pattern specified by the decided version, the data words produced at S3 and the error correction words produced at S6 are then arranged (or mapped) (S9).

On the other hand, when the code type data show the type of the information code 100 with the free space 110 (i.e., QR code), the processing proceeds S10 via Yes at S7. The version of an information code 100 is decided. This version should be a version providing a storage size sufficiently storing the data words (data code words) produced at S3 and S5 and the error correction words (error correction code words) produced at S6, and a free space. The free space may have a predetermined certain size or a size specified by a user's input or any other means at a stage provided before the step S10. The size of the free space may be designated by the numbers of lines and columns or may be given by data which is set to correspond to the number of words or the number of cells. In the example shown in FIGS. 5 and 8, the version is decided among the plural versions (sizes) decided depending on the type of the information code 100. This version has a size capable of storing the data words (data code words) produced at S3 and S5, the error correction words (error correction code words) produced at S6, and the free space.

When the type of the information code 100 is given a plurality of versions, the number of both of rows and columns, shapes and arrangements of the specification patterns, arrangements of format data, and arrangement candidate positions of each code word are set for each version. In any version, shown in the right figure in FIG. 5, the arrangement candidate positions of code words are decided in sequence from the peripheral side (e.g., the positions are decided in sequence in a spiral form from the outside to the inside). Hence, position setting is made such arrangement candidate positions whose position numbers are smaller are located closer to the boundaries. Among the arrangement candidate positions prepared, a portion in which code words are not arranged, i.e., unused, is assigned to the free space. This arrangement makes it easier to ensure a wider free space in a central part of the code region. If a plurality of versions are provided whose sizes are sufficient for storing data words (data code words) produced at steps S3 and S5, error correction words (error correction code words) produced at step S6, the free space, it may be possible to select a version providing the smallest capacity size, from the various types of versions. Of course, a user can designate any desired version (capacity size) among such version. When producing the information code 100, the selected version regulates the size (the numbers of rows and columns), arrangements of the specification patterns, and arrangement candidate positions of code words. The arrangement conversion table for the code words is also used to decide actual arrangement positions of the respective code words. In the following practical description, it is assumed that the version shown in the right-side figure in FIG. 5 has been decided.

At step S11 following S10, the data words (data code words) produced at S3 and S5 and the error correction words (error correction code words) produced at S6 are arranged in accordance with the foregoing arrangement position information (i.e., the arrangement conversion table). This arrangement conversion table is stored in the storage 5 of the information code producing apparatus 2 and set such that arrangement positions (arrangement positions of code words having an arrangement order) specified by the other type of code 120 correspond respectively to predetermined candidate positions (arrangement candidate positions of the respective code words) in the information code 100. At step S11, the arrangement positions of the code words to be recorded (i.e., the data words produced at S3 and S5 and the error correction words produced at S6) are specified as arrangement positions of respective code words having an arrangement order and being expressed in the other type of code 120 shown in FIG. 4 and the left figure in FIG. 5. This other type of code 120 is a two-dimensional code having a size smaller in area than the information code 100 but sufficient for storing the data wards produced at S3 and S5 and the error correction words produced at S6. After specifying the arrangement positions, those code words are arranged or mapped at the respective arrangement candidate positions in the information code 100, which positions are made by the arrangement position information (the arrangement conversion table) to correspond to the respective code words having the arrangement order.

For example, in the arrangement position information (the arrangement conversion table shown in FIG. 5, the arrangement position of the first code word in the other type of code 120 and the first arrangement candidate position of the information code 100 are made to correspond to each other. Hence, the first code word among all the code words (i.e., the data words produced at S3 and S5 and the error correction words produced at S6) is arranged at the first arrangement candidate position in the information code 100. Similarly, the arrangement position of the second code word in the other type of code 120 and the second arrangement candidate position in the information code 100 are made to correspond to each other, whereby the second code word is arranged at the second arrangement candidate position in the information code 100. The arrangement position of the N-th code word in the other type of code 120 is made to correspond to the M-th arrangement candidate position of the information code 100. Accordingly, the N-th code word is arranged at the M-th arrangement candidate position in the information code 100.

In a case where only code words composed of the data words produced at S3 and S5 and the error correction words produced at S6 are arranged, the other type of code 120 (a known QR code) whose size is smaller than that of the information code 100 can still afford the expression of such cord words. However, when storing the data words produced at S3 and S5, the error correction words produced at S6, and the free space 110, the information code 100 is necessary to have a size than larger than that of the other type of code 120. Hence, in the present embodiment, he data words produced at S3 and S5, the error correction words produced at S6, and the free space 110 are expressed by the information code 100, in which arrangement positions of the data words produced at S3 and S6 and the error correction words produced at S6 are decided between the arrangement positions of code words in the other type or code 120 (a known QR code) and those in the information code 100 using the arrangement conversion table.

In the present configuration, the arrangement conversion table shown in FIG. 5 exemplifies arrangement position information used to specify arrangement positions in the code area, at which plural data words expressing object data being interpreted are arranged the arrangement positions. This arrangement conversion table (i.e., the arrangement position information) is configured to provide correspondence information between the order of plural data words expressing object data to be interpreted and arrangement positions of data words to be arranged in the order in the code area. The storage 5 exemplifies an arrangement position information storage in which data of the arrangement conversion table (arrangement position information) are recorded.

After steps S9 or S11, a mask pattern which should be applied to the code words of which arrangement positions are decided at S9 or S11 is designated by a known predetermined method (e.g., a known method used by the QR code) and the designated mask pattern is applied to the code words (S12). Hence the mask pattern is reflected on the code words of which arrangement positions are decided at S9 or S11. Based on information (mask number) showing the mask pattern which has been set step S12 and information showing the error correction level, check digits are calculated, and format information including the error correction level, the mask number, and the check digits is produced (S13). By way of example, data showing the format information, such as a mask number and an error correction level, which are recorded as the format information, may be inputted at step S1.

When the code type data acquired at S1 shows the information code 100 with the free space 110 (i.e., the frame QR), the process proceeds along a route Yes at step S14. Hence, a masking process is performed so that the foregoing designated mask (a mask for the frame QR) is reflected in the format information produced at S13 (refer to FIG. 6) (S16). Meanwhile when the code type data acquired at S1 does not show the information code 100 with the free space 110 (i.e., the frame QR), the process proceeds along a route No at step S14. In this case, a mask (e.g., a mask for the model 1 or 2), whose mask pattern is different from the mask pattern set S16, is set and applied to the format information (S15). After masking the format information at S15 or S16, the masked format information is arranged at the predetermined positions in the code area (S17).

After configuring the specification pattern regions, the data recording region, and the error correcting regions, components of the free space 110 are arranged (step S18). In FIG. 3, the position of the information addition regions (checkboxes) is specified by row positions and column positions. Hence, at step S18, the figure data of the information addition regions 121 to 124 are arranged so as to be accord with the specified positions and the edge of such information addition regions 121 to 124 are drawn to connect the specified positions so that the markings 121a, 122a, 123a and 124a are arranged as shown in FIG. 10, for example. In the example shown in FIGS. 3, 5, etc., the figures for the information addition regions (checkboxes) are previously shaped into a rectangle, and their whole insides compose backgrounds which is drawn in a single color or a plurality of types of light color. At step S18, therefore, each figure is arranged in such a manner that the center of each of the figures is located at a checkbox position designated by the header data.

In the foregoing example, the positions of the information addition regions (i.e., the checkbox positions) can be given by user's input, not limited to including such positions in the header data shown in FIG. 3. The same is true of input of the shapes and/or colors of the information addition regions, and/or, the shapes and/or colors of the identification indications, not limiting use of the header data. This kind of user's input enables the information addition regions and the identification indications to be configured in a mode which depends on the user's input. Additionally, as shown in FIGS. 1 and 10, adjacently to the information addition regions (checkboxes) 121 to 124, symbols and/or figures composed of characters and/or numerals may be arranged. In this case, for instance, a user can input, at step S18, information indicating the symbols and/or figures to be arranged next to the regions 121 to 124 still in the free space. Depending on the inputted positions, such as lateral positions to each checkbox, such the symbols and/or figures are arranged at step S18.

In this way, the information code 100 or the other type of code 120 is produced, and the code is printed by the printer 8 (S19). At step S19 in place of the printing, such a produced code may be displayed using the display unit or the data showing the information code, which have been produced by the steps ranging up to step S17, may be transmitted to an apparatus (such as information devices including a mobile terminal or a computer) placed outside the system.

In the present embodiment, the controller 3 of the information code producing apparatus 2 exemplifies the data-recording region producing section. Thus, when the information code 100 has a code area having the free space 110, the data recording region is produced such that the format information is recorded at the predetermined positions of the code area in the specified format configuration and the data expressing the object data being interpreted (i.e., the input data) acquired by the data acquiring section are arranged according to the arrangement position information stored in the arrangement-position information recording section. Furthermore, in the data-recording-region producing section, composed by the controller 3, for the code area with the free space 110, the cells are arranged at the predetermined positions 105 in a state where the predetermined type of mask pattern (the designated mask) has been reflected in the cells.

Figure 4:
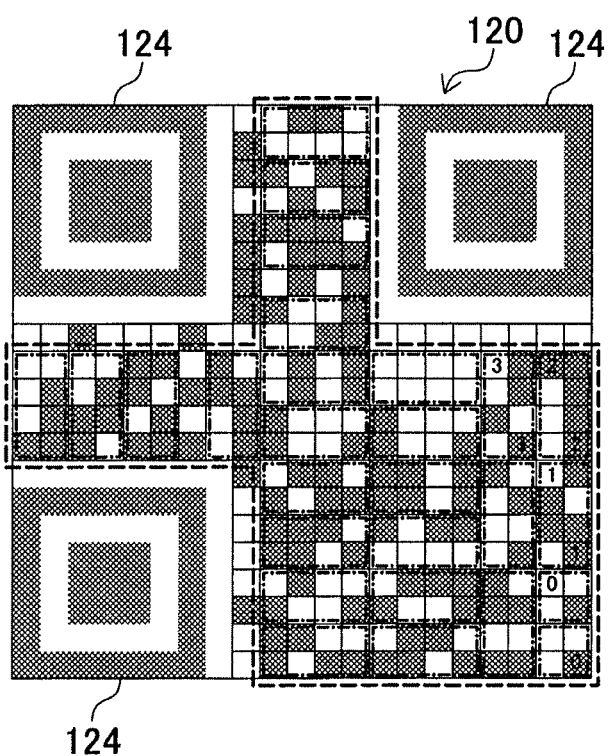
FIG. 4 is an illustration explaining another type of code corresponding to the information code used in the information-code utilization system shown in FIG. 1.

Furthermore, in FIGS. 4 and 5, the other type of code 120 has, at its three corners, position detecting patterns 124 which are produced automatically and which correspond to the position detecting patterns 104 of the information code 100

(Reading Process of Information Code)

A reading process for the information code 100 shown in FIG. 1 and on the right side in FIG. 1 will now be described, which process is performed by the information code reader 10 shown in FIG. 2. The steps shown in this reading process are abbreviated by a symbol "S." This notation is true of the current and subsequent embodiments.

Figure 9:
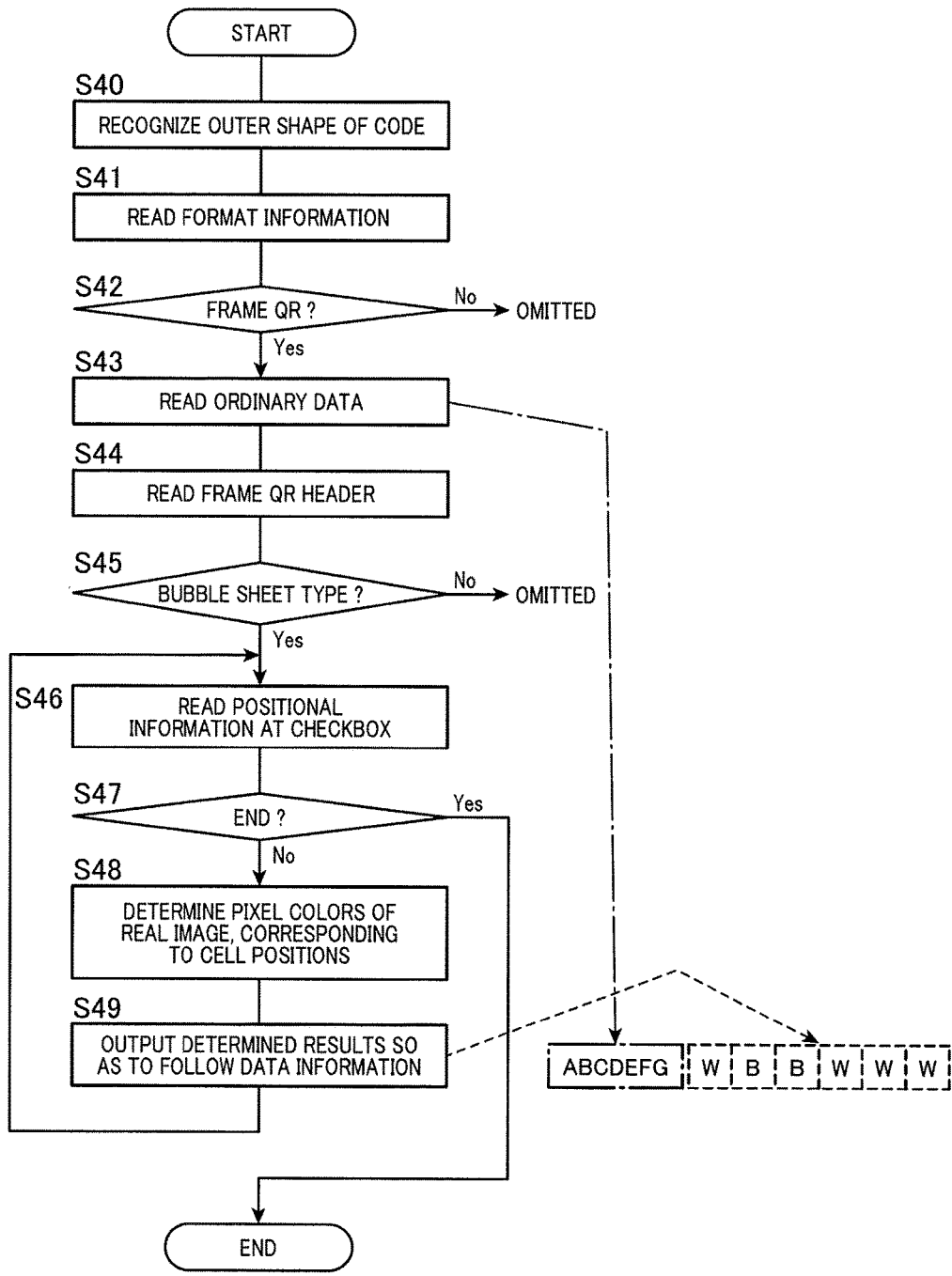
FIG. 9 is a flowchart exemplifying a flow of reading the information code produced by the information code producing apparatus composing the part of the information-code utilization system shown in FIG. 1.

The reading process shown in FIG. 9 is performed when, for example, a user performs a given operation (for example, at the operation switch 42). First, at step S40 in FIG. 9, a two-dimensional code, which is placed in the imaging area of the light receiving sensor 12, is imaged to obtain its two-dimensional code image and to detect the shape of this two-dimensional code. Specifically, the reader tries to recognize the position detecting patterns 104 and the code outer shape. For example, a known technique to detect a waveform of 1:1:3:1:1, which is performed for the QR code (registered trademark), is used to detect the position detecting patterns 104, and a known technique, which is applied to the QR code (registered trademark), is used to detect the outer shape of the imaged two-dimensional code. As a result, at step S40, the outer shape of the information code 100 can be detected when the information code 100 is imaged. The techniques other that the above can be adopted at step S40 as long as the outer shapes of the specifications and the two-dimensional code can be detected. In this embodiment, the light receiving sensor 23 composes the imaging unit which operates to image the information code 100 produced by the information code producing apparatus 2.

The step S40 is followed by interpreting information (format information) mapped at the predetermined positions 105 of the information code 100 such that the type of the imaged information code and a masking correction level are obtained (S41). Practically, by way of example, the reader tries to unmask the information recorded at the predetermined positions 105, as describe, on the basis of the foregoing designated mask (a mask or the frame QR), and to interpret the unmasked information. When being unmasked, if check digits coincide with each other (i.e., check digits calculated based on both data of a correction level interpreted at the predetermined positions 105 and data of the mask number coincide with check digits recorded at the predetermined positions 105), it can be determined that this type of code is an information code 100 with a free space 110. It is therefore possible to acquire an error correction level and a mask number included in the format information.

In this way, when the mask is removed based on the designated mask (i.e., it is recognized that the code being targeted is in type the information code 100 (frame QR), the processing proceeds via Yes at step S42. Meanwhile, when the unmasking process can be performed successfully by using a mask such as a mask for the model 1 or a mask for the model 2 (as shown in FIG. 6), which is other than the designated mask (i.e., the mask for the frame QR), the processing proceeds via No at step S42. When such another mask which is other than the designated mask can be used successfully for unmasking the code, this means that the two-dimensional code imaged at step S40 is a known QR code. Hence, the determination No at step S42 will lead to interpretation of the QR code with use of a known technique, thus outputting interpreted results. In FIG. 9, a process following the determination No at step S42 is omitted from being drawn.

If it is determined Yes at step S42, the reader interprets data recorded in the data recording region (S43). Concretely, using the mask number included in the format information acquired at step S41, the mask applied to the code (precisely, its code word region) is unmasked. Then, based on the header data (the frame QR header) arranged at the data words, the original code size (i.e., the version and format of the other type of code 120) is specified. Then, according to the arrangement conversion table shown in FIG. 5, the information code 100 shown by the right figure in FIG. 5 is returned in its arrangement to the original code (the other type of code 120) shown by the left figure in FIG. 5. In practice, the code words (data code words and error correction code words) at individual arrangement candidate positions of the information code 100 are re-arranged at arrangement positions in the other type of code 120. In the arrangement conversation table, the arrangement positions are made to correspond to the arrangement candidate positions. This arrangement conversion produces the other type of code 120 in which the data code words and the error correction code words owned by the information code 100 are arranged. As the other type of code 120 is a known QR code in this example, the data can be interpreted by using the same technique as that for the known QR code. In other words, the error correction code words are subjected to the error correction calculation by using the known technique, whereby the data code words of the other type of code are interpreted.

In the present embodiment, the control circuit 40 functionally composes one example of a determining section, so that it is determined whether or not the information code 100 imaged by the imaging unit has a designated format arranged at its predetermined positions 105 of the code area. Specifically it is determined whether or not a predetermined type of mask pattern (i.e., a designated mask) is arranged at the predetermined positions 105

Additionally the control circuit 40 also functionally composes examples of a data-recording-region reading section and an interpreting section. Hence, the information code 100 is imaged by the imaging unit, data recorded in the data recording region are read, based on contents of both the data recording region and the error correction code recording region in the code image of the code 100. Practically, if the determining section determines that a designated format configuration is provided at the predetermined positions 105 (in detail, a predetermined type of mask pattern is arranged at the predetermined positions 105), the positions of individual data words in the code area are specified using the correspondence information (the arrangement conversion table) recorded in the correspondence information recording part, and the object data are interpreted.

The arrangement conversion table is one example of the correspondence information, in which the data words expressed in sequence with the arrangement positions in the code area are defined as corresponding positions in the other type of code 120 when the data words are expressed by a predetermined method (for example, a known standard) in the other type of code 120. The control circuit 40, which corresponds to the interpreting section, replaces the data words arranged in sequence in the arrangement positions of the code area with the corresponding positions in the other type of code 120 using the correspondence information (the arrangement conversion table), and then interprets the other type of code 120, in cases where the determining section determines that the cells at the predetermined positions 105 are formatted in a designated format configuration.

When the data in the data recording region have been interpreted at step S43, header data (frame QR header) included in the format information are read (S44). If this format information does not indicate a bubble sheet format, it is determined No at step S45. For example, in the second embodiment which will be described later, the format information indicates an OCR format, the processing proceeds via No at step S45, so that the steps S66 to S70 shown in FIG. 13 can be performed, as will be detailed later. Steps which follow the determination No at step S45 are omitted from being drawn in FIG. 9.

When the determination at step S45 is Yes, that is, the format information contained in the header data (the frame QR header) shows an answer sheet format, the reader reads a checkbox position information (position data) included in the header data, and specifies the positions of information addition regions to be located in the information code 100 (S46). The reader then determines whether or not all the specified information addition regions have been recognized (S47). When this determination is No, that is, there are remaining information addition regions, the processing proceeds to step S47 at which the determination is performed with the remaining information addition regions so that determined results are outputted. Practically, at step S48, an actual image is extracted from the code image. The actual image is an image located at any of the information addition regions, designated by the checkbox position information (i.e., position data defined by row positions and column positions of each of the information addition regions), and the position of each information addition region is specified the row and column positions designated by the position data. The extracted actual image is then subjected to determining pixel colors thereof in the positions of the information addition regions.

In this example, if the luminance (an amount of received light) of the actual image in any of the positions of the information addition regions is equal to or over a threshold, it is determined to be white, while, in the same way, the luminance of the actual image is below the threshold, it is determined to be black.

Data showing the determined results at step S48 are added to the tail of the already interpreted data and the data are outputted (S49). The processing is then returned to step S46, where if there are still left one or more information addition regions to which the determination of step S48 is not applied, the processing proceeds via No at step S47. When the processes at steps S48 and S49 are completed for all the information addition regions, the processing goes via Yes at step S47, thus ending the reading process. By way of example, when the data are outputted at step S49, correspondence may be performed between the respective positions of the information addition regions 121, 122, 123 and 124 and the determined results at those positions (i.e., information showing a light color or a black color).

In the present embodiment, the control circuit 40 functions as an example of the additional-information acquiring section, which analyzes the inside of the free space 110 of the code image and acquires additional-information added in the free space 110. More specific, this acquiring section analyzes the insides of the information addition regions 121, 122, 123 and 124 of the code image, and acquires additional information additionally written in those regions 121, 122, 123 and 124. Moreover, part of the control circuit 40, which corresponds to the additional-information acquiring section, acquires additional information added in the free space 110, based on the read results of the data recording region which is performed by the data-recording-region recording section, provided that the identification information is recorded in the data recording region. For instance, the identification information is format information showing the foregoing bubble sheet format or an OCR format which will be exemplified.

More specifically, in the information code 100, the positional data (e.g., the foregoing checkbox position information) showing the positions of the information addition region 121, 122, 123 and 124 are recorded in the data recording region. The control circuit 40 functioning as the additional-information acquiring section uses the positional data obtained from the read results of the data recording region, which is performed by the data-recording-region reading section. This use makes it possible that the information addition regions 121, 122, 123 and 124 are positionally specified in the code image and these regions 121, 122, 123 and 124 are analyzed so that additional information can be obtained from those regions.

The control circuit corresponds, functionally and partially, to a detecting section, which detects writing with a different color (including a different value, chroma and/or hue) in the information addition regions 121, 122, 123 and 124 of the code image. This different color is different from the color of those regions 121, 122, 123 and 124. Practically, the markings 121a, 122a, 123a an 124a indicating the outer edges of the regions 121, 122, 123 and 124 are drawn as the identification indications with a color different from the predetermined color of the information addition regions. Hence, the detecting part determines whether or not the insides of a part or all of the regions delineated by the markings 121a, 122a, 123a and 124a are painted by other colors.

Additionally the control circuit 50 corresponds, functionally and partially, to an outputting section, which is configured to output both the information read by the data-recording-region reading section and the additional information acquired by the additional-information acquiring section. In cases where the output results at step S49 are printed by the printing unit 8, the control circuit 40 also corresponds, functionally and partially, to the outputting section. The results outputted at step S49 are displayed by the display unit 6, the control circuit 40 and the display unit 6 compose an outputting device or section. If the results outputted at step S49 are transmitted to an external apparatus, the control circuit 40 and the communication unit 7 correspond functionally to the outputting section.

FIG. 9 shows a practical example. If the information code 100 shown in FIG. 5 has a configuration shown in (A) of FIG. 10, the processes at steps S46 to S49 makes it possible to determine a color at a predetermined position (e.g., a central position) in each of the information addition regions 121, 122, 123 and 124. As a result, as shown in (A) of FIG. 10, there is no writing in the respective information addition regions 121, 122, 123 and 124, data showing that the color is the same as that of the respective information addition regions 121, 122, 123 and 124 should be outputted. In this example shown in (A) of FIG. 10, such data showing "white," "white," "white," and "white," are outputted because the color of the information addition regions 121, 122, 123 and 124 is a light color such as white. Meanwhile, in (B) of FIG. 10 where the two information addition regions 122 and 123 are painted in a dark color such as black, the data for the information addition regions 121, 122, 123 and 124 are outputted as "white," "black," "black," and "white." The reader or external apparatus can therefore analyze such outputted data to interpret which checkbox position has been checked by a user. Various other techniques for determining colors of the information addition regions 121, 122, 123 and 124 can be used. For example, a luminance level can be detected at the central positions of each of the information addition regions 121, 122, 123 and 124 as to whether or not its luminance level is equal to or higher than a threshold. In this case, the affirmative determination results in to "white" (or a light color), while the negative determination results in "black" (or a dark color).

How to determine colors in the information addition regions will not be limited to the techniques for detecting the colors as binary values. For example, an alternative way is to determine, by using a known color detecting technique, that the colors correspond to which of previously designated different colors. In this case, a value showing a detected color can be outputted such that the value "2" is for "red" and the value "3" is for "blue".

In the present embodiment, it is possible to produce the information code 100 in which a space other than the data recording regions, error-correction-code recording regions, specification pattern regions is provided. Such a space is the free space 110 in this example and the error correction cannot be applied to the free space 110 and there is no need to set error correction codes to the free space 110. It is therefore possible to effectively and efficiently provide the error correction codes to the data recording region.

In addition, in the information code reader, various sections are arranged, which are the data-recording-region reading section reading data recorded in the data recording region and the additional-information acquiring section analyzing the free space of a code image and acquiring additional information added in the free space. By this configuration, the information code reader is able to read information recorded by the sells arranged in the data recording region as well as information added to the free space. It is thus possible to obtain and utilize information or other types of data added to the code after the production thereof.

In the information code producing apparatus, the identification indications are arranged inside the free space to show the extents of the information adding regions. The additional-information acquiring section of the information code reader thus analyzes the inside of the information addition regions so as to acquire the additional information recorded in the information addition regions.

Hence, users can use the identification indications as markings, whereby it becomes easier to find places where information should be written. The reader is able to find only the information addition regions and analyze them to obtain the written additional information. This makes easier to recognize the additional information in a precise and reliable manner.

Moreover, the information code producing apparatus configures the information addition regions which are painted by one or more type of colors, so that information can be written with other types of color different from the inside color of the regions. In contrast, the additional-information acquiring section of the information code reader includes a detecting section detecting the additional writing of the other type of colors in the information addition regions of the code image.

Accordingly when a user writes information in the information addition regions using the other types of color (which is different from the inside background of the information addition regions), the information code reader is able to more accurately recognize the written information.

The information code producing apparatus is configured to produce an information code in which the identification indications are shown by a color different from the predetermined type of colors so that the indications are arranged as markings to delineate their outer edges. Responsively the detecting section of the information code reader is configured to determine whether or not parts or the whole areas in the markings of the code image are painted with the other types of color.

Hence, while the information code is provided with cells for recording data, users can utilize the code as a bubble sheet (or answer sheet) in which data being interpreted are not recorded. This gives the information code multiple functionality, whereby users can enjoy improved convenience.

In the information code producing apparatus of the embodiment, the information code is produced where the markings showing the outer edges of the information addition regions are rendered in a color different from the predetermined type of color and shown as the information indications. The detecting section of the reader, on the other hand, analyzes the inside of the information addition regions of the code image and extracts symbols drawn with other types of color inside the information addition regions.

Hence, with the information code provided with cells for recording data, there are provided an area in which data for being interpreted are not recorded. This area serves as an input region for users, where the users can input symbols (characters, numerals, and/or various other notes). This also gives the information code multiple functionality, being highly convenient for users.

In addition, in the information code reader, the color determining section and the detecting section. The color determining section recognizes the whole code image based on the cell arrangements (cells of a plurality of rows and cells of a plurality of columns) in the data recording region of the code image, and determines a color of cell in each row, column by column. The detecting section is configured to detect a symbol on each cell on the basis of color determined results on each row and each column in the information addition regions, which is performed by the color determining section.

In this way, the whole code image can be recognized as cell arrangements on the plurality of rows and the plurality of columns, and, based on the color determined results on each cell on the cell arrangements, a symbol is extracted. Accordingly, even if there occur distortion and/or other defects in the code image due to, for example, a lean of the reader, the code image can be normalized before proceeding to further processing the code image. Hence the symbol can be recognized more accurately.

By the information code producing apparatus, the information code is produced such that the positional data showing the positions of the information addition regions in the code area are recorded in the data recording region. The additional-information acquiring section of the reader uses the positional data, which are obtained from results read from the data recording region by the data-recoding-region reading section, so as to specify the positions of the information addition regions in the code image. Hence, the information addition regions are analyzed to provide additional information added to the information addition regions.

In this configuration, when there is no prepared data to specify the positions of the information addition regions in the reader, the additional-information acquiring section of the reader is able to accurately specify the positions of the information addition regions in the code image.

In addition, the information code producing apparatus produces an information code in which predetermined identification information is recorded in the data recording region. Responsively to this configuration, the additional-information acquiring section of the reader uses results read in the data recording region by the data-recording-region reading section, and acquires additional information added in the free space in cases the identification information has been recorded in the data recording region.

As a result, if no identification information is recorded in the data recording region, the free space is not analyzed and no information is obtained therefrom. In other words, if it is not necessary to analyze the free space, unnecessary analysis and information acquisition can be omitted by not recording the identification information in the data recording region. In contrast, if the free space should be analyzed, the identification information is added in the data recording region, resulting in the analysis and information acquisition of and from the information addition regions.

The information code reader functionally includes the outputting section which outputs both information read by the data-recording-region reading section and the additional information acquired by the additional-information acquiring section.

Hence, not only information previously recorded in the data recording region but also information added to the free space after producing the code can be outputted through the reader. This makes it possible that a function (i.e., output of the additional information) which cannot be realized by existing schemes for information codes can be provided.

In the information code producing apparatus 2, the data acquiring section, the arrangement-position-information recording part, and the data-recording-region producing section are provided. The data acquiring section acquires data being interpreted. In the arrangement-position-information recording part, arrangement position information is recorded which specifies arrangement positions of the code area, at respective of which plural data words expressing the data being interpreted are arranged. When the free space 110 is placed in the code area, format information is recorded at a predetermined position in the code area in a specific format configuration and respective data words expressing the data being interpreted and acquired by the data acquiring section are arranged in the data recording region based on the arrangement position information. Both the format information recording and the data words arrangement are performed by the data-recording-region producing section.

In contrast, the information code reader 10 includes the correspondence information recording part, the determining section, and the interpreting section. In the correspondence information recording part, correspondence information is recorded which corresponds to the arrangement position information recorded in the arrangement-position-information recording part and specifies respective arrangement positions of plural data words being mapped in the code area. The determining section determines whether or not there is a specific format configuration at the predetermined position in the code area when the information code 100 is imaged by the imaging unit. Further, the interpreting section specifies the positions of the respective data words in the code area with use of the correspondence information when the determining section determines that there is the specific format configuration, and interprets the specified data words as the data being interpreted.

Accordingly when the determining section of the reader 10 can confirm the format configuration arranged at the predetermined positions 105. That is, it is possible to determine if or not an information code now being checked is the distinguishing information code 100 (having the free space 110) produce by the information code producing apparatus 2. When being determined to be such distinguishing information code, the information (i.e., the correspondence information) capable of specifying the arrangement positions of plural data words in the code area is used for specifying such arrangement positions, thus interpreting the data being interpreted.

In the data-recording-region producing section of the information code producing apparatus 2, the cell arrangements at the predetermined positions 105 are configured in a state where the arrangements are reflected by a predetermined type of mask pattern if the free space 110 is arranged in the code area. Hence, the determining section of the reader 10 is configured to determine whether or not the predetermined type of mask pattern is reflected in the cells at the predetermined positions 105 in response to imaging the information code 100 by the imaging unit. The interpreting section of the reader 10 then interprets data to be interpreted, when the predetermined type of mask pattern has been applied to the cells at the predetermined positions 105.

In this configuration, whether or not the information code 100 (having the fee space 110), which is to be produced by the information code producing apparatus 2, is a distinguishing information code can be determined reliably depending which type of mask pattern is applied at the predetermined positions 105. In consequence, an amount of data necessary for providing the format information can be avoided from being increased, while being still easier to configure the specific format.

The arrangement position information (i.e., the correspondence information) defines correspondence between plural data words to be ordered for expressing data being interpreted and arrangement positions of the ordered data words in the code area. Practically this information functions as a rule that regulates the data words being ordered in their arrangement positions in the code area, to correspondent positions in the other type of code 120 used when being expressed differently from the information code 100. The interpreting section operates when the determining section determines that the cells at the predetermined positions 105 have the specific format configuration, and interprets the other type of code 120 under the condition that the data words being ordered in their arrangement positions in the code area are replaced by cells arranged at the corresponding positions in the other type of code 120. It is thus possible to read well the distinguishing information code 100 (having the free space 110) by using the reading scheme for the other type of code 120.

Second Embodiment

Referring to the drawings, a second embodiment will now be decried.

In the second embodiment, there is provided a system 1 which uses the information code, and the system uses an information code 100. The information code 100 according to the second embodiment differs from the information code 100 explained in the first embodiment only in the configuration of a free space 110. How to produce the information code and an information code producing apparatus 2 in the second embodiment also differ in only the production method of the free space 110 from those explained in the first embodiment. In practice, the differences lie in the contents of the header data produced at step S5 and the process at step S18 in FIG. 8. An information code reader 10 employed in the second embodiment differs from that of the first embodiment only in that how the free space 110 is analyzed (practically the processes at steps S65-S70 in FIG. 13. The configurations other than the foregoing are similar or identical to those explained in the first embodiment, thus omitting redundant explanations.

(Information Code)

As shown in FIGS. 11 and 14, the information code 100 of the second embodiment has a free space 110, inside of which identification indications delineating the extents of information addition regions 221, 222 and 223. Users can only write information inside these information addition regions 221, 222 and 223 additionally after producing the information code. Practically, as shown in FIG. 14, the information addition regions 221, 222 and 223 are rendered in one or more types of predetermined colors (for example, a single color pattern of light color such as white or yellow, or designs composed of a plurality of types of light color such as a combination of white and yellow). The information addition regions 221, 222 and 223 are sectioned by outer edges shown as markings 221a, 222a and 223a, and the markings are shown by a color (for example, a dark color such as back or deep blue) different from the predetermined color (i.e., the color showing the extents of the information addition regions, thus the markings being the identification indications. In this way, additionally writing into the information addition regions 221, 222 and 223 can be done using a different color from the foregoing predetermined color. Such writing can be recognized by the reader, as described before.

The contents recorded in the information code 100 are composed of for example as shown in FIG. 12, in which header data are mapped at the head of a data arrangement which is followed by input data (i.e., data to be interpreted). In the example shown in FIG. 12, the input data are compressed by a known technique and converted into data words (i.e., data code words). The header data of this information code 100 is also referred to as a frame QR header or a header for a QR code in the following description.

In this embodiment, there are provided a region in which data words or data code words of the header data and input data (being interpreted) are recorded and a region in which the format information is recorded. These regions serve as a data recording region. In addition, as the header data (i.e., the frame QR header), there are still recorded information used for specifying the type (version) of another type of code 120 explained in the first embodiment, and identification information of specifying a format to regulate the free space. This other type of code 120 is a one kind of code used to interpret the information code 100 and made to correspond to the information code 100 via an arrangement conversion table (shown in FIG. 11).

Moreover, in the example of FIG. 12, there are recorded information (first information) specifying that the free space is formatted by an OCR format (symbol recognition format) shown in FIGS. 11, 13 etc. and information (referred to as fill-in field position information corresponding to the second information) capable of specifying an information addition region in the free space, as a position at which information can be additionally written. Of these two types of information, the first information exemplifies identification information showing that there are presented information addition regions. The second information (practically, the fill-in column position information) exemplifies position data showing the positions of the information addition regions in the code area.

In the example shown in FIGS. 11 and 13, the fill-in field position information is recorded which is composed of position data and which is capable of specifying an upper-left column position and an upper-left row position and a lower-right column position and a lower-right row position of each of the information addition regions 221, 222 and 223, which are composed as fill-in enabling region (or fill-in field). Practically, as shown in FIG. 11, the information code 100, which is rectangular, is divided into grids of a plurality of rows and a plurality of columns, in which the upper-left and lower-right row and column positions of the respective information addition regions 221, 222 and 223 are combined to form the fill-in field position information (position data). In this example in shown in FIG. 11, the widths of each row and each column of the grid are set to be equal to the widths of a single cell in both row and column directions, respectively. If both the column and row positions at the upper-left corner and the column and row position at the lower-right corner are specified as to each of the information addition regions as shown in FIG. 12, it can be interpreted such that each information addition region is extended between the upper-left and lower-right column positions and between the upper-left and lower-right row positions.

(Production Process of Information Code)

In the information code producing apparatus 2 of the present embodiment, the foregoing header data are produced at step S5 in FIG. 8. And at step S18 of FIG. 8, such header data are used to configure the free space 110 as shown in FIGS. 11 and 14. In the case of FIG. 12, the upper-left and lower right positions of each of the information addition regions 221, 222 and 223 (i.e., the fill-in fields) are specified by their row and column positions. Hence, at step S18, such oblong (e.g., rectangular) figure data, whose corner positions are decided by the specified positions, are arranged as a rectangular field for each of the information addition regions (i.e., the fill-in fields) 221, 222 and 223. In the example shown in FIGS. 11, 14 etc., the information addition regions (the fill-fields) are set previously as rectangular (or quadrangular) figures (whose whole fields are rendered in a single type of light color or a plurality of types of light color. Step S18, each figure is arranged such that the upper-left and lower-right positions of each of such figures are given by the upper-left and lower right positions of each fill-in field specified in the header data. Along the outer edge of each of the information addition regions (fill-in fields) 221, 222 and 223, markings 221*a*, 222*a* and 223*a* showing such edges are arranged as identification indications. In areas next to the information addition regions (functioning as checkboxes) 221, 222 and 223, symbols and/or figures consisting of characters and/or numerals may be arranged. In such a variation, the areal positions for displaying the characters and/or numerals may be selected by a user, so that, in this case, characters inputted by the user may be arranged at the displayed positions at step S18.

(Reading Process of Information Code)

A reading process performed by the information code reader 10 in this embodiment will now be described with reference to FIG. 13. In the reading process shown in FIG. 13, steps S60-S63 are the same in contents as steps S40-S43 explained in FIG. 9 in the first embodiment. When interpreting the data of the data recording region at step S63, the format information contained in the header data (i.e., the frame QR header) is read (S64). If this format information is not a preset format information showing an OCR format, the determination at step S65 becomes No. For example, the format information shows the bubble sheet format explained in the first embodiment, the processing is determined No at step S65, and may follow steps S46-S49 of FIG. 9 (which will be explained later). In FIG. 13, processes being performed when the determination at step S65 is No are being omitted from being drawn.

In the case of Yes at step S65, that is, the format information contained in the header data (the frame QR header) is the preset information showing the OCR format, fill-in field position information (position data) included in the header data is read, and the positions of the information addition regions in the information code 100 are specified (step S66). The position information is composed of a plurality of rows and a plurality of columns which show ranges in both the columns and rows. It is then determined whether or not all the specified information addition regions are ended (S67), and if not, the processing goes through No at step S67.

Practically, in this case, the remaining information addition regions are then subjected to the determination and output of the determination. In other words, at step S68, at the position of any of the information addition regions, which is specified by the fill-in field position information (i.e., the position data specifying both row and column ranges of each information addition region), the type of a color is checked column by column in each row in each of the information addition regions. That is, the type of color is determined at each position designated by each of combinations of all the rows and columns.

This color determination at each position can be performed by the same method for the QR code, for example. That is, a known color determination method can be used, provided that cells are arranged in the information addition regions. This provides color determined results to all the row and column combinations. That is, in each of the information addition regions, as shown by "1, 2, 3" in FIG. 13, dark-color portions are determined to be dark-color cell-shaped portions, while light-color portions are determined to be light-color cell-shaped portions, whereby characters can be detected in a matrix form of dots.

Then at step S69, a shape extracted as a portion whose color is different from the background color in each of the information addition regions is compared with symbol patterns prepared beforehand, thus selecting a corresponding symbol. For example, the background color is an original light color and the extracted portion shows a dark color. The foregoing technique for the symbol selection through comparison with the symbol patterns is known in for example an OCR application.

The step S69 is followed by step S70 where information about the determined results at step S69 is added to the tail of already interpreted data and then outputted. The processing is then returned to step S66 to seek for a remaining information addition region which has not been processed at step S68 yet. If there is still such a remaining information region, the processing proceeds to step S68 through the determination No at step S67. When the steps S68 to S70 have been finished for all the information addition regions, the determination at step S67 becomes Yes, ending the reading process.

For example, if the information code 100 shown in FIG. 11 has a confutation as shown in (A) of FIG. 14, steps S66 to S70 in FIG. 13 enable symbols (such as characters and/or numerals) recorded in the information addition regions 221, 222 and 223 to be recognized individually. Hence, if there is writing in the information addition regions 221, 222 and 223 as shown in (A) of FIG. 14, additional information will not be recognized, thus being no output of the additional information. However, as shown in (B) in FIG. 14, if numerals "1", "2" and "3" have been written in a dark color, such as black, in the regions 221, 222 and 223, the output data therefrom show the numerals "1", "2" and "3". Accordingly the reader or an external apparatus is able to analyze such outputted data, thereby making such a device interpret what data have been inputted or additional written by a user.

In the present embodiment, the control circuit 40 functionally exemplifies a color determining section. This color determining section uses the cell arrangements in the data recording region of a code image such that the section recognizes the code image, as a whole, as assumed cell arrangements composed of plural rows and plural columns and determines a color column by column in each of the rows in the assumed cell arrangements.

The control circuit 40 also functionally serves as a detecting section. This detecting section analyzes the insides of the information addition regions of the code image, so that a symbol different in color from each of the information additional regions is extracted. This extraction is followed by the foregoing color determining section.

An alternative example to the above can be provided as follows. How to recognize symbols recorded in the information addition regions 221, 222 and 223 is not always confined to the foregoing dot-matrix recognition. A known OCR technique can be used, which simply recognizes the inside of the regions 221, 222 and 223 and then extracts symbols therefrom on the OCR basis, without recognizing the symbols as cell-shaped portions as described.

Third Embodiment

A third embodiment will now be described.

A system which sues an information code, which is according to the third embodiment, is the same in hardware as that described in the first embodiment, so that the hardware configurations shown in FIGS. 1 and 2 are also adopted in the third embodiment.

In the system according to the third embodiment, the information code producing apparatus 2 (refer to FIG. 1, etc.) produces an information code 200 shown in (B) of FIG. 15. Inside the code area of this code, there are also arranged specification pattern regions in which specification patterns having a predetermined shape (such as position detection patterns 204), a data recording region in which data are recorded by a plurality of types of cells, and information addition regions 221, 222, 223 and 224. The data recoded in the data recording region includes, at least, data being interpreted. Addition information, which is different from the information recorded in the data recording region, can be recorded in the information addition regions. The extents of the information addition regions 221, 222, 223 and 224 are delineated by identification indications (i.e., markings 221a, 222a, 223a and 224a).

As shown in (B) of FIG. 15, the information code has a free space 210 whose display configuration is the same as that of the free space 110 according to the first embodiment. Inside the free space 210, the identification indications (markings 221a, 222a, 223a and 224a) indicates how the information addition regions 221, 222, 223 and 224 extend. Users can write information into these information addition regions 221, 222, 223 and 224 (e.g., application in black) as after use of the code.

To be specific, the inside areas of these regions 221, 222, 223 and 224, which are sectioned by the markings 221a, 222a, 223a and 224a, are drawn in one or more given colors (e.g., white), while the outer-edge markings 221a, 222a, 223a and 224a themselves are delineated in a given color (e.g., black) different from the inside areas of the regions 121 to 124, as the identification indications. Hence, it is possible to write information into the information addition regions 121 to 124 in another type of color or hue different from the inside areas of the regions 121 to 124. When such writing is performed, the information code reader 10 can recognize such writing in the regions 121 to 124.

In this example, as the identification indications, the markings 221a, 222a, 223a an 224a are provided as quadrangular figures so that their inside areas serve as the information addition regions 221, 222, 223 and 224. However the regions may be changed to have other shapes and/or color configurators as long as the boundaries (edges) of these regions 221 to 224 can be specified. For example, if the regions 221 to 224 are drawn in a predetermined color (e.g., white), the background of the regions 221 to 224, which is adjacent to the regions in the outside space of the regions, may be distinguishingly drawn in a color different in hue or luminance from the predetermined color of the regions. In this alternative example, the outside background itself serves as the identification indication.

In FIG. 15, (B), the configurations other than the free space 210 are the same as those of a known QR code (registered trademark), so that, as shown in (A) of FIG. 15, specification pattern regions, a data recording region, and error-correction-code recording regions are arranged inside the code area. Fixed patterns such as position detection patterns 204 are arranged in the specification pattern regions, data being interpreted are recorded in the data recording region, and error correction codes are recorded by a plurality of types of cells. How to record data code words into the data recording region and how to record error correction code words into the error-correction-code recoding regions are the same as those for a known QR code (registered trademark). For example, the standards on JISX0510 can be used for arranging the position detection patterns 204, arranging data code words in the data recording region, and arranging the error correction codes.

As shown in FIG. 15, (A), there is provided an information code 200' in which only white cells are used as code words expressing a part of the code region. This part AR is used as a free space 210, and as shown in FIG. 15, (B), figures, patterns, hues, or designs composed of a combination of such factors, and/or bits of information expressed by one or more symbols are displayed in the free space 210. The free space 210 shown in FIG. 15, (A), has no errors, due to spots etc., in the code area and has an arrangement of light-color cells (e.g., white cells) which occupies an overall area thereof. In cases where the free space 210 shown in FIG. 15, (A), is used as a basic configuration and the markings 221a, 222a, 223a and 224a and various kinds of guides are displayed as shown in FIG. 15, (B), error correction codes recorded in the error-correction-code recording regions may still be applied to correcting an error of data in the free space 210 in a known error correction manner, although the free space is different in the data display configuration from the original one shown in (A) of FIG. 15.

For example, if the free space 210 is filled in as shown in FIG. 15, (C), the markings 221a, 222a, 223a and 224a, display of guides such as character information 225, and the written-in portions change display of the free space. This change results in that light/dark configurations of the respective cells in the free space are changed from the original shown in FIG. 15, (A). Even in this case, the known error correction, which uses the error correction codes recorded in the error-correction-code recording regions, can still be applied to this free space.

In the imaging code 200 shown in (B) of FIG. 15, the free space 210 can be positionally specified, so that when designs and/or information is additionally displayed in the free space 210, an error position due to this display is known previously. In such a case, it is also possible to configure error correction codes in the error-correction-code recording regions such that the reader 10 is able to perform erasure correction based on the known position (i.e., an error position) of the free space 210. For this correction, information showing the position of the free space 210 is previously recorded in the data recording region or previously stored in the reader 10 (FIG. 1). With such a configuration, the reader 10 is able to detect the position of the free space 210 (that is, the positions of data code words which cause errors) when reading the code. The reader 10 performs the erasure correction using the error correction codes recorded in the error-correction-code recording regions, in which the data code words existing in the free space 210 are error-corrected. In this erasure correction, by assuming that all of the code words existing in the free space 210 cause errors, such code words can be error-corrected.

In cases where a part of a known QR code (registered trademark) is configured as the free space 210 as shown in (B) of FIG. 15, identification information shown in (A) of FIG. 19 may be contained in the data recorded in the data recording region. FIG. 19, (A), conceptually shows the configuration of data recorded in the data recording region for interpretation. In this example, data of predetermined configuration (%% MARKSHEET %%) is added to the head portion of data being interpreted. Hence, when the reader 10 detects this identification information (%% MARKSHEET %%) from data being interpreted which are recorded in the data recording region, the reader is able to recognize the information addition regions 221, 222, 223 and 224. In contrast, when such identification information (%% MARKSHEET %%) cannot be detected, the process for recognizing the information addition regions 221, 222, 223 and 224 is skipped, so that the ordinary decoding process is carried out. Alternatively, in this example, it is desired to include, in the data recorded in the data recording region, positional data designating the positions of the information addition regions 221 to 224 and other accompanying information, besides ordinary data being interpreted.

Incidentally data shown in FIG. 19, (A) shows data being interpreted, which is arranged before the terminator, which is data showing the end of data being interpreted which are among data in the data recording region. Pat code words arranged after the terminator are omitted from being drawn in the figure, where the pat code words are remainder code words to which interpretation is not applied. In this configuration, by way of example, all the regions of the pad code words may be arranged with only white cells, and such white-cell regions may be processed as the free space 210.

The identification information is not limited to this example, but may be developed to others. For example, as the mode number, a dedicated mode number may be used. The QR code standards define, as the mode number, 1: numeral mode, 2: alpha-numeral mode, 3: combination mode, etc. Hence, as one of these mode numbers, 14: additional information recognition mode may be set. If the mode number "14" is detected in the data from the data recording region, the recognition process is performed for the information addition regions 221 to 224.

The information code according to the representative example of the foregoing third embodiment or modifications thereof, which will be detailed below, may be employed by not only the first and second embodiments but also the fourth and subsequent embodiments.

Modification 1 of Third Embodiment

A first modification of the third embodiment will now be described.

As shown in FIG. 16, (B), shows an information code 200 according to the first modification 1, in which the free space 210 is provided. This modification 1 differs from the representative example of the third embodiment (i.e., the configuration shown in (B) of FIG. 15) only in that the markings 221a, 222a, 223a and 224a in the free space 210 and the character information 225 are lower in density than those of the third embodiment. The remaining components are similar to those of the representative example (FIG. 15) of the third embodiment. In this modification, the data in the data recording region can be read by a reading method for the known QR code (registered trademark), similarly to the reading method explained in the representative example.

In this modification, the information code producing apparatus 2 produces the specification pattern regions (including the regions of the position detection patterns 204) and the data recording region by a method similar to that for a known QR code (registered trademark), whereby light cells and dark cells are arranged. The information code 200 is produced such that at least part of the data recording region is a given functional region including the information addition regions 221, 222, 223 and 224. To be specific, the functional region is provided as the free space 210 in which characters, patterns, and/or symbols can be displayed.

In this configuration, part of the region in which code words are to be arranged in the QR code is set as the functional region (the free space 210) including the information addition regions 221, 222, 223 and 224. Inside this predetermined functional region (the free space 210), guide information (i.e., the markings 221a, 222a, 223a and 224a and/or the character information 225) composed of symbols and/or patterns are formed. Additionally the region for the guide information and regions other than for the guide information (i.e., the background region) have values of color (luminance levels of color) which enable the reader 10 to be able to detect the values as a light color.

In this example, on the basis of the information code 200' shown in (A) of FIG. 16, which is similar in configuration to (A) of FIG. 15, the guide information such characters, patterns, and/or symbols are formed as shown in (B) of FIG. 16. Hence, in the free space 210, the guide information regions and the remaining region other than the information addition regions 221 to 224 compose the background region. Practically, as shown in (B) of FIG. 16, all the displayed portions in the free space 210 are rendered in a color which makes the reader recognize it as a light color. That is, the colors of the markings 221*a* to 224*a*, character information 225, the inside areas of the markings 221*a* to 224*a*, and the remaining background in the free space are lower in color density than the dark cells composing the specification patterns and the data recording region but higher in color density than the light cells composing the specification patterns and the data recording region.

More practically, the character information 225 and the markings 221*a*, 222*a*, 223*a* and 224*a* are displayed in an ash color which is determined to be a light color, resulting in that reading the code shown in (B) of FIG. 16 where there is no writing into the free space will not cause errors in recognizing the positions of the character information 225 and the markings 221*a*, 222*a*, 223*a* and 224*a*.

Meanwhile, as shown in (C) of FIG. 16, if information is additionally written into the information addition regions 221 to 224 in a color which is determined to be a dark color, the positions of such written regions are recognized as being positionally errors when the information code 200 is read. Such a color is for example black which is the same in hue as the dark cells, or a color whose density is lower than that of the markings 221*a* to 224*a* and the character information 225.

In this configuration, a generally used error correction method is used to error-correct code words mapped at the additionally written positions using the error correction codes recorded in the error-correction-code recording region.

In this example, by detecting the code words causing errors, the positions at which the additional writing has been performed may be detected. Alternatively, it is also possible to actually detect light/dark levels at the positions of the information addition regions 221 to 224 so as to detect the additional written positions. These detection schemes suppress an amount of regions which need the error correction.

In the example shown in (A) of FIG. 16, it is assumed that there are no errors, due to spots etc., in the code area and, under this condition, cells are arranged so that the free space 210 is as a whole displayed in a light color. And, as shown in (B) of FIG. 16, the markings 221*a* to 224*a* and the character information 225 are displayed in a color determined to be a light color in the free space 210. In place of this example, there are provided other examples. For example, the configuration shown in (A) of FIG. 16 can be replaced as follows. That is, it may be assumed that there are no errors, due to spots etc., in the code area and, under this condition, cells are arranged so that the free space 210 is as a whole displayed in a dark color. And as shown in (B) of FIG. 16, the markings 221*a* to 224*a* and the character information 225 are displayed in a color determined to be a dark color in the free space 210. For example, the background inside the free space 210 is formed in a dark color such as black and the markings 221*a* to 224*a* and the character information 225 are arranged in a color (such as an ash color) whose density is lower than the background and the dark cells but higher than the light cells.

Modification 2 of Third Embodiment

Referring to FIG. 17 etc., a modification 2 of the third embodiment will now be displayed.

The modification 2 provides an information code 200, whose appearance is shown in (A) of FIG. 17. This appearance is the same as that of the information code explained as one representative example in (B) of FIG. 15. A known reading technique for the QR code (registered trademark) can be used to read the information code shown in (A) of FIG. 17, like the representative example.

In producing the information code shown in (A) of FIG. 17, the information code producing apparatus 2 arranges light-color and dark-color cells in order to form the specification pattern regions (i.e., the regions of the position detection patterns 204) and a data recording region. In addition, at least part of the data recording region of the information code 200 is used as a predetermined functional region including the information addition regions 221, 222, 223 and 224. The functional region is realized as the free space 210 in which characters, patterns, and/or symbols are rendered. In this code configuration, part of the region in which code words are to be arranged in the QR code (registered trademark) is divided out as the functional region (i.e., the free space 210). Guide information (including the markings 221*a* to 224*a* and the character information 225), which is composed of symbols, patterns, and/or others, is arranged inside this functional region.

Based on light/dark configurations between the region occupied by the guide information given inside the functional region (the free space 210) and a remaining region (the background and the information addition regions 222 to 224) other than the guide information, a light/dark map specifying light and dark cell arrangements in the functional region. This light/dark map is then used to assign code words to both the data recording region and the error-correction-code recording regions.

For example, assume that the free space 210 serving as the functional region is set as shown in (A) and (B) of FIG. 17. If there is no additional writing into this free space, the light/dark configurations (the light/dark map) of the cell positions in the free space 210 can be shown by (C) of FIG. 17. Incidentally, the example in (B) of FIG. 17 has regions assigned to guide information (the markings 221*a* to 224*a* and the character information 225) and regions assigned to the remaining portions (the background and the information addition regions 221 to 224). The former regions are displayed in a color which is determined to be a dark color (e.g., dark cells having the same hue (black cells, or others), whilst the latter regions are displayed in a color which is determined to be a light color (e.g., light cells having the same hue (white cells, or others).

The light/dark map shown in (C) of FIG. 17 provides information used to determine whether, during the reading process, each cell should be recognized as either a light cell or a dark cell depending on a light/dark degree read by the reader at the central position of each of the cells assigned to the free space 210. For example, in (B) of FIG. 17, cells annotated by a character M (man) have its center position which is assigned to a dark color. Accordingly, during the reading process which reads a color at the center position of each cell and check it is light or dark, the cells annotated with the character "M" is determined to be a dark color. Hence, the light/dark map gives this cell a black color. The same manner can be applied to the other cells, where it is determined whether each cell should have either a light color or a dark color, depending on the read color at the central position of each of the cells.

In producing the information code 200, the light/dark map shown in (C) of FIG. 17 is produced, whereby it can be regarded the cells of code words in the fee space 210 are arranged according to the light/dark map. Using this map, the code words in both the data recording region and the error-correction-code recording regions are arranged.

For example, in cases where the free space 210 is filled with pad code words, the pad code words in the free space 210 are given light/dark cells which correspond to data produced by the code words in (C) of FIG. 7. In this case, data code words other than the pad code words and the error correction code words are arranged outside the free space 210.

Alternatively, data code words may also be arranged inside the free space 210, and these data code words may have the cell arrangements which agree with the light/dark map shown in (CC) of FIG. 17. In this case, based on both data code words (data code words being interpreted) arranged outside the free space 210 and data code words arranged inside the free space 210, code words may be configured and recorded in the error-correction-code recording regions.

When the code words are recorded in the data recording region and the error-correction-code recording regions as described, an image code with no addition writing shown in (C) of FIG. 17 is read. In this case, the free space 210 (i.e., the functional region) is imaged correctly, the light and black cells in the free space 210 are recognized as shown in (C) of FIG. 17, whereby the free space 210 can be treated under the condition that there are no errors in the free space 210.

In contrast, information is additionally written in when the information addition regions 221 to 224, the written positions (regions) are recognized as being error positions. In this case, a generally known correction method is used to error-correct code words at the positions at which the information are additionally written, by using error correction codes in the error-correction-code recording regions. Alternatively, specifying erroneous code words makes it possible to specify the additional writing positions. Still alternatively, it is also possible to actually detect light and dark cells in the positions of the information addition regions 221 to 224, thus specifying the additional writing positions, resulting in that regions which need the error correction can be suppressed in number from increasing.

Fourth Embodiment

Referring to drawings, a fourth embodiment will now be described.

The fourth embodiment provides a system which uses an information code, in which the system is the same as that described in the first embodiment, so that the configuration shown in FIGS. 1 and 2 are still provided.

In this system according to the fourth embodiment, the information code producing apparatus 2 (refer to FIG. 1, etc.) can produce an information code 300 shown in (B) of FIG. 18. This code has a code area in which there are arranged specification pattern regions, a data recording region, and information addition regions 221 to 224. The specification pattern regions are arranged for mapping predetermined-shaped specification patterns, which include an L-shaped alignment pattern 304a and timing patterns 304b with light and dark cells alternately mapped and formed to an L-shape along boundaries of the code area. A plurality of types of cells are recorded in the data recording region to express data, i.e., desired information. Additional information which is different from information recorded in the data recording region can be additionally recorded in the information addition regions 221 to 224. Identification indications (markings 221a, 222a, 223a and 224a) are also arranged to delineate the portions of the information addition regions 221 to 224. Inside the code area, a free space 310 is formed to avoid the specification pattern regions by using a method different from that for recording data in the data recording region. The free space 310 has a predetermined size which is larger in area than each of the cells and functions as a functional region. Recording data and/or displaying designs can be into or in the free space 310.

The information code is configured as a known DataMatrix code except for the free space 310 formed therein. As shown in (A) of FIG. 18, inside the code area, there are formed specification pattern regions, a data recording region, and error-correction-code recording regions with error correction codes produced by a plurality of types of cells. How to record data code words into the data recording region and how to record error correction code words into the error-correction-code recording regions are the same as those for a known DataMatrix code. How to arrange the alignment patterns 304a and the timing patterns 304b in the code area, how to arrange data code words in the data recording region, and how to arrange error correction code words in the error-correction-code recording regions are regulated by the standards on ECC 2000 vir., for example.

In the code shown in (A) of FIG. 18, there is shown an information code 300' in which code words in a part of the code region are expressed by only while cells. This area AR, which is expressed by only the white cells, is provided as a free space 310. As shown in (B) of FIG. 18, guide information (i.e., markings 221a, 222a, 223a and 224a and/or character information 225) is arranged in the free space 310. The insides areas of the markings 221a to 224a function as information addition regions 221, 222, 223 and 224. When the guide information is written in the free space 310 as shown in (B) of FIG. 18, this code configuration becomes different in data display mode from its original one shown in (A) of FIG. 18. However, the data in the free space 310 still can be error-corrected using a known technique which uses error correction codes recorded in the error-correction-code recording regions.

In the information code 300 shown in (B) of FIG. 18, the position of the free space 310 is previously designated. Hence error positions, which are due to display of designs and/or information added to the free space 310, are also known in advance. It is therefore possible to configure error correction codes recorded in the error-correction-code recording regions such that the position of the free space 310 is used as the error positions in performing erasure correction. In this case, information showing the position of the free space 310 can be recorded previously in the data recording region or in the reader 10 (refer to FIG. 1). By this previous storage, the reader 10 is able to understand the position of the free space 310 (i.e., the positions of data code words causing errors). The reader 10 is able to perform erasure correction using the error correction codes recorded in the error-correction-code recording regions, so that the data code words in the free space 310 can be error-corrected.

Additionally, in a case where a part of the existing DataMatrix code is changed to the free space 310 as shown in FIG. 18, the data recorded in the data recording region includes identification information as shown in (B) of FIG.

19, which conceptually shows the configuration of data being interpreted and recorded in the data recording region. In this configuration, data configured as being "%% MARKSHEET %%" is added to the head of the data being interpreted. The reader 10 therefore detects this identification information "%% MARKSHEET %%" from the data recorded in the data recording region. Responsively to this detection, the reader can perform a recognition process for recognizing the information addition regions 221 to 224. If there is no detection of the identification information "%% MARKSHEET %%", an ordinary decoding-process is performed by the reader. In this example, it is preferred that, in addition to the ordinary data, position data specifying the positions of the information addition regions 221 to 224 and other necessary accompanying information are also contained in the data recorded in the data recording region.

The identification information is not always limited to the foregoing example, but may be developed into some other examples. For example, dedicated code words can be used. If specifications for the DataMatrix regulate, for example, 0 to 128 to ASCII characters and 233 to combination mode, "234" may be assigned newly to a special code word for the image recognition. Hence, the data in the data recording region includes the code word at "234", the reader is able to try to recognize the information addition regions 221 to 224. If there a unused code word, this unused code word can be contained in the identification information. When it is found that the unused code word is present in the data recording region, the information addition regions 221 to 224 may be subjected to the recognition process.

Modifications of the configuration of the fourth embodiment can be provided as those of the third embodiment, which are the modification 1 (a light color configuration in the free space 310) and the modification 2 (use of the light/dark map for configuring the error-correction-code recording regions), which have been described already.

The information code according to the representative example of the foregoing third embodiment or modifications thereof, which will be detailed below, may be employed by not only the first and second embodiments but also the fourth and subsequent embodiments.

Fifth Embodiment

Referring to the drawings, a fifth embodiment will now be described.

A system which uses an information code, which is according to the fifth embodiment, is the same in hardware as that described in the first embodiment, so that the hardware configurations shown in FIGS. 1 and 2 are also adopted in the fifth embodiment. An information code 400 produced and used by an information code use system according to the fifth embodiment is configured as shown in FIG. 20, in which the configurations except for the free space 110 are the same as those for the first embodiment and produced in the same manner as that described in the first embodiment The information code 400 has a code area, inside of which three are arranged specification pattern regions such as position detection patterns 104, a data recording region, and error-correction-code recording regions, like the forgoing ones.

In addition, a fee space 110 is arranged in the code area having an area size larger than a single cell area. This free space is located at a position outside the specification pattern regions, but still in the code region, the data recording region, and the error-correction-code recording regions. Data being interpreted based on the cell arrangements are not recorded in the free space, and the free space is nothing to do with the error correction.

Inside the free space 110, identification indications (e.g., a plurality of markings 414*a*) are arranged to shown an extent of each of information addition regions 414. The markings 414*a* are circular and painted in a dark color (black or etc.), for example. In the example shown in (A) of FIG. 20, there is a space between the characters "Discount" and "%", so that this space also composes part of an information addition region 412. The characters "Discount" and "%" correspond to identification information showing the extent of the information addition region 412.

In the example of the information code 400 shown in (A) of FIG. 20, in the information addition region of the code area, there is formed a second information code 410 which expresses additional information by combining colors. Inside the code area, a plurality of fill-in regions are arranged to enable users to fill in those regions when the users use the code. The fill-in regions are information addition regions 414 which are inside areas delineated by circular markings 414*a*. A fill-in pattern additionally written to the plural fill-in regions (information addition regions 414) expresses the second information code 410, when users use the code. Information specifying the positions of the respective fill-in regions can be recorded in the data recording region.

In the example shown in FIG. 20, the fill-in regions 414 are defined by a three-row and four column arrangement shown in (A) of FIG. 20, in which a light/dark pattern provided by the plural fill-in reigns 414 gives various kinds of information. For example, as shown in (A) of FIG. 20, when there is no fill-in marking in all the fill-in regions 414. of the three-row and four column, that is, all the fill-in regions 414 are determined to be light-colored, "0%" of discount is designated. When the pattern shown in Fig. (B) of FIG. 20 is provided, "30%" of discount is designated. By applying this information code 400 to for example articles, the reader can recognize that there is no discount when being filled in as shown in (A) of FIG. 20, while the reader can recognize the need for a discount of 30% of the article price when filling-in the region 414 as shown in (B) of FIG. 20.

Thus, when using this information code 400, the reader 10 stores in its memory 35, which functions as an information storage, information indicating bits of information assigned to the plural fill-in patterns added to the fill-in regions 414 in the code area.

For example, different plural fill-in patterns are made to correspond respectively to bits of numeral information (discount rates) and such correspondences are memorized. By way of example, as shown in (A) of FIG. 20, when all the fill-in regions 414 are recognized as being light-colored, the discount rate of 0% is give; when the fill-in regions 414 are filled in as shown in (A) of FIG. 21, the discount rate of 10% is given; when the fill-in regions 414 are filled in as shown in (B) of FIG. 21, the discount rate of 20% is given; and when the fill-in regions 414 are filled in as shown in (C) of FIG. 21, the discount rate of 30% is given.

The reader 10 reads the information code 400 so as to detect the position information recorded in the data recording region. Based on this read position information or position information prepared in the reader 10, the reader 10 positionally detects the fill-in regions 414 of the code image, and analyzes such fill-in regions 414 to know which light/dark pattern corresponds to the fill-in regions 414 mapped into the three-row and four column pattern (i.e., to know which position(s) of the fill-in regions 414 are painted). Using the information stored in the memory 35 (information storage) of the reader 10, the numeral information made to correspond to the designated light/dark pattern is read, and the second information code 410 is interpreted and its interpreted information (information showing the discounted rate in the above example) is outputted.

In the present embodiment, the control circuit 40 functionally corresponds to one example of an additional-information acquiring section. This section analyzes the image of the second information code 410 contained, at least, in the code image, and acquires the additional information recoded in the second information code 410. In other words, this section functions such that the plural fill-in regions 414 of the code image are analyzed, and the information memorized in the memory 35 (information storage) is used to produce the interpreted information about the second information code 410 expressed depending on how the fill-in regions 414 are filled in.

In the case shown in FIG. 20, a salesperson can fill in the fill-in regions 412 depending on their desired discount rate, so that a desired discount rate and other information if necessary can be displayed in the regions 412. By this configuration, with the reader 10 entitled to acquire information about the discount rate, customers can know the discount rate, improving convenience between shops and customers.

In a case where, as described, the memory 35 (information storage) is configured to memorize plural discount rates with correspondences to the plural different fill-in patterns, the fill-in patterns made to correspond to candidates of the discount rates can be updated regularly (for example, day by day). This is advantageous in that unauthorized writing into the fill-in regions can be avoided as much as possible. For example, if, under the same pattern scheme as that of FIG. 21, the authorized discount rate is set to 10% as shown in (A) of FIG. 22 but the fill-in regions are filled in an unauthorized manner as shown in (B) of FIG. 22, this pattern shown in (B) of FIG. 22 is determined to be an unauthorized pattern.

Alternatively, an information code shown in (A) of FIG. 23 which is slightly changed from that shown in (A) of FIG. 20 can be used for price discount and other businesses. The information code 400 in (A) of FIG. 23 differs from that shown in (A) of FIG. 20 in that character display and the region 412 are omitted in (A) of FIG. 23, with the rest configuration is the same as that shown in (A) of FIG. 20. In this example, a discount can be negotiated between a salesperson and a customer. If the discount rate is decided, the salesperson fills in the fill-in regions 414 according to the decided discount rate. For instance, a discount rate of 10% has been decided, the salesperson fills in the information code 400 attached to the article so that the code shows a discount rate of 10% shown in (B) of FIG. 23. Hence, the reader 10 can detect the discount rate of 10% when reading the information code 400. In this example, similarly to the example shown in FIG. 20, numerical information (discount rates) can be stored previously in the memory 35 of the reader 10 such that the discount rates correspond to a plurality of types of fill-in patterns, and numerical information can be read from the stored information depending on a fill-in pattern recognized from the free space 410 of the information code 400.

In addition, an information code shown in (A) of FIG. 24 which is also slightly changed from the code configuration shown in (A) of FIG. 20 may be used, which is an application to point service. An information code 400 shown in (A) of FIG. 24 is different from that shown in (A) of FIG. 20 in the character display and formation of a region 422, while the remaining parts are the same as those shown in (A) of FIG. 20. This information code 400 is used by a shop that gives a point to customers as loyalty in association with an article the shop handles. For example, the information code 400 shown in (A) of FIG. 24 is attached to articles, where salespersons fill in the fill-in regions 414 of this information code 400 according to the points given to customers. As an example, if the information code 400 attached to an article which gives "10 points", a pattern corresponding to 10 points is filled as shown in (B) of FIG. 24, where the pattern is a fill-in pattern registered in the reader 10 as a pattern showing 10 points. Accordingly, when the reader 10 reads the information code 400, the reader can detect 10 points which should be recorded to a loyalty card or others. Similarly to the example shown in FIG. 20, the memory 35 can be set such that it memorizes various point numbers corresponding to various filling-in patterns. As a result, the reader 10, that is, the shop can manage the point numbers effectively.

An information code shown in (A) of FIG. 25 may be used for lot service, in which the information code is slightly changed from that shown in (A) of FIG. 20. The information code 400 in (A) of FIG. 25 differs in character display from the information code in (A) of FIG. 25. The remaining components are the as those in (A) of FIG. 20. In this modification, a shop prepares one or more winning patterns (that is fill-in patterns showing winning numbers in the lot, and the winning patterns are stored as data in the memory 35 of the reader 10. A medium (such as a sheet of paper) with the information code 400 printed thereon as shown in (A) of FIG. 25 is provided to a customer, and the customer fills in the fill-in regions 414 of the information code 400 freely. The reader 10 reads the filled-in information code 400 (as shown in (B) of FIG. 25) to recognize the filled-in pattern, and determine whether or not the recognized filled-in pattern agrees with the one or more winning patterns previously registered in the reader 10. If it is determined that there is an agreement of patterns between both sides, the reader can outputs data for displaying or transmitting the winning and/or stores such data. In this configuration, without structuring a larger-scale scheme, the lot service can be provided.

In this modification, another example can also be provided, where the second information 410 is changed. In the foregoing example, the light/dark pattern expressed by the fill-in regions 414 serves as the second information code 410. Instead, as shown in (A) of FIG. 26, a combination of shapes of figures may be used to express the second information code 410. Specific numerals and/or signs are previously assigned to the figures. When reading, the shapes expressed by the second information code 410 are recognized and information designated by the recognized shapes is configured as data. For example, in the reader 10, the information is previously stored with correspondences to various shapes such that a circle is assigned to a numeral 1, a star to a numeral 2, a square to a numeral 3. When reading, the shapes additionally written in the free space 110 are recognized, and the information corresponding to such recognized figures are read as data being interpreted from the storage. By way of example, the data being interpreted may be read together with or separately, from data obtained by interpreting the data in the data recording region. In this case, FIGS. 512a, 512b and 512c shown in (A) of FIG. 26 may be the ones produced during production of the information code 400 or produced after producing the information code 400.

Another modification is to provide another type of the second information. In the foregoing embodiment, the second embodiment 410 is expressed by two-color patterns expressed by the fill-in regions 414 mapped orderly. Instead, as shown in (B) of FIG. 26, three or more colors can be used as candidate colors and these candidate colors can be combined to express different types of information. For example, in the reader 10, the information is previously stored with correspondences to various colors such that blue is assigned to a numeral 1, red to a numeral 2, yellow to a numeral 3. When reading, the colors additionally given in the free space 110 are recognized, and the information corresponding to such recognized colors of figures are read as data being interpreted, from the storage. In this case, FIGS. 522a, 522b and 522c shown in (B) of FIG. 26 may be the ones produced during production of the information code 400 or produced after producing the information code 400.

Furthermore, instead of using the second information code expressed by the fill-in patterns in the fill-in regions, only the fill-in numbers or only the fill-in positions in the plural fill-in regions is used to designate data being interpreted for the second information code. For example, the number of fill-in numbers or only the fill-in positions in the plural fill-in regions may be outputted as it is. In the reader 10, the data can be made to correspond to the fill-in numbers or the fill-in positions and stored previously. When reading, the reader is configured to output data corresponding to any of the fill-in numbers or the fill-in positions.

The examples shown in FIGS. 20 to 25, etc., show that the second information code is produced during use after producing the information code 400. The second information code may be produced by filling or paining even during production of the information code 400.

Sixth Embodiment

Referring to the drawings, a sixth embodiment will now be described. A representative example of the sixth embodiment will first be explained with FIG. 27, etc.

A system which sues an information code, which is according to the sixth embodiment, is the same in hardware as that described in the first embodiment, so that the hardware configurations shown in FIGS. 1 and 2 are also adopted in the sixth embodiment. An information code 600 produced and used by an information code use system according to the sixth embodiment is configured as shown in FIG. 27, in which the configurations except for the free space 610 are the same as those for the first embodiment and produced in the same manner as that described in the first embodiment As shown in FIG. 27, inside the code area of the information code 600, like the forgoing embodiment, there are arranged specification pattern regions, a data recording region, and error-correction-code recording regions.

Inside the code area, at the position outside the specification pattern regions, the data recording region and the error-correction-code recording regions, the free space 610 is arranged which is large in size than single cell. Data which are not interpreted by cell arrangements and not subjected to the error correction are arranged in the free space 610.

In this embodiment, the overall free space 610 serves as an information addition region, and used as a region to which information can be added or added. Such information includes at least any of price information of an article or service, discount amount information, discount rate information, and information concerning a profit from an article or service. The price information is the price itself, for example, "1,000 yen". The discount amount information is for example "100 yen Off" or "200 yen cashback". Further, the discount rate information is information specifying a discount rate, such as "10% Off", "20% Off", or "half off the list price". The information concerning a profit from an article or service is information showing merit for users or may being advantageous to users; such as "giving 100 points", "present of candies", or "invitation to travel to Hawai by lot". This information may be provided via a sheet of medium such as seals or manually written, or printing using printers.

In the following, it is exemplified such that the information code 600 is added directly or indirectly using a tag to an article a service menu and discount rate information is added to the free space 610 of such information code 600. FIG. 27 provides an example in which the discount rate information is character information 613 indicating "half off the list price" and a seal 612 showing this discount rate written on a medium on which the information code 600 is printed. The medium is for example a packing of goods or a seal enclosing the goods.

Meanwhile, in the data recording region of the information code 600, there are recorded, as the code information, specification information to specify an article or a service, or price information specifying the price of an article or a service. For example, as illustrated in FIG. 28, an article number (481204458) serving as the information specifying an article on which the information code 600 adheres, where the article number shows a sushi (Ume (plum)).

In the reader 10, the article names and their prices are registered with correspondences to the respective article numbers. Thus if the reader can read the information code 600 and detects an article number added in the information code 600, it is possible to decide the article number and its price.

In cases where this information code 600 is used for article management in a shop, the information code 600 is applied to each of the goods (fresh goods, daily dishes, etc.) in the shop. In the information code 600, an article number (specification information) is recorded in its data recording region. In this use, the free space 610 of the information code 600 shown in FIG. 27 is made to be blank. In the data recording region of the information code 600, the article number is recorded, so that, when the information code 600 read by the reader 10 at the cash register in the shop, the reader 10 can detect the discount-less price corresponding to this article number to which information code 600 is applied.

In contrast, when discounting, the free space 610 of the information code 600, which was blank when being attached to the article, is applied with a seal indicating the discount information as shown in FIG. 27. FIG. 8 exemplifies application of a seal indicating the discount information, but this discount information can be written by hand. The added dismount information may be a discount amount or a discount rate. In this way, the free space 610 is used as a region into which users additionally input discount information of an article or a service designated by data recorded in the date recording region.

At the cash register, the reader 10 is placed as part of the register system or operationally associated with the register system. Thus the reader 10 reads the information code 600 as shown in FIG. 27 or 28, during which time the data (article number etc.) recorded in the data recording region is subjected to its interpretation and data in the free space 610 (canvas area) is also read by a known OCR technique, deciding the price of the article from the read results. For example, as shown in FIG. 28, based on the article number (481204458) recorded in the data recording region, sushi of 780 yen (Ume) is decided, and also, based on the discount rate of "half off the list price" recorded in the free space 610

(canvas area), the sushi of 780 yen is finally discounted down to 390 yen at the cash register.

The foregoing discount process can be applied similarly to a case where an article name and its price are recorded it the data recording region of the information code 600, not being limited to the foregoing case. In addition, the same process is true of a case where a discount amount is written or recorded in the free space 610. In the foregoing example, the seal showing "half discount" may be replaced by a seal showing "100 yen discount". The characters of "100" or "100 yen discount" are recognized by using a known OCR (optical character recognition) technique, and the amount of 100 yen, which has been recognized, may be reduced from the amount of 780 yen specified by the article number at the cash register.

The reader 10 may be dedicated to acquire, only, data (such as an article number) registered in the data recording region and information (such as discount rate information and discount amount information) written or expressed in the free space 610. In this case, the acquired data can be transmitted to an external apparatus (such as another register machine or management server). Calculation for the discount adjustment can be carried out by such, an external system.

In this configuration, the control circuit 40 functionally realizes an example of an additional information acquiring part, which reads at least one of the discount amount information or the discount rate information from the free space 610. The control circuit 40 also functionally realizes an information processing part, which transmits the read information read by the data-recording-region reading section and the acquired information acquired by the additional information acquiring section to the outside, and calculates the price of an article or a service based on such read and acquired information.

According to this configuration, use of the free space 610 (information addition region) makes it possible to add, to the code, at least one of price information of an article or a service, discount amount information, discount rate information, and information in association with profit yielded from articles or a services. Such information can be used by the reader 10, thus improving convenience for shops and customers.

In addition, specification information which specifies a service or an article or price information specifying the price of a service or an article can be recorded in the data recording region, so that the type or price of such an article or a service can be decided or detected. By using the free space 610, discount amount information or discount rate information can be added, in addition to the price of an arctic or a service specified by the specification information or the price specified by the price information. Hence, without complicated handling processes, the discount amount and/or the discount rate can be provided additionally to the code, with operations thereof still simplified, thus utilizing the information about the discount easily after reading the information code.

Practically, the information code 600 and a discount seal can be used together and both of the code information and the seal information can be recognized. It is thus possible to apply only the discount seal to the code such that an amount checked at the cash register or others can be changed or adjusted. In this regard, conventionally, a person who handles the register machine inputs by hand discount information to the machine when the person sees the discount seal. In contrast, the present embodiment simplifies this procedure, in which it is sufficient that the person only applies a prepared discount seal to the free space 610 (canvas area) of the code, and passes the code through the register. As a result, an operator's manual labor can be lessened largely, preventing a new barcode from being issued.

Modification 1 of Sixth Embodiment

In this modification 1, an information code 600 shown in FIG. 29, (A) and FIG. 30 is provided. This information code 600 is the same as the representative example of the sixth embodiment except for the configuration of a free space 610 formed on this code.

In the representative example shown in the sixth embodiment, the character information is shown as the discount rate information and the discount amount information. Each discount rate or each discount amount may be given a correspondence to a figure or a symbol. An example is shown in FIG. 30, where candidate figures 623, 624 and 625 are prepared, and the triangular figure 623 is registered as a discount 20%, a circular figure is registered as a discount 30%, and a square figure is registered as a discount 50%. The discount rates for the respective figures are previously recorded n the reader 10 shown in FIGS. 1 and 2. The reader 10 is able to read the information code 600 shown in (A) of FIG. 29, and if the triangle is detected from the free space 610, the reader 10 can obtain from the free space 610 information showing a 20% discount by referring the information registered in the reader 10.

Recognition of a figure from the free space 610 (canvas area) may be carried out by a known OCR (optical character recognition) technique, which extracts edges of a figure drawn in the free space 610. A plurality of characters and/or figures are prepared for fitting an extracted outer edge of the figure to the prepared ones, whereby the most fit figure and/or character is thus selected thereamong.

Alternatively, correspondence between numerals and discount rates can be made in advance such that a numeral 1 is assigned to a 10% discount, a numeral 2 is assigned to a 20% discount, etc. Hence, reading the numeral 1 from the free space 610, the discount rate information can be obtained as a 10% discount. Still alternatively, correspondences between numerals and discount amounts can be made such that a numeral 1 expresses a discount of 100 yen, a numeral 2 expresses a discount of 200 yen, and the like. When reading the numeral 1 from the free space 610 of the code 600, it is understood that the discount amount is 100 yen. In the example, the respective candidate figures 623, 624 and 625 are provided with the seals 622, but such figures can be additionally written by hand.

Modification 2 of Sixth Embodiment

In this modification 2, an information code 600 shown in FIG. 29, (B) is provided. This information code 600 is the same as the representative example of the sixth embodiment except for the configuration of a free space 610 formed on this code.

The discount rate information and the discount amount information can be expressed by characters, figured, and/or symbols, but other expressions are possible. For example, colors such as hues may be adopted as such an expression. Correspondences between the colors (such as hues) and discount rates may be provided in the reader 10 such that blue expresses a 10% discount, read expresses a 20% discount, and green expresses a 30% discount. When reading a blue seal 622, as shown in (B) of FIG. 29, in the free space 610 of the information code 600, the reader 10 uses the correspondence information between the colors and the discount rates and decides that the discount is a 10% discount. Adding colors or hues to the free space 610 can be done by hand painting or by making color seals adhere thereon.

Modification 3 of Sixth Embodiment

This modification 3 includes all the contents set forth in the representative example of the sixth embodiment and additionally includes a manufacturing time recorded in the data recording region and performance of a process for authenticating contents in the free space 610.

In the modification 3, as shown in FIG. 3, the data recording region of the information code 600 memorizes therein not only an article number (481204458) but also manufacturing time information (13.11.25 12:30) serving as data on which it is determined whether or not a discount is performed. In the memory 35 of the reader 10, article names and prices are recorded with correspondences to the respective article numbers, and a plurality of discount time zones based on the manufacturing times are recorded. In other words, the discount rates are set for each time zone. For instance, when the manufacturing time is "2013.11.25; 12:30", a discount of 20% is given to the time zone of "2013.11.25; 18:30-19:30", a discount of 30% is given to the time zone of "201.11.25; 19:30-20:30", and a discount of 50% is given to the time zone of "2013.11.25; after 20:30", and the like. As authorized (correct) discount information for each time zone, authorized discount rate information is recorded in the memory 35 of the reader 10. The memory functionally realizes authorized (correct) information storage.

Provided that previously recorded as above, the information code 600 is read, during which time a time at which the information code 600 has been read is detected. Like the representative example described, an article number and discount rate information are read from the data recording region and the free space 610. Then it is determined whether or not the acquired discount rate is correct or not. In the example shown in FIG. 31, if the read time is 19:50, the correct information for this time zone, that is, authorized discount rate information, is a discount of 30% previously recorded in the reader 10. Therefore, this discount rate should be recognized from the free space 610 normally, but in this example shown in FIG. 31, a discount rate of 50% is obtained. If there is a difference between the discount rate information obtained from the free space 610 and the recorded normal (authorized) discount information, it is determined that the information written on the information code 300 is incorrectly added. In contrast, the time of 19:50 is read from the information code 600 and a normal discount of 30% is read from the free space 610, it is determined that the read information is correct.

In this configuration, the control circuit 40 shown in FIG. 2 functionally corresponds to a reading time specifying section which specifies a time when the information code 600 is read by the reader. "the time when the information code 600 is read by the reader" may be set to a time when the information code 600 is imaged, a time instant when the data recording region of the information code 600 is interpreted, or a time instant when the discount rate information or the discount amount information is recognized from the free space 610. The control circuit 40 also functionally corresponds to a determining section which determines whether or not the information acquired by an additional-information acquired section is correct, as described above.

In this way, the read time information and the recorded normal information for discount can be well combined, so that it can be determined, more reliably, whether or not the information (discount amount information and/or discount rate information) acquired by the additional-information acquiring section is correct Seventh Embodiment A seventh embodiment will be described below referring to the drawings.

An information-code utilization system according to the seventh embodiment has a hardware configuration identical with that of the first m embodiment, i.e. the configuration as shown in FIGS. 1 and 2. An information code 700 produced and used in the information-code utilization system of the seventh embodiment has a configuration, for example, as shown in FIG. 32. The configuration other than a free space 710 is similar to that of the information code 100 of the first embodiment, and portions other than the free space 710 are ensured to be produced by the method as described in the first embodiment.

As shown in FIG. 32, in this configuration as well, the information code 700 has a code area which is provided therein with a specification pattern region, a data recording region, and an error correction code recording region. The specification pattern region is used for arranging specification patterns of a predetermined shape (position detection patterns 104). The data correction region is used for recording data with a plurality of types of cells. The error correction code recording region is used for recording error correction codes with a plurality of types of cells.

The code area is provided with a free space 710, with its size being larger than a single cell, so as to be located at a position other than the specification pattern region, the data recording region and the error correction code recording region. The free space 710 is a region where data to be decoded (data recorded in the data recording region and to be outputted) are not recorded by cells, and also is a region which is not subjected to error correction by the error correction code recording region.

In this configuration, as shown in FIG. 32, an object attached with the information code 700 is a ledger sheet (specifically, delivery notice (absence notice)) which is stuck to a delivery object. In the information code 700, a part of the free space 710 is configured as an information addition region. Specifically, the information addition region includes a contact point recording region 712 for recording information that specifies contact, such as a phone number or an address, and delivery time recording regions 722a and 722b for recording information that specifies time of delivery of the object. Further, in the information code, the data recording region is recorded with object specifying information for specifying the object (specifically, delivery goods number (delivery number), to which the information code 700 has been stuck, for specifying delivery goods, delivery goods name, and the like), a delivery staff name, and destination information for specifying a destination to which the data are going to be transmitted (email address, URL, and the like).

When redelivery is requested using such an absence notice, the request is made, for example, according to a flow as shown in FIG. 33. In this example, as shown in FIG. 32, a person who desires delivery fills in the contact point recording region 712 with a contact point, such as a phone number and an address, and then fills in the delivery time recording regions 722*a* and 722*b* with desired delivery time (S701).

Then, the information code 700 that has been filled in in this way is read by a reader 10, such as a mobile phone or a smartphone (S702). When the reader 10 reads the information code 700 shown in FIG. 32, the data recording region is decoded to acquire the delivery goods number for specifying the delivery goods (delivery number), the delivery goods name, the delivery staff name (delivery person), and the destination information for specifying the destination to which the data are going to be transmitted (e.g., email address). For the free space 710 (information addition region), the contact point recording region 712 is analyzed using a known OCR technique to acquire, for example, numerical information (phone number). Further, it is specified which of the delivery time recording regions 722*a* and 722*b* is filled in, thereby acquiring information on specified delivery time. It should be noted that the recording method for the delivery time recording region may be a method of specifying desired time using, for example, numerals and symbols, such as 13:00, or numerals and letters, such as 9 o'clock.

After performing reading in this way, it is confirmed whether or not necessary information has been correctly acquired (S703), and the information has been read at S702 is transmitted to the destination (e.g., server or the like specified by the email address or URL) recorded in the data recording region (S704). Thus, the information is transmitted to the specified destination (e.g., email address), the information including the information such as on the delivery goods number for specifying the delivery goods (delivery number), the delivery goods, and the delivery staff name (delivery person), the information such as on the phone number filled in in the contact point recording region 712, and the information on the delivery time filled in in the delivery time recording regions 722*a* and 722*b*. It should be noted that the destination may be an email address which can be acquired by an administrative server administered by the delivery company that carries out delivery, or alternatively, may be an email address of a mobile terminal possessed by delivery staff who is specified by the delivery staff name (delivery person).

In the present configuration, the control circuit 40 shown in FIG. 2 corresponds to an example of the "additional information acquiring section", and functions so as to acquire the contact point specifying information recorded in the contact point recording region 712 and the delivery time specifying information recorded in the delivery time recording region. The control circuit 40 and the communication unit correspond to an example of the "transmission processing device", and functions so as to transmit the object specifying information read by the data recording region reader, the contact point specifying information acquired by the additional information acquiring section, and the delivery time specifying information to a destination specified by the destination information that has been read by the data recording region reader.

The description herein is provided by way of an example in which a contact point is recorded in the contact point recording region. However, such a region may be omitted. In this case, a contact point may be specified from personal information (e.g., profile information) registered in advance in the reader 10, for transmission to a destination together with the delivery time specifying information acquired from the information code 700.

According to the present configuration, information for specifying a contact point is recorded in the contact point recording region and then the information code is read. Accordingly, the information for specifying the contact point and the object specifying information for specifying an object are ensured to be easily transmitted to a predetermined destination (the destination specified by the destination information). Thus, the destination side can figure out, together with the specified contact point, as to which of the objects the information has been transmitted for.

Specifically, delivery time of the delivery goods can be easily transmitted to a specified destination together with a contact point and object specifying information. In particular, delivery time can be specified or a contact point can be inputted without essentially requiring complicated key input or the like. This is very convenient for a user who is going to inform delivery time.

In a conventional home-delivery system, contact for redelivery has to be made such as on the phone or via internet. When such a contact is made on the phone, for example, burdensome inputs of articles, such as the number shown on the absence notice and specified time, have to be done one by one, referring to the absence notice and according to the guidance announced via the phone. However, according to the present configuration, such a burden can be greatly mitigated.

Eighth Embodiment

Referring to the drawings, an eighth embodiment is described.

An information-code utilization system according to the eighth embodiment has a hardware configuration identical with that of the first embodiment, i.e. the configuration as shown in FIGS. 1 and 2. An information code 800 produced and used in the information-code utilization system of the eighth embodiment has a configuration, for example, as shown in FIG. 34. The configuration other than a free space 810 is similar to that of the information code 100 of the first embodiment, and portions other than the free space 810 are ensured to be produced by the method as described in the first embodiment.

As shown in FIG. 34, in this configuration as well, the information code 800 has a code area which is provided therein with a specification pattern region, a data recording region, and an error correction code recording region. The specification pattern region is used for arranging specification patterns of a predetermined shape (position detection patterns 104). The data correction region is used for recording data with a plurality of types of cells. The error correction code recording region is used for recording error correction codes with a plurality of types of cells.

The code area is provided with a free space 810, with its size being larger than a single cell, so as to be located at a position other than the specification pattern region, the data recording region and the error correction code recording region. The free space 810 is a region where data to be decoded (data recorded in the data recording region and to be outputted) are not recorded by cells, and also is a region which is not subjected to error correction by the error correction code recording region.

In this configuration, as shown in FIG. 34, a part of the free space 810 configured in the information code 800 serves as an information addition region. The information addition region includes setting information recording regions 812*a*, 812*b*, 812*c*, 822*a*, 822*b*, 832*a*, 832*b*, 832*c* and 832*d* for recording setting information for setting functions of an information code reader 10. Pieces of textual information 811a, 811b, 811c, 811d, 821a, 821b and 831a are displayed adjacent to the setting information recording regions 812a, 812b, 812c, 822a, 822b, 832a, 832b, 832c and 832d to indicate the settings to be specified in the regions.

When function setting of the reader 10 is performed using such information code 800, an operator firstly fills in, as shown in FIG. 34, any one, or two or more of the setting information recording regions 812a, 812b, 812c, 822a, 822b, 832a, 832b, 832c and 832d to specify the articles for which settings are desired to be made. Then, the information code 800 that has been filled in in this way is read by the reader 10. In reading the information code 800, the reader 10 analyzes which of the setting information recording regions 812a, 812b, 812c, 822a, 822b, 832a, 832b, 832c and 832d has been filled in to thereby figure out which of the setting articles has been specified. Then, the internal functions of the reader are set in accord with the specified setting articles and the set information is stored.

In the example shown in FIG. 34, the regions 812a, 812b and 812c are provided to set articles for setting an image filter in the information code reader 10. When the region 812a is filled in, a setting of no filter (setting of performing neither black expansion nor black contraction relative to a picked-up image) is specified. When the region 812b is filled in, a setting of using an image filter for black expansion (setting of performing known black expansion processing relative to a picked-up image) is specified. When the region 812c is filled in, a setting of using an image filter for black contraction (setting of performing known black contraction processing relative to a picked-up image) is specified. Thus, when any of the regions 812a, 812b and 812c is filled in and the information code 800 is read, the reader 10 is set accordingly at the position where the region is filled in, and afterward, the setting of performing the specified image processing relative to a picked-up image becomes effective.

The regions 832a, 832b, 832c and 832d correspond to articles for specifying which of a plurality of illumination light sources in position should be activated. When the region 832a is filled in, activation of an upper-position illumination light source is specified. When the region 832b is filled in, activation of a left-position illumination light source is specified. When the region 832c is filled in, activation of a lower-position illumination light source is specified. When the region 832c is filled in, activation of a right-position illumination light source is specified. Thus, when any of the regions 812a, 812b and 812c is filled in and the information code 800 is read, the reader 10 is set accordingly to activate the illumination light source corresponding to the position where the region is filled in, and afterward, every time an information code is read, reading is performed by activating an illumination light source at a specified position.

In the present configuration, the control circuit 40 of the information code reader 10 shown in FIG. 2 corresponds to an example of the additional information acquiring section, and functions so as to acquire setting information recorded in the setting information recording region. Further, the control circuit 40 corresponds to an example of the setting device, and functions so as to set one or more functions in the information code reader 10 on the basis of the setting information acquired by the additional information acquiring section.

In the present configuration, the functions of the reader 10 can be easily set with a simple operation of reading the information code 800 in which the setting information is recorded in the setting information recording region.

In particular, according to conventional art, reading devices or the like having no liquid crystal displays are set relying on a method, for example, of reading codes dedicated to settings, or a method of performing settings by way of tools, with the devices being connected to computers. However, when a plurality of parameters are set by code reading, lots of time and effort have to be spent in searching intended codes through a variety of types of codes dedicated to settings, and reading the searched codes one by one. Further, in the case of making settings by a computer as well, lots of time and effort have to be spent in establishing a connection with the computer every time the settings are changed. In this regard, in the present configuration in which the articles to be set are juxtaposed in the information code 800, a simple operation such as of filling in desired setting articles can specify the settings. This can greatly mitigate the burden involved in the operation of making settings. Further, by simply reading the information code 800, the specified setting information can be collectively inputted to the reader 10 to make settings. Thus, this can greatly mitigate time and effort spent for inputting settings into the reader 10, as an object to be set, and allowing the reader to recognize the settings. Further, in the present configuration, a single information code 800 enables settings of a plurality of setting articles and thus there is no need of juxtaposing a number of codes dedicated to settings. For this reason, the present configuration can eliminate mix-up of which codes have been read or not have been read, during operation.

In the example set forth above, a reading device (reader 10) is exemplified as an object to be set. However, the above configuration can also be applied to collective settings for devices having a function of picking up images and requiring lots of settings, such as settings for video cameras (e.g., brightness, shutter, etc.), or wi-fi settings.

Ninth Embodiment

Referring to the drawings, a ninth embodiment is described. First, a typical example of the ninth embodiment is described.

An information-code utilization system according to the ninth embodiment has a hardware configuration identical with that of the first embodiment, i.e. the configuration as shown in FIGS. 1 and 2. An information code 900 produced and used in the information-code utilization system of the ninth embodiment has a configuration, for example, as shown in FIG. 35. The configuration other than a free space 910 is similar to that of the information code 100 of the first embodiment, and portions other than the free space 910 are ensured to be produced by the method as described in the first embodiment.

As shown in FIG. 35, in this configuration as well, the information code 900 has a code area which is provided therein with a specification pattern region, a data recording region, and an error correction code recording region. The specification pattern region is used for arranging specification patterns of a predetermined shape (position detection patterns 104). The data correction region is used for recording data with a plurality of types of cells. The error correction code recording region is used for recording error correction codes with a plurality of types of cells.

The code area is provided with a free space 910, with its size being larger than a single cell, so as to be located at a position other than the specification pattern region, the data recording region and the error correction code recording region. The free space 910 is a region where data to be decoded (data recorded in the data recording region and to be outputted) are not recorded by cells, and also is a region which is not subjected to error correction by the error correction code recording region.

In the present configuration, as shown in FIG. 35, the data recording region of the information code 900 is recorded with type specifying information for specifying the type of goods. Specifically, an article number (article type number) is recorded as the type specifying information. Further, a part of the free space 910 configured in the information code 900 serves as an information addition region. The information addition region includes content recording regions 922a, 922b, 922c, 932a, 932b, 932c and 943 which are used for recording the matters of the article type (type of goods) specified by the article number (article type number). Pieces of textual information 911a, 921, 931, 941 are displayed adjacent to the content recording regions 922a, 922b, 922c, 932a, 932b, 932c and 943 to indicate the matters specified by the regions. In this example, it is ensured that a size can be recorded by filling in any of the plurality of size specifying regions 922a, 922b and 922c, and that an inseam is recorded by filling in any of the plurality of inseam specifying regions 932a, 932b and 932c. Further, it is ensured that a color can be recorded by filling in the color specifying region 943 with a specific color.

When articles are managed using such an information code 900, an operator can fill in, as shown in FIG. 35, two or more content recording regions 922a, 922b, 922c, 932a, 932b, 932c and 943 of the information code 900, for recordation of the specific matters of the article to which the information code 900 is attached. For example, the information code 900 shown in FIGS. 35 and 36 specifies that the article number (article type number) is 12345 by way of the data in the data recording region and specifies that the size is M, the inseam is 67 and the color is blue by way of the matters in the free space 910.

Further, as shown in FIG. 36, a management unit 90 that is set up in a store or the like includes a storage that registers unique numbers of respective articles in an article group which is specified by the article number (article type number). For example, in an article group whose article number (article type number) is 12345, the article with a size of S, an inseam of 67 and a color of blue is assigned with an article unique number 1234567890. Also, in the article group 12345, an article with a size of M, an inseam of 67 and a color of blue is assigned with an article unique number 1234567891. Accordingly, by making an access to the management unit 90, the reader 10 is able to acquire an article unique number corresponding to the information code 900 specified by the filled-in matters. Specifically, as shown in FIGS. 35 and 36, the information code 900 that has been filled in is read by the reader 10 to transmit information to the management unit 90, the information including the article number (article type number) recorded in the data recording region, and the size, the inseam and the color specified by the content recording regions 922a, 922b, 922c, 932a, 932b, 932c and 943. For example, the example shown in FIG. 36 by (2) indicates that the read data including an article number of 12345, a size of M, an inseam of 67 and a color of blue are transmitted to the management unit 90. The management unit 90 reads out article unique information specified by the combination of the transmitted article number (article type number), the size, the inseam and the color, and the read out information is transmitted to the reader 10 (see the reception of correspondence data shown in FIG. 36 by (3)). In this way, an article group can be managed by a single information code 900, and in addition, specific articles can be managed by the respective unique numbers.

In the present configuration, the control unit 40 shown in FIG. 2 corresponds to an example of the additional information acquiring section, and functions so as to acquire information, with specific matters being recorded in the content recording regions of the information code 900. Further, the control circuit 40 corresponds to an example of the type specifying device, and functions so as to specify a specific type of an article on the basis of the type specifying information recorded in the data recording region and the specific matters acquired by the additional information acquiring section.

According to the present configuration, in managing target goods in which one type of goods is further subdivided into multiple types, it is not necessary to prepare multiple types of information codes, but one type of information code can be shared between the multiple types of goods.

In particular, according to the conventional art, codes are prepared for respective articles to retain article-specific information, in spite of there being only a small difference between the articles (e.g., difference in size or color between clothes), and the articles are tagged with the respective codes. Therefore, a tremendous number of codes are required to be prepared in view of various differences in size, color and the like, which easily leads to the occurrence of erroneous tagging. In this regard, the present configuration can eliminate such a problem.

Modification 1 of the Ninth Embodiment

Referring to FIG. 37, Modification 1 of the ninth embodiment is described. Since the details of the free space 910 are identical with those of the typical example of the ninth embodiment, detailed description is omitted.

In the present configuration as well, the free space 910 of the information code 900 is provided with an information addition region including content recording regions 922a, 922b, 922c, 932a, 932b, 932c and 943 to which information can be added using any of a plurality of types of recording patterns.

On the other hand, the recording region is recorded with pieces of pattern-specific identification information conforming to the respective plurality of types of recording patterns that can be recorded in the content recording regions 922a, 922b, 922c, 932a, 932b, 932c and 943. For example, when a recording pattern is a pattern of a first matter (size S), a fourth matter (inseam 67) and a ninth matter (color blue), a unique number 1234567890 is correlated the recording pattern. When a recording pattern is a pattern of a second matter (size M), the fourth matter (inseam 67) and the ninth matter (color blue), a unique number 1234567891 is correlated the recording pattern. With such a method, each of all the recording patterns is correlated to a unique number, and the correlated data are recorded in the data recording region.

In reading such an information code 900, the reader 10 analyzes whether any of the content recording regions 922a, 922b, 922c, 932a, 932b and 932c has been filled in to thereby specify the number corresponding to each checked portion. Further, by specifying the color in the content recording region 943, the number corresponding to the color is specified. Then, from the data (unique number list) recorded in the data recording region, a unique number corresponding to the combination of the numbers of the checked portions and the number of the color is specified to acquire an article unique number corresponding to the information code 900 specified by the filled-in matters.

In the present configuration, the control circuit 40 shown in FIG. 2 corresponds to an example of the additional information acquiring section, and functions so as to specify the type of the recording pattern recorded in the content recording regions. Further, the control circuit 40 corresponds to an example of the identification information specifying device, and functions so as to specify pattern-specific identification information (unique number) corresponding the type of the recording pattern figured out by the additional information acquiring section.

According to the present configuration, in managing target goods in which one type of goods is further subdivided into multiple types, it is not necessary to prepare multiple types of information codes, but one type of information code can be shared between the multiple types of goods. Further, use of the pieces of pattern-specific identification information corresponding to the respective patterns recorded in the content recording regions enables management by using the information uniquely allocated to the types specified by the patterns that are recorded in the content recording regions, without the necessity of preparing multiple types of information codes. In addition, since pattern-specific identification information (unique number) that is unique to each article can be acquired without having to make an access to the management unit 90, the system configuration can be easily simplified and the processing time can be easily shortened.

Modification 2 of the Ninth Embodiment

Referring to FIG. 38, Modification 2 of the ninth embodiment is described. Since the details of the free space 910 are identical with those of the typical example of the ninth embodiment, detailed description is omitted.

In the present configuration as well, the free space 910 of the information code 900 is provided with an information addition region including a plurality of individual recording regions (size recording regions 922a, 922b and 922c, inseam recording regions 932a, 932b and 932c, and a color recording region 943). The individual recording regions are each configured so that multiple types of recording can be made.

On the other hand, in the data recording region, pieces of numerical information are allocated and correlated to respective types of recording for the plurality of individual recording regions. For example, in the size recording regions 922a, 922b and 922c, a numerical information "111" is allocated to the case of recording the S region (first region) 922a, while a numerical value "222" is allocated to the case of recording the M region (second region) 922b. Further, in the color recording region 943, numerical information 777 is allocated to the case of recording a color (red) corresponding to a seventh matter, while numerical information 888 is allocated to the case of recording a color (green) corresponding to an eighth matter.

In reading such an information code 900, the reader 10 analyzes whether any of the content recording regions 922a, 922b, 922c, 932a, 932b and 932c has been filled in to thereby specify the number corresponding to each checked portion. Further, by specifying the color in the content recording region 943, the number corresponding to the color is specified. Then, from the data recorded in the data recording region, pieces of numerical information corresponding to the respective checked portions, and a piece of numerical information corresponding to the number of the color are read out. As shown in the lower diagram of FIG. 38, pieces of numerical information corresponding to respective numbers are recorded in the form of being sectioned by a specific letter (#). A piece of numerical information corresponding to a checked portion can be acquired by reading a piece of numerical information at a position corresponding to the number. A piece of numerical information corresponding to the number of a color as well can be acquired by reading a piece of numerical information at a position corresponding to the number. The pieces of numerical information acquired in this way are juxtaposed in ascending order of numbers to generate unique information. In this example as well, an article unique number corresponding to the information code 900 specified by the filled-in matters can be acquired.

In the present configuration, the control circuit 40 shown in FIG. 2 corresponds to an example of the additional information acquiring section, and functions so as to specify the type of each recording in the plurality of individual recording regions. Further, the control circuit 40 corresponds to an example of the reflection information producing device, and functions so as to generate information reflecting the type of recording of each individual recording region specified by the additional information acquiring section to store or output the generated information.

The present configuration enables generation and use of unique information reflecting all the matters recorded in the individual recording regions. For example, let us discuss the case of using an information code to manage target goods in which one type of goods is further subdivided into multiple types. In this case, when a specific type of goods is configured to be specified according to the matters of recording in the individual recording regions, unique information corresponding to the specific type of goods can be generated and managed.

Other Embodiments

The present invention should not be construed as being limited to the embodiments described above referring to the drawings, but embodiments as set forth below should be encompassed by the technical scope of the present invention.

In the foregoing embodiments, it is ensured that the position data indicating the position of the information addition region (e.g., the check column position information shown in FIG. 3) is included in the information code 100. However, such an example should not impose any limitation. For example, the information code producing apparatus 2 may be configured to produce an information code so that the information addition region is arranged at a predetermined position in the free space. In this case, information that specifies the predetermined position (e.g., the check column position information shown in FIG. 3, or the fill-in field position information shown in FIG. 12) may be stored in the storage 5. Also, in this case, similar to the information code producing apparatus 2, the information code reader 10 may permit the memory 35 to store the specifying information that specifies the predetermined position (e.g., the check column position information shown in FIG. 3, or the fill-in field position information shown in FIG. 12). It should be noted that, in this configuration, the memory 35 corresponds to an example of the specifying information recording part. In the information code reader 10, such specifying information is read out from the memory 35 at S46 of FIG. 9 or at S66 of FIG. 13 to specify the information addition region and then the subsequent processing may be performed.

Further, in this case, the check column position information shown in FIG. 3 or the fill-in field position information shown in FIG. 12 does not have to be necessarily included in the header data.

In this configuration, the control circuit 40 corresponding to the additional information acquiring section functions so as to specify the position of the information addition region in a code image, on the basis of the specifying information recorded in the specifying information recording part, and analyze the information addition region to acquire additional information.

In this configuration, the position where the information addition region should be arranged in the free space is determined in advance by the information code producing apparatus, while the information code reader is recorded in advance with the information that can specify the position of the information addition region. Accordingly, in performing reading, the position of the information addition region can be more correctly specified without the necessity of including special position information or the like in the information code.

The present invention can also be provided as a display device that can display any one, or a plurality of, or all of the information codes described above. Alternatively, the present invention can be provided as a printing device that can print any one, or a plurality of, or all of the information codes described above. Alternatively, the present invention can be provided as a computer readable program for generating any one, or a plurality of, or all of the information codes described above. Alternatively, the present invention can be provided as a recording medium which is recorded with a program for producing any one, or a plurality of, or all of the information codes described above. Alternatively, the present invention can be regarded as an information code medium (e.g., printed object, or a formed object configured such as by direct marking) which is assigned with any one, or a plurality of, or all of the information codes described above. Alternatively, the present invention can be regarded as a displayed image in which any one, or a plurality of, or all of the information codes described above are displayed.

In the example shown in FIG. 1 and the like, the information code producing apparatus 2 and the information code reader 10 are configured as separate devices. However, the information code producing apparatus 2 may be configured as the information code reader 10.

The foregoing embodiments show examples in each of which the free space 110 is provided at the center portion of the code area. However, the arrangement of the free space 110 is not limited to this example. For example, the free space may be provided near the peripheral edge of the code area. Further, a design may be displayed in the free space, or the information to be displayed may be expressed by one or more symbols. Alternatively, a design and information may both be displayed. As such a design, various other designs can be used as far as the designs are each configured by graphics, patterns or colors, or a combination of them. When information is displayed in place of or together with a design, the matters in the information are various. For example, the information may be the name of a provider institution (e.g., business owner or an individual person) that provides data to be recorded in the information code 100, or an address of the site of the provider institution, or alternatively, a trade name, a service name, or the like, associated with the data to be recorded in the information code 100.

In the foregoing embodiments, a QR code is taken as an example of another type of code, and the specification patterns of the QR code are taken as an example of the specification patterns used for the information code 100. However, a two-dimensional code of a type other than this may be used. For example, a data matrix code may be used as a different type of code, and the specification patterns used in the information code 100 may be the specification patterns of the data matrix code.

The correlation in the arrangement conversion table that is set as shown in FIG. 5 may be optionally changed as shown in FIG. 7. For example, in the information code producing apparatus 2 and the information code reader 10, when the arrangement conversion table that is set as shown in FIG. 5 is changed as shown in FIG. 7, the arrangement of the $22^{nd}$ to $23^{rd}$ code-words in the information code 100 to be produced is changed from the arrangement shown on the right in FIG. 5 (arrangement in which recording is made at $22^{nd}$ to $23^{rd}$ arrangement candidate positions) to the arrangement shown on the right in FIG. 7 (arrangement in which recording is made at $42^{nd}$ to $43^{rd}$ arrangement candidate positions). Resultantly, the position and the shape of the free space 110 are also changed. In this case, the $22^{nd}$ to $23^{rd}$ arrangement candidate positions may be used as the free space, or may be used as arrangement positions for other code-words. In other words, in this configuration, the adjustment of the arrangement conversion table leads to the adjustment of the position and the shape of the free space 110 to thereby more enhance the degree of freedom in configuring the free space.

In the foregoing embodiments, light cells, such as white cells, and dark cells, such as black cells, are exemplified as a plurality of types of cells configuring the code area. In this regard, the specification pattern region and the data recording region in the code area may be configured in first-type cells having predetermined concentration, brightness and hue, and second-type in which any of concentration, brightness and hue is different from that of the first-type cells. Alternatively, the specification pattern region, the data recording region and the error correction code recording region in the code area may be configured by the cells of three or more types in each of which any of concentration, brightness and hue is different from that of others.

The foregoing embodiments each show an example in which the code area is arrayed with a plurality of cells in a square shape in the specification pattern region, the data recording region and the error correction code recording region. However, besides the square shape, each cell may have a quadrangle shape, or, besides the quadrangle shape, may have a polygonal, circular, or elliptic shape.

The foregoing embodiments exemplify, as a specification pattern, the position detection patterns 104, the timing pattern 106, the alignment pattern 108, and the like. However, the specification patterns may each be configured by other unique pattern as far as the unique pattern is configured as a fixed pattern, irrespective of the matters in the data recording region and the error correction code recording region.

The foregoing embodiments exemplify, for example, identification indication that indicates the range of the information addition region, as an example of the identification indication of the information addition region. However, the identification indication is not limited to the above example as far as the presence of the information addition region can be figured out by the indication. For example, the position of the information addition region may be indicated by such identification indication as an arrow, a line or a triangle. Alternatively, the presence of the information addition region may be indicated by such an identification indication as characters or symbols. For example, in any of the information codes of the foregoing embodiments, the identification indication may be displayed such as by characters or symbols in the free space or at a predetermined position in the free space, with words asking for information to be filled in (e.g., "Fill in the blank regions with characters.", or "Fill in the appropriate portions.")

The foregoing embodiments each show an example of a "code area". However, the "code area" may only have to be a minimum square or rectangular region that includes all of a plurality of types of cells configuring the information code. Accordingly, the inner edge portion of the code area may have a portion where no cells are arrayed. For example, as in an information code 1000 shown in FIG. 39, a free space 1010 may be formed, being adjacent to a peripheral edge portion of the code area. In this case, the minimum square or rectangular region that includes all of a plurality of types of cells configuring the information code 1000 is as indicated by the dash-dot line AR, while an outer edge of the free space 1010 is, for example, as indicated by the dash-dot-dot line AR2. At least a part of the information addition region may be present in the code area. Thus, as indicated by an information addition region AR3 of FIG. 40, the remaining part may be configured to be present outside the code area. In the example shown in FIG. 40, the data recording region may be recorded in advance with information for specifying the range of the information addition region AR3.

The foregoing embodiments each show an example of a free space. The free space is a region where data to be decoded are not recorded by cells and thus may be a region where information or an image is displayed by a method different from the one used for recording data in the data recording region. For example, as in the first embodiment, the free space may be configured as a region where no code-word is arranged. Alternatively, the free pace may be configured as a region which, as in a known QR code, is arranged with neither correction code-word for expressing error correction codes, nor data code-word for expressing data to be decoded, but is arranged with filler code-words. Whichever of the free spaces may be used, "information" can be "displayed by a method different from the one used for recording data in the data recording region by cells". Thus, information may be displayed, for example, by characters, numerals, or other symbols. Alternatively, information may be displayed by a method of expressing a specific article or service in the form of a trademark or the like. In such a free space, "an image" can be "displayed by a method different from the one used for recording data in the data recording region by cells". Thus, an image can display various shapes, patterns, hues, a combination of them, or the like.

Further, a configuration as indicated by an information code 1100 in FIG. 41 may be used. This example uses a configuration of providing a free space similar to the one in the first embodiment. The only difference from the first embodiment is the way of specifying the free space. In the example shown in FIG. 41, the specific matters in the regions, excepting those in the specification patterns occupying only a part, are omitted. Actually, light cells and dark cells are arranged in outer regions except for a free space 1110. The free space 1110 is displayed therein, for example, with an image similar to the one in the free space 110 of the first embodiment, or an image similar to the one in the free spaces of other embodiments.

In the present configuration as well, a plurality of models are prepared as types of the information code 1100. Thus, each model is assigned in advance with the numbers of rows and columns of cells, shape and position of each specification pattern, position of format information, and candidate positions of code-words (addresses). When the producing apparatus 2 produces the information code 1100, the model information is ensured to be arranged at predetermined positions in the code area (reserved regions 107 in the example of FIG. 41). Accordingly, in reading the information code 1100, the reader 10 analyzes the code image of the information code 1100 and reads the model information located at the predetermined positions, thereby figuring out the numbers of rows and columns of cells, shape and position of each specification pattern, position of format information, and candidate positions of code-words (addresses).

When the information code 1100 is produced, any model may be selected from the plurality of models prepared in advance. Thus, a basic configuration (positions of the specification patterns 104, the numbers of rows and columns of cells, and candidate positions of code-words) in the code area is determined. For example, the model with a configuration shown in FIG. 41 has an array of 29 rows by 29 columns. In this configuration, it is ensured that the specification patterns 104 each having a structure identical with the position detection pattern of a QR code (trademark) are arranged at three predetermined corners. A region (predetermined position 105) for recording format information is provided at a predetermined position near each of the specification patterns 104. Further, in the 29 rows by 29 columns matrix region, candidate positions for code-words are determined in advance at positions other than those of the specification patterns 104 and the predetermined positions 105, with the candidate positions being allocated with addresses of 0 to 67. In this way, since the configuration inside the code area is specified in advance by the configuration corresponding to each model, once the model is specified, it is possible to specify the order of the code-words and the positions of the code-words. It should be noted that the information of the determined model is recorded at a fixed position which is determined in advance in the array of the model. For example, in the example shown in FIG. 41, the information of the model is ensured to be recorded in the regions 107 that are specified by the designated hatching.

After a model is determined and thus the basic configuration in the code area is determined, the shape and position of the free space are determined. The shape of the free space may be determined, for example, by a method of selecting one from a plurality of candidate shapes prepared in advance, or by a method of setting a shape according to shape specifying information which is externally inputted to the information code producing apparatus 2. Alternatively, only a given fixed shape may be determined. The position of the free space may be set to a fixed position determined in advance. Alternatively, a user may input the information for specifying a position and the position may be set as the position of the free space.

After the free space is determined, the information code 1100 is produced with such a configuration that the code-words for the data recording region and the code-words for the error correction code recording region are arranged at the code-words candidate positions that are positioned outside the determined location of the free space. For example, in the model with the configuration as shown in FIG. 41, the specification patterns 104 are arranged at three corners, and then with reference to the positions of these specification patterns 104, the candidate positions of the 68 code-words assigned with numbers 0 to 67 are specified in advance. In this layout, when the free space 1110 is determined as shown in FIG. 41, the candidate positions of at least the code-words having portions located inside the free space 1110 are excluded from arrangement positions. Then, skipping the positions of the excluded code-words, code-words are sequentially arranged. For example, in the example shown in FIG. 41, the free space 1110 is set occupying the candidate positions of the $50^{th}$ and $51^{st}$, the $53^{rd}$ and $54^{th}$, and the $60^{th}$ to $67^{th}$ code-words. Therefore, it is ensured that no code-word is arranged at the candidate positions of the $50^{th}$ and $51^{st}$, the $53^{rd}$ and $54^{th}$, and the $60^{th}$ to $67^{th}$ code-words. In other words, after sequentially arranging code-words at $0^{th}$ to $49^{th}$ positions, a code-word is arranged at the $52^{nd}$ position, skipping the $50^{th}$ and $51^{st}$ positions. Then, code-words are sequentially arranged at the $55^{th}$ to $59^{th}$ positions, skipping the $53^{rd}$ and $54^{th}$ positions. With this arrangement, the data code-words, i.e. coded data to be decoded, and the error correction code-words expressing error correction codes can be reliably arranged at candidate positions outside the free space 1110.

After determining the specification pattern region (regions for the specification patterns 104 and other specification patterns), the format region (predetermined positions 105), the virsion number regions 107, individual code-word regions, and the like in this way, the specific matters of the free space 1110 are determined. In the information code 1100 as well, an image similar to the one in the free space 110 may be displayed in the free space 1110 to thereby configure the information code 1100 having functions similar to those shown in FIG. 1. The ways of using the information code 1100 are similar to those in the first embodiment and other embodiments.

REFERENCE SIGN LIST

1 . . . information-code utilization system
2 . . . information code producing apparatus
3 . . . controller (data acquiring section, data-recording-region producing device)
4 . . . operation unit (data acquiring section)
5 . . . storage (arrangement-position-information recording part)
7 . . . communication unit (data acquiring section)
10 . . . information code reader
23 . . . light receiving sensor (imaging unit)
35 . . . memory (correspondence information recording part, specifying information recording part)
40 . . . control circuit (data-recording-region reading section, additional-information acquiring section, detecting section, color determining section, outputting section, interpreting section, determining section)
100 . . . information code
102 . . . cell
104 . . . position detecting pattern (specification pattern)
110 . . . free space
120 . . . another type of code
REG . . . code area

The invention claimed is:

1. A method of producing an information code by an information code producing apparatus, the information code being formed on a non-transitory medium and having a code area in which cells are arranged, each cell being a unit for presenting information, the method comprising:
arranging in the code area, by a processor: (i) a specification pattern region in which specification patterns of predetermined shapes are recorded, the specification patterns including patterns indicating a position of the code area; (ii) a data recording region in which data are recorded by a plurality of types of the cells; (iii) an error correction code recording region in which error correction codes are recorded by the plurality of types of the cells; and (iv) an information addition region in which additional information is recordable, which is different from information shown by the data recorded in the data recording region, the information addition region being set not to be subjected to the error correction under the error correction code; and
reading the information code by an information code reader, the information code reader comprising at least one processor.

2. The method of claim 1, comprising:
arranging, by the processor, an identification indication for showing the information addition region.

3. The method of claim 1, comprising:
arranging, by the processor, in the code area, a free space at a position other than the specification pattern region, the error correction code recording region, and the data recording region in the code area, object data to be interpreted being excluded from being recorded by the cells, the free space having a size larger than one of the cells, and
arranging, by the processor, the information addition region inside the free space.

4. The method of claim 1, comprising:
forming, by the processor, the specification pattern region and the data recording region by arranging light cells and dark cells,
forming, by the processor, the information code in which at least part of the data recording region is a predetermined functional region including the information addition region, and
forming, by the processor, guide information inside the predetermined functional region, the guide information being a symbol or a figure, and any of a region for the guide information and a region other than the guide information in the predetermined functional region is formed to have a luminance which is detected to be any one of a light color or a dark color by the information code reader.

5. The method of claim 1, comprising:
forming, by the processor, the information addition region with one or more types of predetermined colors, writing into the information addition region using a color different from the one or more types of predetermined colors.

6. The method of claim 1, comprising:
producing, by the processor, the information code such that the information addition region has a position in the code area, the position being shown by positional data, and the positional data are recorded in the data recording region.

7. A non-transitory computer-readable medium comprising instructions which, in response to execution by a computer, cause the computer to perform a method comprising:
generating an information code, the information code being formed on a non-transitory medium and having a code area in which cells are arranged, each cell being a unit for presenting information,
wherein the information code comprises, in the code area, (i) a specification pattern region in which specification patterns of predetermined shapes are recorded, the specification patterns including patterns indicating a position of the code area; (ii) a data recording region in which data are recorded by a plurality of types of the cells; (iii) an error correction code recording region in which error correction codes are recorded by the plurality of types of the cells; and (iv) an information addition region in which additional information is recordable, which is different from information shown by the data recorded in the data recording region, the information addition region being set not to be subjected to the error correction under the error correction code; and reading the information code by an information code reader, the information code reader comprising at least one processor.

8. The computer-readable medium of claim 7, wherein the information code further comprises an identification indication for showing the information addition region.

9. The computer-readable medium of claim 7, wherein
the information code comprises, arranged in the code area, a free space at a position other than the specification pattern region, the error correction code recording region, and the data recording region in the code area, object data to be interpreted being excluded from being recorded by the cells, the free space having a size larger than one of the cells, and the information addition region is arranged inside the free space.

10. The computer-readable medium of claim 7, wherein
the specification pattern region and the data recording region are formed by arranging light cells and dark cells, at least part of the data recording region is a predetermined functional region including the information addition region, and guide information is formed inside the predetermined functional region, the guide information being a symbol or a figure, and any of a region for the guide information and a region other than the guide information in the predetermined functional region is formed to have a luminance which is detected to be any one of a light color or a dark color by the information code reader.

11. The computer-readable medium of claim 7, wherein
the specification pattern region and the data recording region are formed by arranging light cells and dark cells, at least part of the data recording region is a predetermined functional region including the information addition region, guide information is formed inside the predetermined functional region, the guide information being a symbol or a figure, a light-dark map is formed to specify a light-dark level at each of the cells in the predetermined functional region based on a light-dark configuration formed in the predetermined functional region between a region for the guide information and a region other than the guide information, and code words are set in both the data recording region and the error correction code recording region based on the light-dark map.

12. The computer-readable medium of claim 7, wherein
the information addition region is formed with one or more types of predetermined colors, writing into the information addition region using a color different from the one or more types of predetermined colors.

13. The computer-readable medium of claim 7, wherein
the information addition region has a position in the code area, the position being shown by positional data, the positional data being recorded in the data recording region.

14. The computer-readable medium of claim 7, wherein
the code area has a predetermined position therein and the information addition region is arranged at the predetermined position.

15. The computer-readable medium of claim 7, wherein
the information code further comprises predetermined identification information recorded in the data recording region, the identification information showing presence of the information addition region.

16. The information code of claim 7, wherein
the information code further comprises a second information code recorded in the information addition region inside the code area, the second information code expressing the additional information by combining colors or combining shapes.

17. The computer-readable medium of claim 7, wherein
the information code comprises:
a plurality of fill-in regions which are formed in the code area, the fill-in regions being possible to be filled in after producing the information code, and
a second information code which can be expressed by fill-in patterns into the plurality of fill-in regions.

18. An information code reader, comprising:
an imaging device; and
a processor,
wherein the imaging device is configured to image an information code, the information code being formed on a non-transitory medium and having a code area in which cells are arranged, each cell being a unit for presenting information,
the information code comprising, in the code area: (i) a specification pattern region in which specification patterns of predetermined shapes are recorded, the specification patterns including patterns indicating a position of the code area; (ii) a data recording region in which data are recorded by a plurality of types of the cells; (iii) an error correction code recording region in which error correction codes are recorded by the plurality of types of the cells; and (iv) an information addition region in which additional information is recordable, which is different from information shown by the data recorded in the data recording region, the information addition region being set not to be subjected to the error correction under the error correction code, and
wherein the processor is configured to act as:
a data-recording-region reading section reading the data recorded in the data recording region based on contents in the data recording region in an imaged code image of the information code when the information code is imaged by the imaging device; and
an additional-information acquiring section analyzing contents in the information addition region of the code image to acquire the additional information added in the information addition region.

19. A system which utilizes an information code, comprising:
an information code producing apparatus comprising a first processor, the information code producing apparatus producing the information code being formed on a non-transitory medium and having a code area in which cells are arranged, each cell being a unit for presenting information; and an information code reader comprising a second processor, the information code reader reading the information code produced by the information code producing apparatus, wherein the first processor of the information code producing apparatus is configured to produce the information code such that the code comprises, in the code area: (i) a specification pattern region in which specification patterns of predetermined shapes are recorded, the specification patterns including patterns indicating a position of the code area; (ii) a data recording region in which data are recorded by a plurality of types of the cells; (iii) an error correction code recording region in which error correction codes are recorded by the plurality of types of the cells; and (iv) an information addition region in which additional information is recordable, which is different from information shown by the data recorded in the data recording region, the information addition region being set not to be subjected to the error correction under the error correction code; and wherein the information code reader further comprises:
an imaging device imaging the information code produced by the information code producing apparatus, and wherein the second processor is configured to act as:
a data-recording-region reading section reading the data recorded in the data recording region based on contents in the data recording region in an imaged code image of the information code when the information code is imaged by the imaging device; and
an additional-information acquiring section analyzing contents in the information addition region of the code image to acquire the additional information added in the information addition region.

* * * * *